United States Patent
Park et al.

(10) Patent No.: US 10,708,534 B2
(45) Date of Patent: Jul. 7, 2020

(54) TERMINAL EXECUTING MIRROR APPLICATION OF A PERIPHERAL DEVICE

(71) Applicant: LG ELECTRONICS INC., Seoul (KR)

(72) Inventors: Chala Park, Seoul (KR); Pilyoung Noh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 302 days.

(21) Appl. No.: 15/049,885

(22) Filed: Feb. 22, 2016

(65) Prior Publication Data

US 2016/0249006 A1 Aug. 25, 2016

(30) Foreign Application Priority Data

Feb. 23, 2015 (KR) .................. 10-2015-0024977
Feb. 23, 2015 (KR) .................. 10-2015-0025418
Feb. 23, 2015 (KR) .................. 10-2015-0025422

(51) Int. Cl.
*G06F 3/0481* (2013.01)
*H04N 5/445* (2011.01)
(Continued)

(52) U.S. Cl.
CPC ......... *H04N 5/44543* (2013.01); *G06F 9/451* (2018.02); *G06F 9/452* (2018.02); *H04N 5/4403* (2013.01); *H04N 5/44591* (2013.01); *H04N 21/472* (2013.01); *H04N 21/482* (2013.01); *G06F 1/3265* (2013.01); *G06F 3/0346* (2013.01); *G06F 3/0486* (2013.01); *G06F 3/04847* (2013.01);
(Continued)

(58) Field of Classification Search
CPC .... G06F 9/4443; G06F 3/0346; G06F 3/0486; G06F 3/0487; G06F 9/4445; G06F 3/04842; G06F 3/04847; G06F 3/04812; G06F 3/04817; G06F 3/0482; G06F 2203/04803; H04N 5/4403; H04N 5/44591; H04N 2005/441; H04N 2005/44556; H04N 5/44543; H04N 21/472; H04N 21/482; H04N 2005/4425; Y02B 60/1242

See application file for complete search history.

(56) References Cited

U.S. PATENT DOCUMENTS

| | | | | |
|---|---|---|---|---|
| 2009/0244019 | A1* | 10/2009 | Choi | G06F 3/0482 345/173 |
| 2010/0261507 | A1* | 10/2010 | Chang | G06F 3/1454 455/566 |
| 2010/0262673 | A1* | 10/2010 | Chang | G06F 3/1454 709/217 |
| 2013/0024814 | A1* | 1/2013 | Kim | H04M 1/72544 715/810 |

(Continued)

FOREIGN PATENT DOCUMENTS

WO WO 2015/016628 A1 2/2015

*Primary Examiner* — Jennifer N To
*Assistant Examiner* — Amy P Hoang
(74) *Attorney, Agent, or Firm* — Birch, Stewart, Kolasch & Birch, LLP

(57) ABSTRACT

A terminal including a display; and a controller configured to display an execution screen of a first program on a full screen of the display, split the full screen into a first area and a second area in response to a screen split request if the execution screen of the first program is displayed on the display, and display the execution screen on the first area and a multitasking screen on the second area including at least one of a second program and an external input for connection to the terminal.

13 Claims, 54 Drawing Sheets

(51) Int. Cl.
  *H04N 5/44*        (2011.01)
  *G06F 9/451*       (2018.01)
  *H04N 21/472*      (2011.01)
  *H04N 21/482*      (2011.01)
  *G06F 3/0486*      (2013.01)
  *G06F 1/3234*      (2019.01)
  *G06F 3/0346*      (2013.01)
  *G06F 3/0484*      (2013.01)

(52) U.S. Cl.
  CPC .............. *G06F 2203/04803* (2013.01); *H04N 2005/441* (2013.01); *H04N 2005/4425* (2013.01); *H04N 2005/44556* (2013.01); *Y02D 10/153* (2018.01)

(56) References Cited

U.S. PATENT DOCUMENTS

| | | |
|---|---|---|
| 2013/0182192 A1 | 7/2013 | Kim |
| 2013/0222321 A1 | 8/2013 | Buening |
| 2014/0012999 A1 | 1/2014 | Chang et al. |
| 2014/0059628 A1* | 2/2014 | Kuo ................. H04N 21/4122 725/109 |
| 2014/0359493 A1 | 12/2014 | Hong et al. |
| 2015/0061972 A1* | 3/2015 | Seo ....................... G06F 3/0488 345/2.3 |
| 2016/0006971 A1* | 1/2016 | Yum .................. H04N 21/4316 348/564 |
| 2016/0054864 A1* | 2/2016 | Han ..................... G06F 3/0482 715/745 |
| 2016/0261905 A1* | 9/2016 | Aruga ................ H04L 41/0806 |

* cited by examiner

FIG. 11
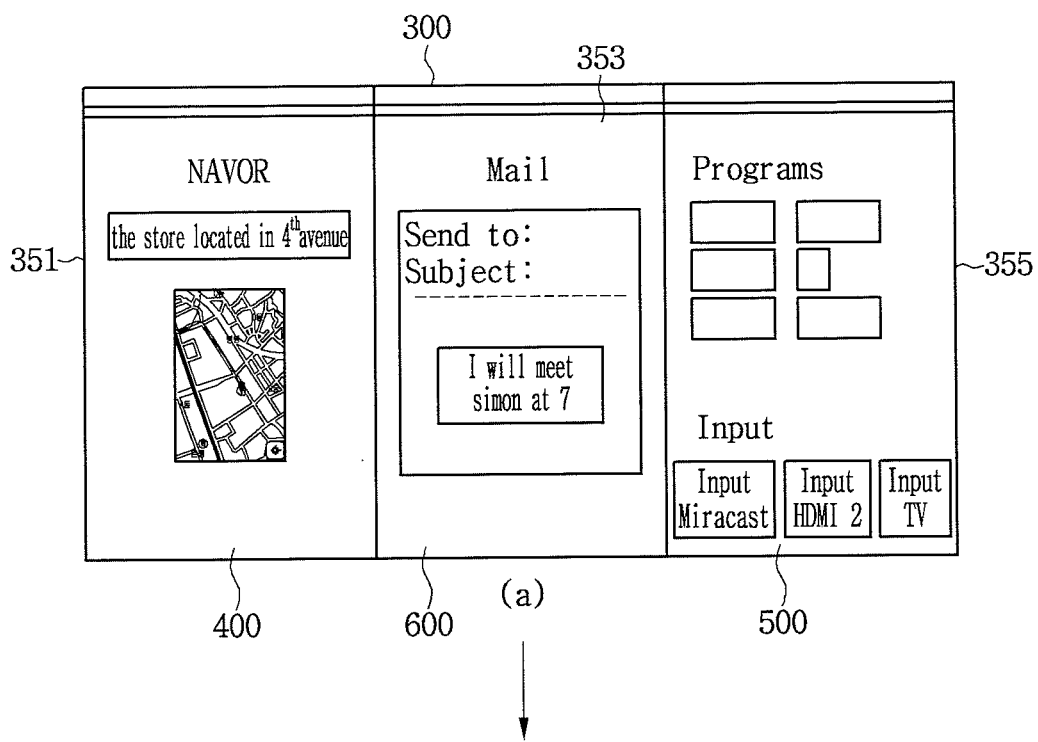
(a)
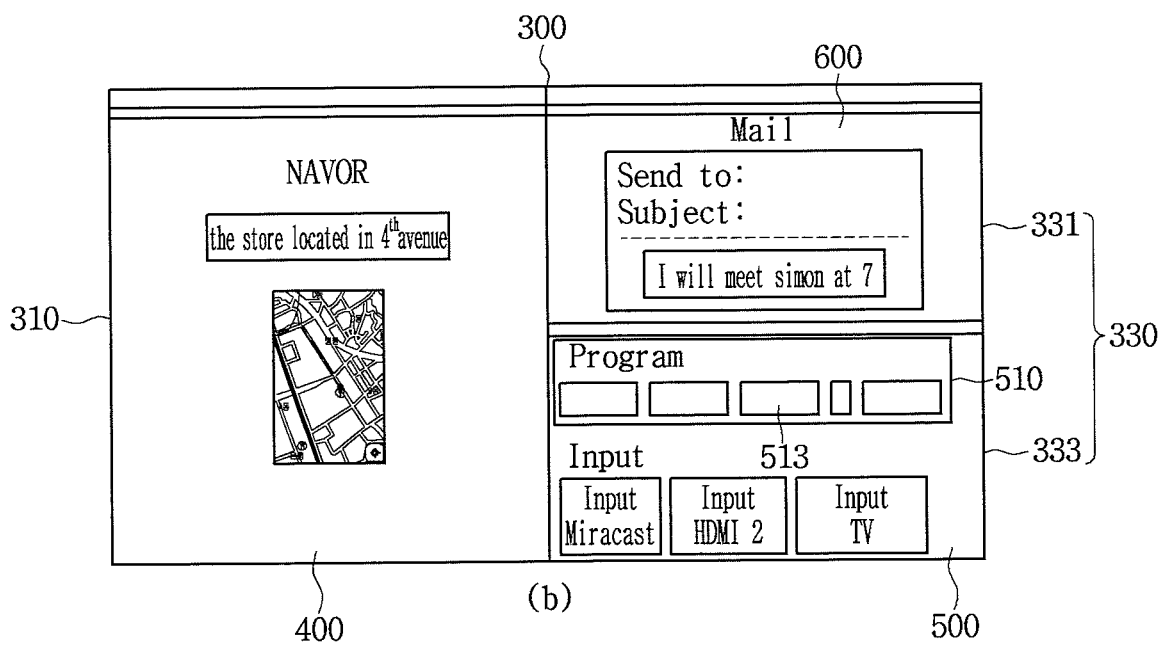
(b)

FIG. 15
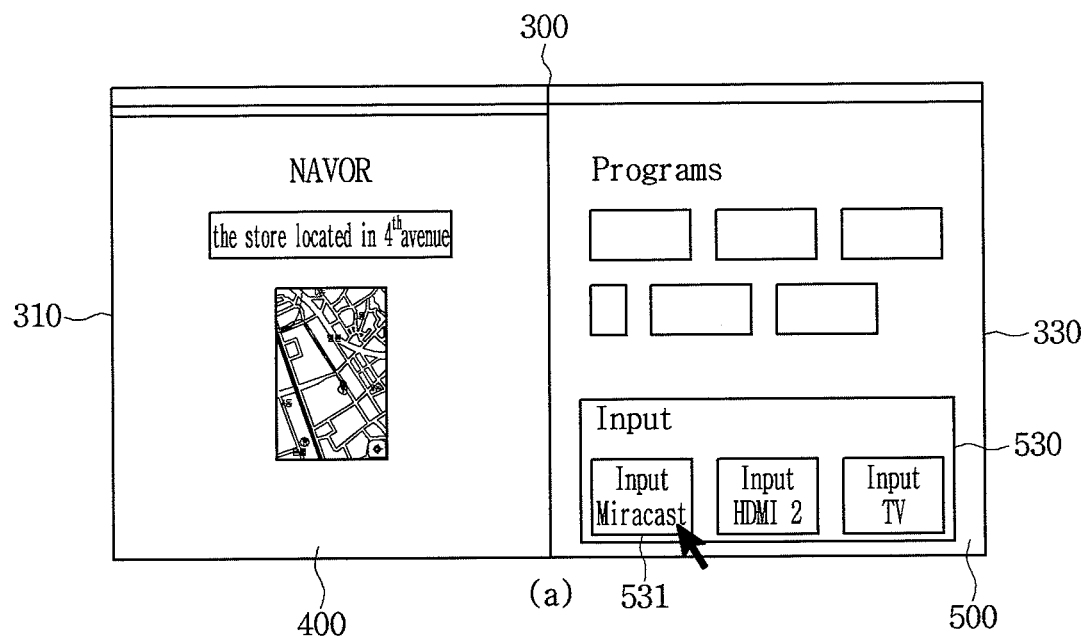
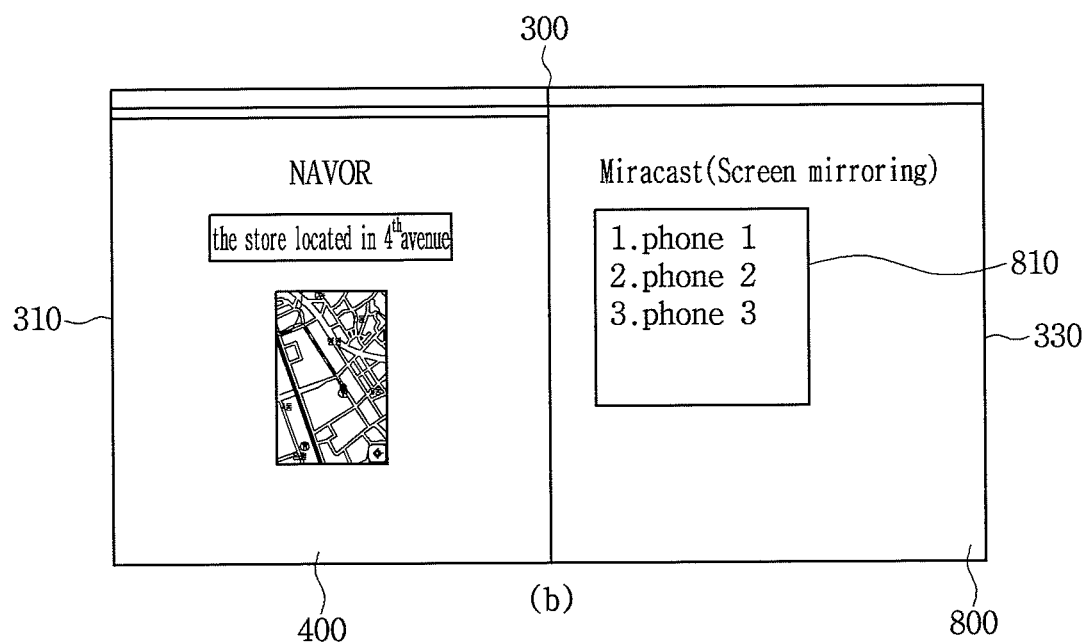

FIG. 17
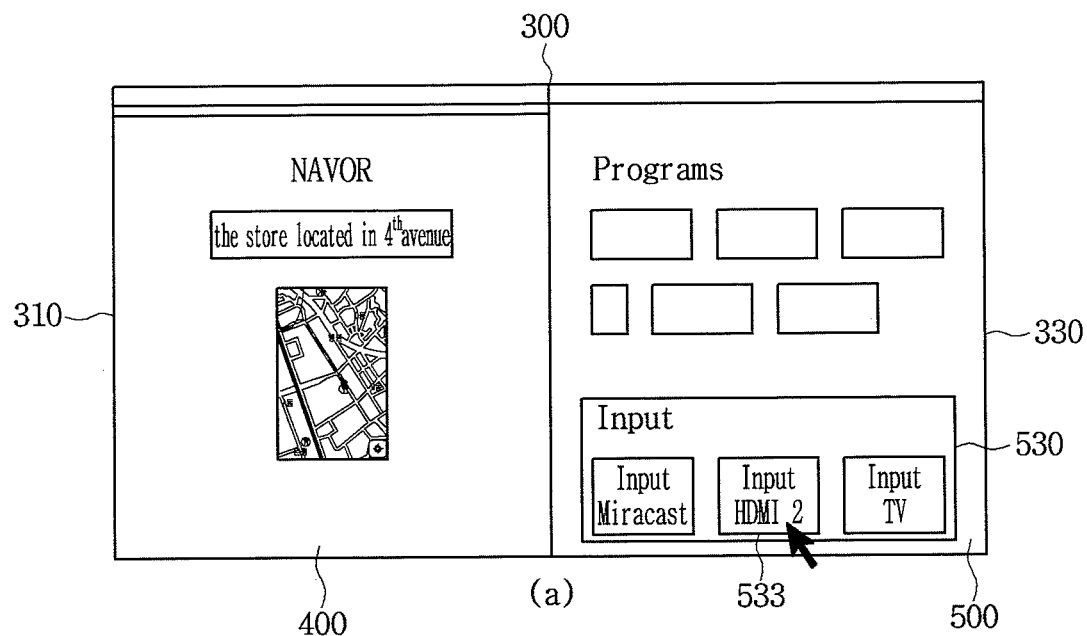
(a)
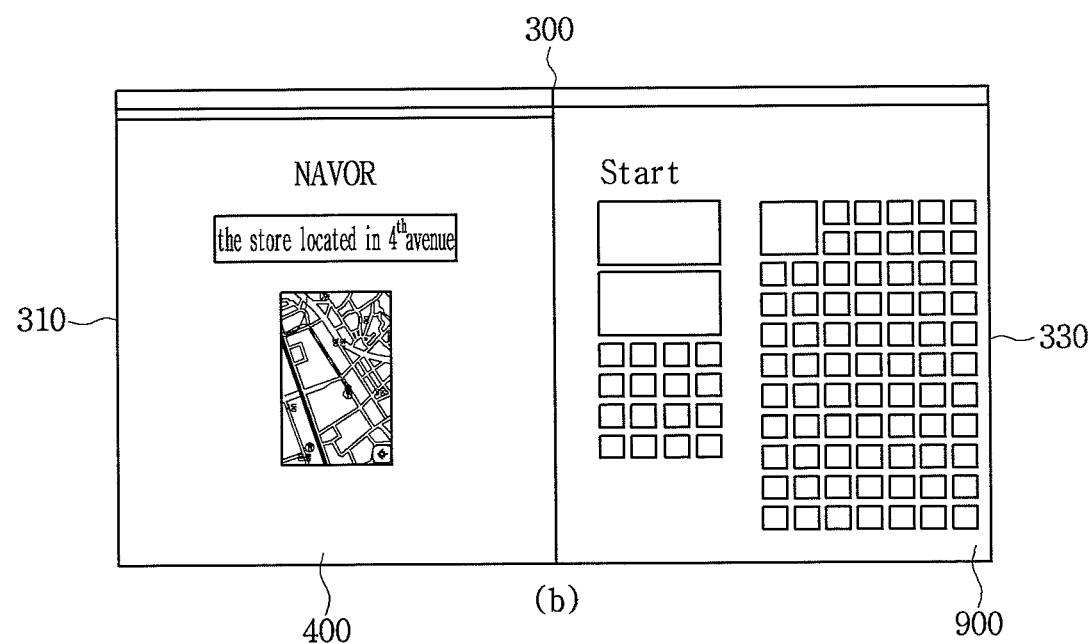
(b)

FIG. 19
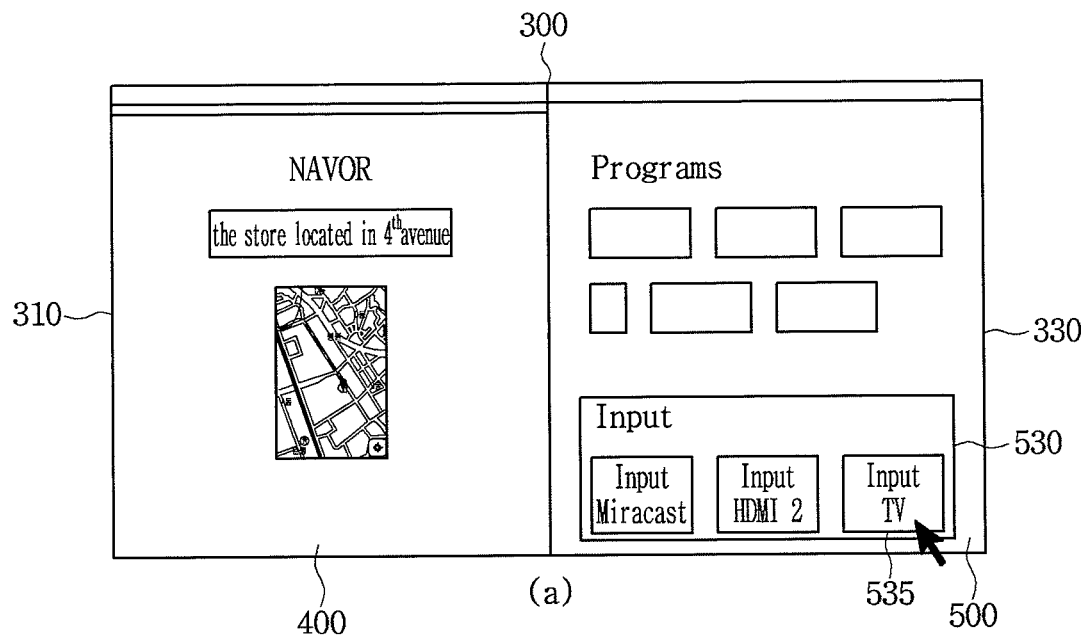
(a)
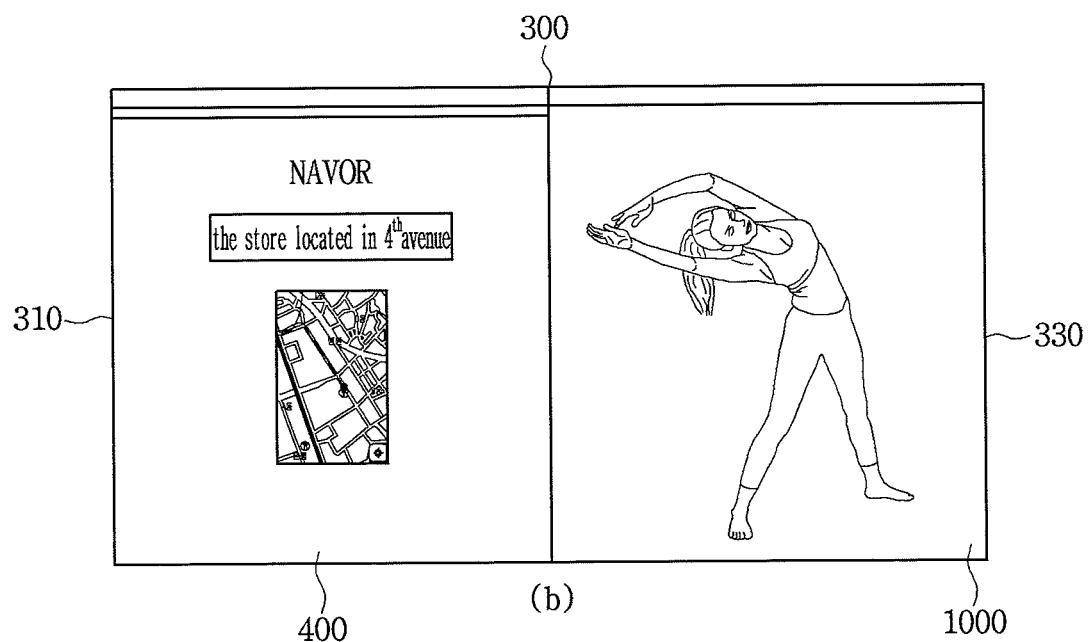
(b)

FIG. 40
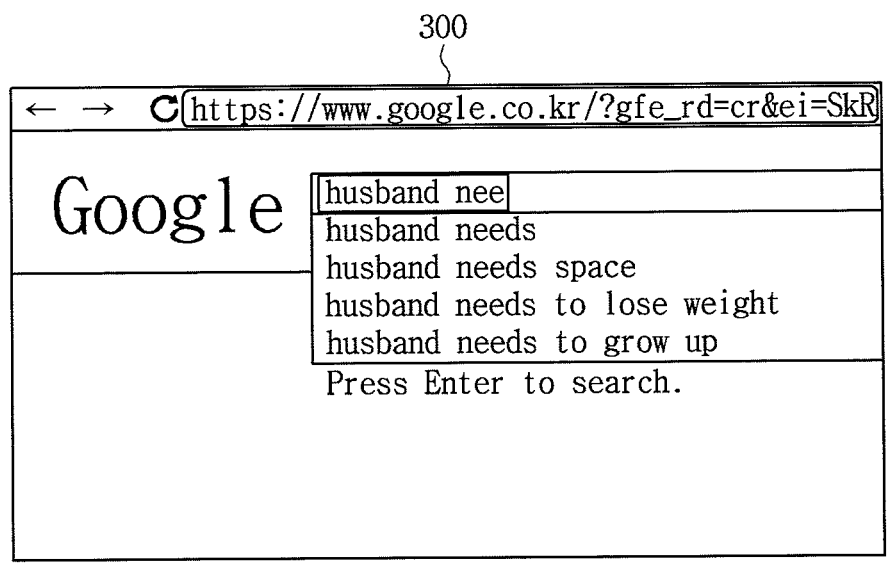
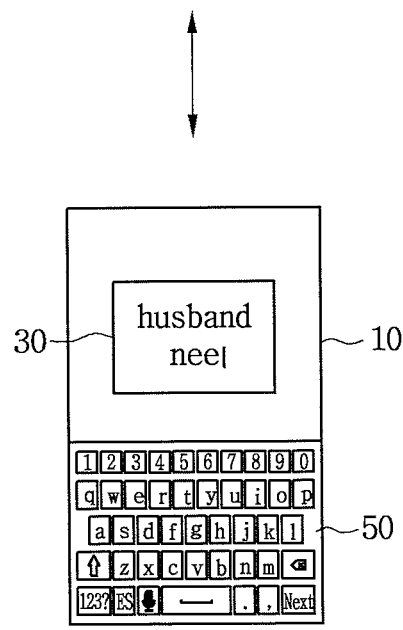

FIG. 41
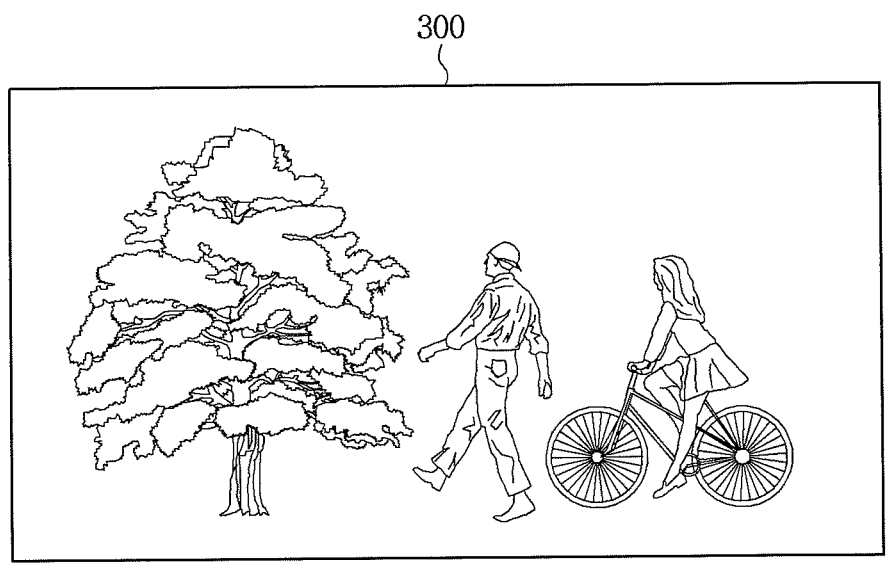
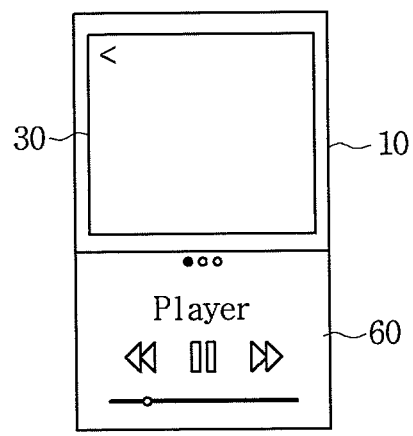

TERMINAL EXECUTING MIRROR APPLICATION OF A PERIPHERAL DEVICE

CROSS-REFERENCE TO RELATED APPLICATIONS

The present application claims priority under 35 U.S.C. 119 and 35 U.S.C. 365 to Korean Patent Application No. 10-2015-0024977 (filed on Feb. 23, 2015), Korean Patent Application No. 10-2015-0025418 (filed on Feb. 23, 2015) and Korean Patent Application No. 10-2015-0025422 (filed on Feb. 23, 2015) which are hereby incorporated by reference in its entirety.

BACKGROUND OF THE INVENTION

Field of the Invention

The present disclosure relates to a terminal, and more particularly, to a terminal for performing a multitasking more efficiently.

Discussion of the Related Art

A simple task is performed on a mobile device, but more complicated tasks such as multitasking are performed using a desktop or laptop environment. Further, a task with a high complexity and difficulty may interact with a task B or C.

However, it is not easy and simple to appropriately dispose windows for a plurality of applications on one screen. In general, the size of a window is adjusted and its position is moved with an input device such as a mouse and then, a window corresponding to another application is required to be disposed to fit the remaining area. Due to this inconvenience, with a keyboard input such as an alt+Tab input, a program is switched and a necessary task is performed and a process for returning to a previous program is performed with the alt+Tab input.

However, such full screen switching is inconvenient in a simultaneous task instead of an alternative task. Further, if there are several simultaneous tasks, the complexity is increased drastically. Additionally, if a screen mirroring task for displaying the screen of a mobile terminal such as a smartphone is performed, the screen of the mobile terminal is shared only and screen switching and data transmission/reception between connected devices is not performed intuitively.

Additionally, if a digital TV terminal with high resolution displays various contents or applications on one screen at the same time, since the resolution supported by each content or application displayed simultaneously is not the same, some screens for a plurality of contents or applications displayed on one screen may not be easily identified by a user.

SUMMARY OF THE INVENTION

Embodiments provide a terminal for providing information on another program or information on an external input connected to the terminal through an easy and fast method during single program execution.

Embodiments provide a terminal for transmitting or receiving information between a terminal and another terminal by using the screen of the other terminal provided through a screen mirroring technique.

Embodiments provide a resolution switching of an image for a task output to a screen and output each of a plurality of tasks with an appropriate resolution to one screen.

In one embodiment, a terminal includes: a display; a user input interface coupled with the display and the user input interface, the control unit is further capable of receiving a request for a screen control of the display; and a control unit configured to receive a screen split request if an execution screen of a program is displayed on a full screen of the display, display the execution screen of the program on a first area of the full screen that is split according to the received screen split request and displaying a multitasking screen for multitasking on a second area of the split full screen, wherein the multitasking screen includes at least one of a program list including at least one another program other than the program and an external input list including at least one external input that is wiredly or wirelessly connected to the terminal.

The details of one or more embodiments are set forth in the accompanying drawings and the description below. Other features will be apparent from the description and drawings, and from the claims.

BRIEF DESCRIPTION OF THE DRAWINGS

The present invention will become more fully understood from the detailed description given hereinbelow and the accompanying drawings, which are given by illustration only, and thus are not limitative of the present invention, and wherein:

FIGS. 10 to 12 are views of outputting the execution screen of another program additionally through a second window for providing a multitasking environment according to an embodiment of the present invention.

FIGS. 15 and 16 are views illustrating a screen provided if an external input icon for screen mirroring is selected from an external input list on a second window according to an embodiment of the present invention.

FIGS. 17 and 18 are views illustrating a screen provided if an external input icon for screen mirroring is selected from an external input list on a second window according to an embodiment of the present invention.

FIG. 19 is a view illustrating a screen provided if an external input icon for representing a TV input is selected from an external input list on a second window according to an embodiment of the present invention.

FIG. 40 is a view of controlling a terminal by utilizing a mobile terminal as a wireless keyboard according to an embodiment of the present invention.

FIG. 41 is a view of controlling a terminal by utilizing a mobile terminal as a remote controller according to an embodiment of the present invention.

DETAILED DESCRIPTION OF THE EMBODIMENTS

Hereinafter, embodiments relating to the present invention will be described in detail with reference to the accompanying drawings. The suffixes "module" and "unit" for components used in the description below are assigned or mixed in consideration of easiness in writing the specification and do not have distinctive meanings or roles by themselves.

A terminal according to an embodiment of the present invention, for example, as an artificial terminal that adds a computer supporting function to a broadcast receiving function, may have an easy-to-use interface such as a writing input device, a touch screen, or a spatial remote controller as an internet function is added while fulfilling the broadcast receiving function. Then, with the support of a wired or wireless internet function, it is possible to perform an e-mail, web browsing, banking, or game function in access to internet and computers. In order for such various functions, standardized general purpose OS may be used.

Accordingly, since various applications are freely added or deleted on a general purpose OS kernel, a terminal described in this present invention, for example, may perform various user-friendly functions. The terminal, in more detail, may be network TV, HBBTV, smart TV, LED TV, OLED TV, and so on and in some cases, may be applied to a smartphone.

According to another embodiment of the present invention, the terminal may be one of a desktop computer, a notebook computer, and a laptop computer. According to another embodiment of the present invention, the terminal may be a digital signage device that provides digital signage service. The digital signage device, as a communication tool that induces company's marketing, advertising, training effects and customer experience, is a digital image device for providing specific information in addition to broadcast programs in public places such as airports, hotels, hospitals.

Figure 1:
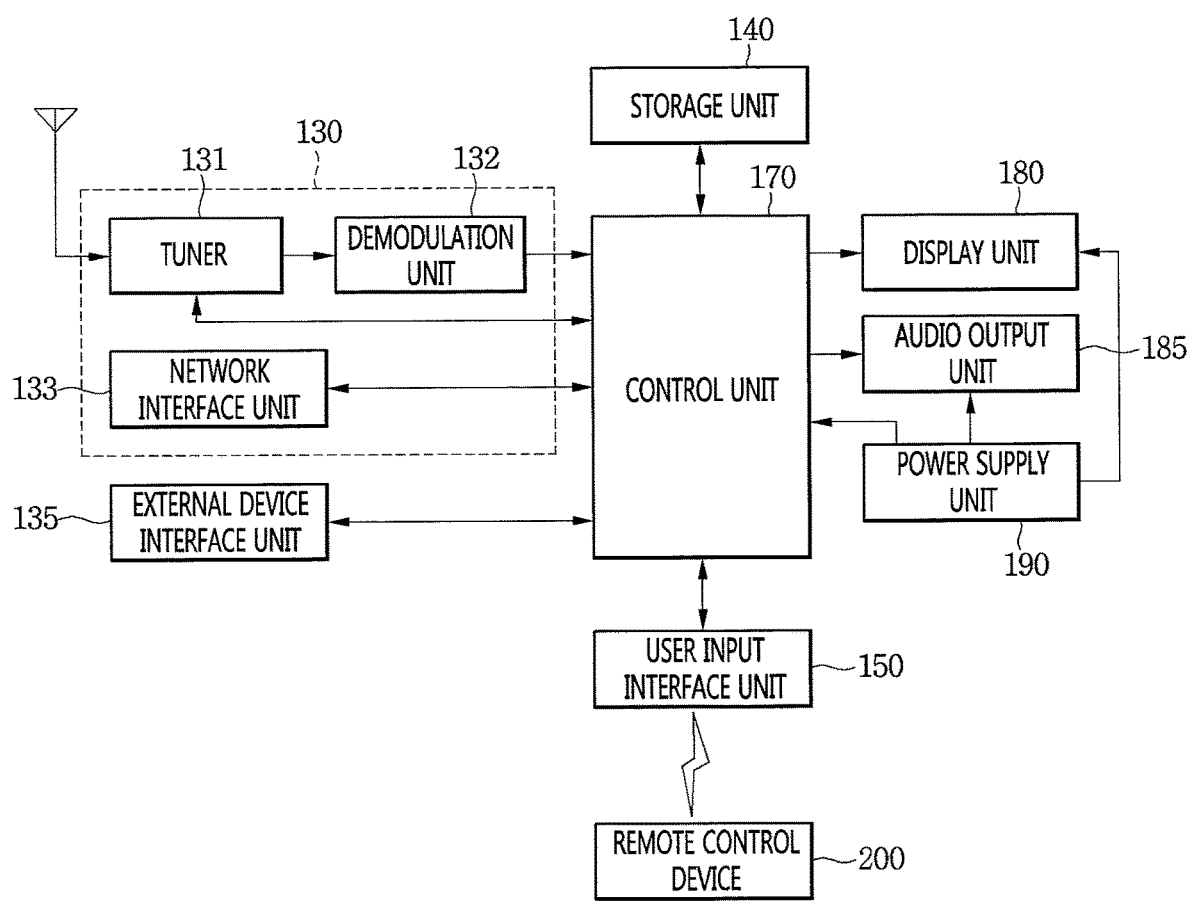
FIG. 1 is a block diagram illustrating a configuration of a terminal according to an embodiment of the present invention.

FIG. 1 is a block diagram illustrating a configuration of a terminal according to an embodiment of the present invention. Referring to FIG. 1, the terminal 100 can include a broadcast reception unit 130, an external device interface unit 135, a storage unit 140, a user input interface unit 150, a control unit 170, a display unit 180, an audio output unit 185, and a power supply unit.

The broadcast reception unit 130 may include a tuner 131, a demodulation unit 132, and a network interface unit 133. The tuner 131 can select a specific broadcast channel according to a channel selection command and receive broadcast signals for the selected specific broadcast channel.

The demodulation unit 132 divides the received broadcast signals into video signals, audio signals, and broadcast program related data signals and restores the divided video signals, audio signals, and data signals to an output available form. The external device interface unit 135 can receive an application or an application list in an adjacent external device and deliver it to the control unit 170 or the storage unit 140.

The external device interface unit 135 can receive at least one of image signal and audio signal from an external device that is wiredly or wirelessly connected to the terminal 100. The network interface unit 133 may provide an interface for connecting the terminal 100 to a wired/wireless network including internet network. The network interface unit 133 can transmit or receive data to or from another user or another electronic device through an accessed network or another network linked to the accessed network.

Additionally, some content data stored in the terminal 100 can be transmitted to a user or an electronic device, which is selected from other users or other electronic devices pre-registered in the terminal 100. The network interface unit 133 may access a predetermined webpage through an accessed network or another network linked to the accessed network. That is, it may transmit or receive data to or from a corresponding server by accessing a predetermined webpage through network, Then, the network interface unit 133 receives content or data provided from a content provider or a network operator. That is, the network interface unit 133 can receive content such as cinema, advertising, game, VOD, and broadcast signal provided from a content provider or a network provider through network and information relating thereto.

Additionally, the network interface unit 133 can receive firmware update information and update files provided from a network operator and transmit data to an internet or content provider or a network operator. The network interface unit 133 can select and receive a desired application among applications open to the air, through network.

Further, the storage unit 140 stores signal-processed image, voice, or data signals stored by a program in order for each signal processing and control in the control unit 170. Additionally, the storage unit 140 can perform a function for temporarily store image, voice, or data signals output from the external device interface unit 135 or the network interface unit 133 and store information on a predetermined image through a channel memory function.

The storage unit 140 can store an application or an application list input from the external device interface unit 135 or the network interface unit 133. The terminal 100 can play contents files (for example, video files, still image files, music files, document files, application files, etc.) stored in the storage unit 140 and provide them to a user.

Further, the user input interface unit 150 can deliver, to the control unit 170, signals input from one of a mouse, a keyboard, and remote control device 200, or deliver signals from the control unit 170 to a user. For example, the user input interface unit 150 can receive and process control signals for power on/off, channel selection, and screen setting from the remote control device 200 according to various communication methods such as a Bluetooth, Ultra Wideband (WB), ZigBee, Radio Frequency (RF) or IR communication method or can transmit control signals from the control unit 170 to the remote control device 200. Additionally, the user input interface unit 150 can deliver control signals input from a local key such as a power key, a channel key, volume key, and a setting value, to the control unit 170.

Image signals image-processed in the control unit 170 can be input to the display unit 180 and displayed as an image corresponding to corresponding image signals. Additionally, image signals image-processed in the control unit 170 can be input to an external output device through the external device interface unit 135.

Voice signals processed in the control unit 170 can be output to the audio output unit 185. Additionally, voice signals processed in the control unit 170 can be input to an external output device through the external device interface unit 135. Besides that, the control module 170 can control overall operations in the terminal 100.

Additionally, the control unit 170 can control the terminal by a user command or internal program input through the user input interface unit 150 and download a desired application or application list into the terminal 100 in access to network. The control unit 170 can output user selected channel information in addition to processed image or voice signals through the display unit 180 or the audio output unit 185.

Additionally, according to an external device image playback command received through the user input interface unit 150, the control unit 170 can output image signals or voice signals of an external device such as a camera or a camcorder, which are input through the external device interface unit 135, through the display unit 180 or the audio output unit 185.

Moreover, the control unit 170 can control the display unit 180 to display images and display broadcast images input through the tuner 131, external input images input through the external device interface unit 135, images input through the network interface unit, or images stored in the storage unit 140, so that they are displayed on the display unit 180. In this instance, an image displayed on the display unit 180 can be a still image or video and also can be a 2D image or a 3D image.

Additionally, the control unit 170 can play content stored in the terminal 100, received broadcast content, and external input content input from the outside, and the content may be in various formats such as broadcast images, external input images, audio files, still images, accessed web screens, and document files.

The display unit 180 can convert image signals, data signals, or OSD signals, which are processed in the control unit 170, or images signals or data signals, which are received in the external device interface unit 135, into R, G, and B signals to generate driving signals.

The terminal 100 can further include a wireless communication unit in order for screen mirroring with an external device. The wireless communication unit can receive information on a screen that an external device displays currently and the control unit 170 can receive the information on the screen to display the screen that the external device displays currently through the display unit 180.

Furthermore, the terminal 100 shown in FIG. 1 is just one embodiment of the present invention and thus, some of the components shown may be integrated, added, or omitted according to the specification of the actually implemented terminal 100. That is, if necessary, two or more components may be integrated into one component or one component may be divided into two or more components and configured. Additionally, a function performed by each block is to describe an embodiment of the present invention and its specific operation or device does not limit the scope of the present invention.

According to another embodiment of the present invention, unlike FIG. 1, the terminal 100 can receive images through the network interface unit 133 or the external device interface unit 135 and play them without including the tuner 131 and the demodulation unit 132. For example, the terminal 100 can be divided into an image processing device such as a set-top box for receiving broadcast signals or contents according to various network services and a content playback device for playing contents input from the image processing device.

In this instance, an operating method of a terminal according to an embodiment of the present invention described below can be performed by one of the terminal described with reference to FIG. 1, an image processing device such as the separated set-top box, and a content playback device including the display unit 180 and the audio output unit 185.

Figure 2:
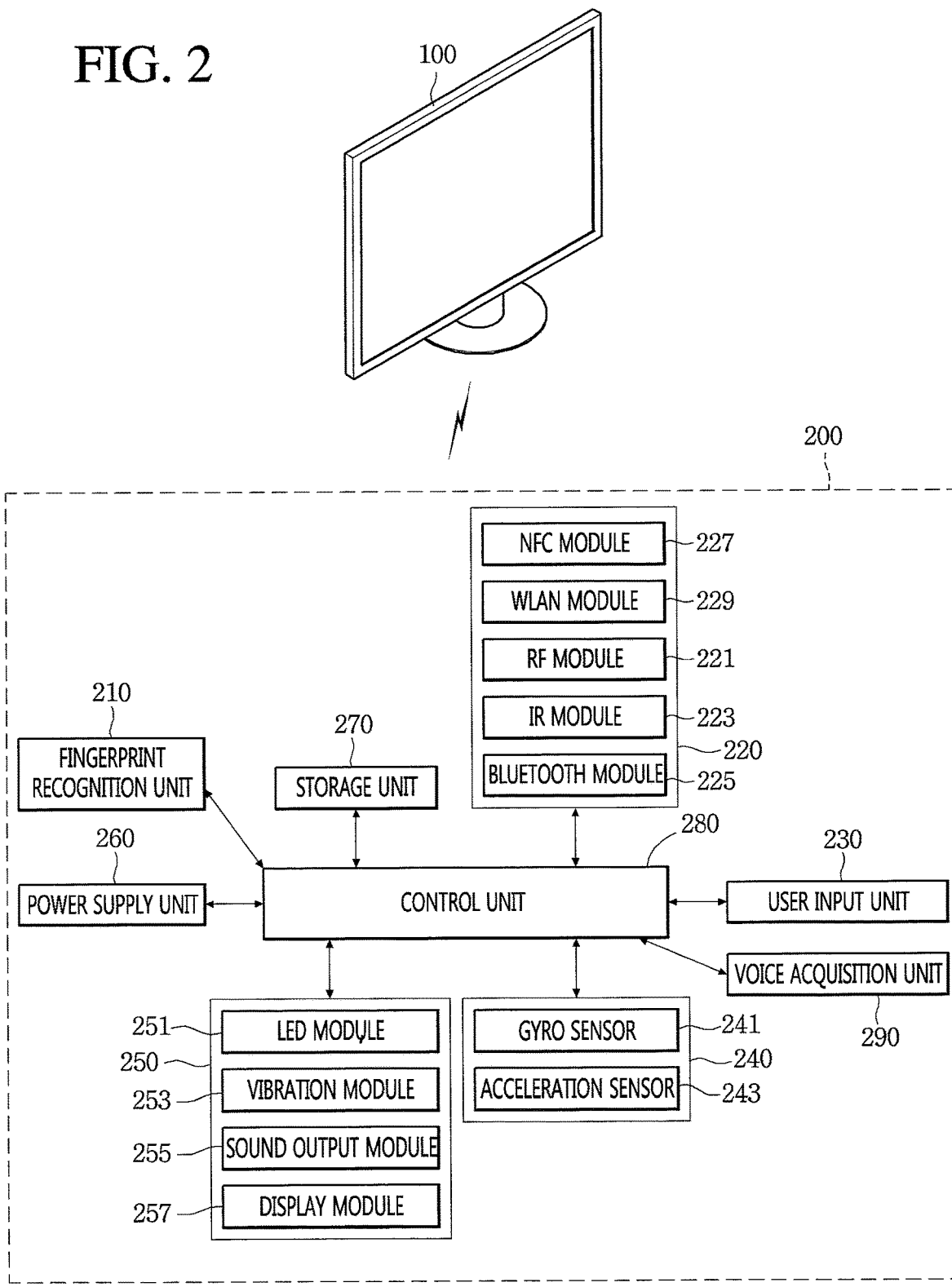
FIG. 2 is a block diagram illustrating a remote control device according to an embodiment of the present disclosure.
Figure 3:
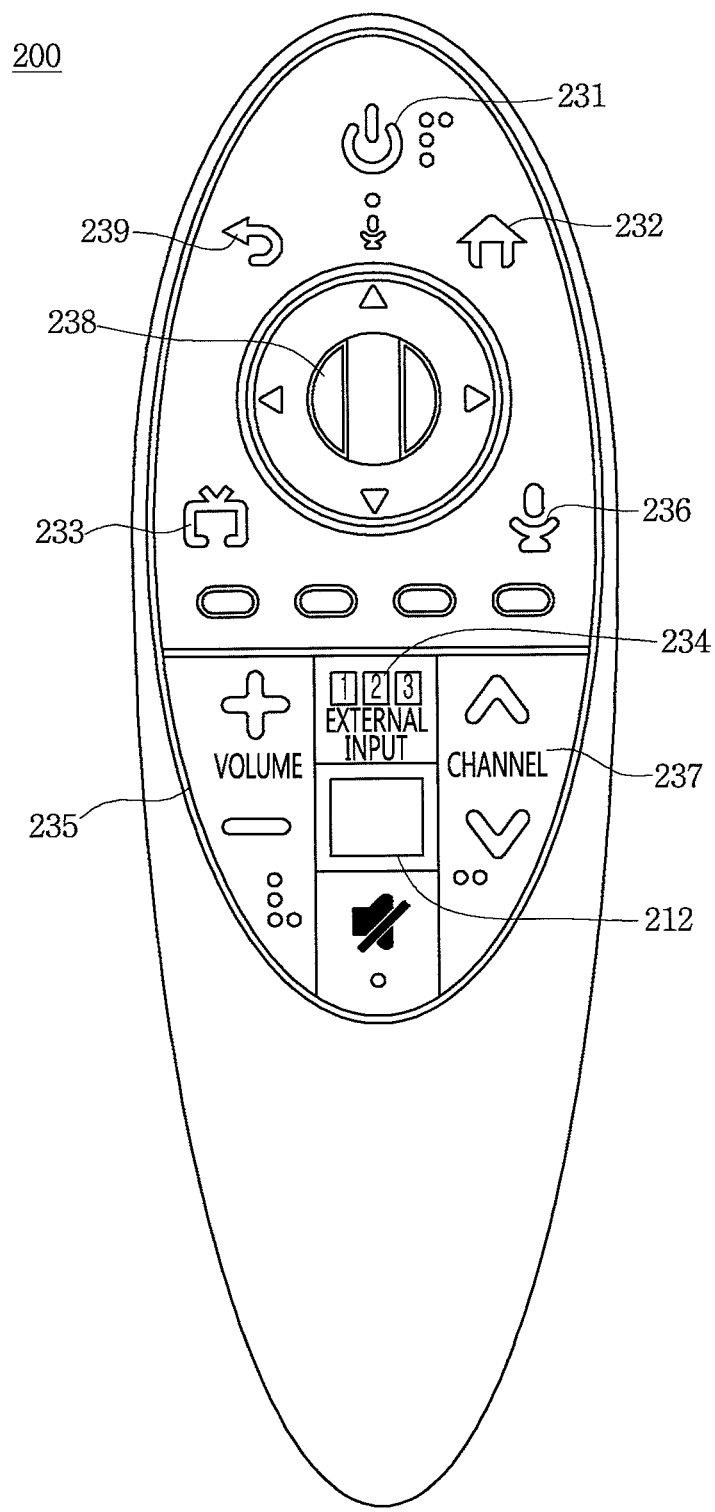
FIG. 3 is a view illustrating an actual configuration of a remote control device according to an embodiment of the present disclosure.

A terminal can receive an input signal through an input device such as a mouse and a keyboard. Then, referring to FIGS. 2 and 3, a remote control device is described according to an embodiment of the present invention. FIG. 2 is a block diagram illustrating a remote control device according to an embodiment of the present invention and FIG. 3 is a view illustrating an actual configuration of a remote control device according to an embodiment of the present invention.

First, referring to FIG. 2, a remote control device 200 may include a fingerprint recognition unit 210, a wireless communication unit 220, a user input unit 230, a sensor unit 240, an output unit 250, a power supply unit 260, a storage unit 270, a control unit 280, and a voice acquisition unit 290. Referring to FIG. 2, the wireless communication unit 225 transmits/receives signals to/from an arbitrary any one of terminals according to the above-mentioned embodiments of the present invention.

The remote control device 200 may include an RF module 221 for transmitting/receiving signals to/from the terminal 100 according to the RF communication standards and an IR module 223 for transmitting/receiving signals to/from the terminal 100 according to the IR communication standards. Additionally, the remote control device 200 may include a Bluetooth module 225 for transmitting/receiving signals to/from the terminal 100 according to the Bluetooth communication standards. Additionally, the remote control device 200 may include an NFC module 227 for transmitting/receiving signals to/from the terminal 100 according to the Near Field Communication (NFC) communication standards and a WLAN module 229 for transmitting/receiving signals to/from the terminal 100 according to the Wireless LAN (WLAN) communication standards Additionally, the remote control device 200 may transmit signals containing information on a movement of the remote control device 200 to the terminal 100 through the wireless communication unit 220. Moreover, the remote control device 200 may receive signals transmitted from the terminal 100 through the RF module 221 and if necessary, may transmit a command on power on/off, channel change, and volume change to the terminal 100 through the IR module 223.

The user input unit 230 may be configured with a keypad button, a touch pad, or a touch screen. A user can manipulate the user input unit 230 to input a command relating to the terminal 100 to the remote control device 200. If the user input unit 230 includes a hard key button, a user can input a command relating to the terminal 100 to the remote control device 200 through the push operation of the hard key button. This will be described with reference to FIG. 3.

Referring to FIG. 3, the remote control device 200 may include a plurality of buttons. The plurality of buttons may include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 may be a button for recognizing a user's fingerprint. According to an embodiment of the present invention, the fingerprint recognition button 212 may perform a push operation and receive a push operation and a fingerprint recognition operation. The power button 231 may be button for turning on/off the power of the terminal 100. The power button 232 may be button for moving to the home screen of the terminal 100. The live button 233 may be a button for displaying live broadcast programs. The external input button 234 may be button for receiving an external input connected to the terminal 100. The voice adjustment button 235 may be button for adjusting the size of a volume output from the terminal 100. The voice recognition button 236 may be a button for receiving user's voice and recognizing the received voice. The channel change button 237 may be a button for receiving broadcast signals of a specific broadcast channel. The check button 238 may be a button for selecting a specific function and the back button 239 may be a button for returning to a previous screen.

Again, FIG. 2 is described. If the user input unit 230 includes a touch screen, a user can touch a soft key of the touch screen to input a command relating to the terminal 100 to the remote control device 200. Additionally, the user input unit 230 may include various kinds of input means manipulated by a user, for example, a scroll key and a jog key, and this embodiment does not limit the scope of the present invention.

The sensor unit 240 may include a gyro sensor 241 or an acceleration sensor 243 and the gyro sensor 241 may sense information on a movement of the remote control device 200. For example, the gyro sensor 241 may sense information on an operation of the remote control device 200 based on x, y, and z axes and the acceleration sensor 243 may sense information on a movement speed of the remote control device 200. Moreover, the remote control device 200 may further include a distance measurement sensor and sense a distance with respect to the display unit 180 of the terminal 100.

The output unit 250 may output image or voice signals corresponding to a manipulation of the user input unit 235 or corresponding to signals transmitted from the terminal 100. A user can recognize whether the user input unit 235 is manipulated or the terminal 100 is controlled through the output unit 250. For example, the output unit 250 may include an LED module 251 that is flashing, a vibration module 253 that generates vibration, a sound output module 255 that outputs sound, or a display module 257 that outputs an image, if the user input unit 235 is manipulated or signals are transmitted/received to/from the terminal 100 through the wireless communication unit 225.

Additionally, the power supply unit 260 supplies power to the remote control device 200 and if the remote control device 200 does not move for a predetermined time, stops the power supply, so that power waste may be reduced. The power supply unit 260 may resume the power supply if a predetermined key provided at the remote control device 200 is manipulated.

The storage unit 270 may store various kinds of programs and application data necessary for a control or operation of the remote control device 200. If the remote control device 200 transmits/receives signals wirelessly through the terminal 100 and the RF module 221, the remote control device 200 and the terminal 100 transmits/receives signals through a predetermined frequency band.

The control unit 280 of the remote control device 200 may store, in the storage unit 270, information on a frequency band for transmitting/receiving signals to/from the terminal 100 paired with the remote control device 200 and refer to it. The control unit 280 controls general matters relating to a control of the remote control device 200. The control unit 280 may transmit a signal corresponding to a predetermined key manipulation of the user input unit 235 or a signal corresponding to a movement of the remote control device 200 sensed by the sensor unit 240 to the terminal 100 through the wireless communication unit 225.

Additionally, the voice acquisition unit 290 of the remote control device 200 may obtain voice. The voice acquisition unit 290 may include at least one microphone 291 and obtain voice through the microphone 291.

Figure 4:
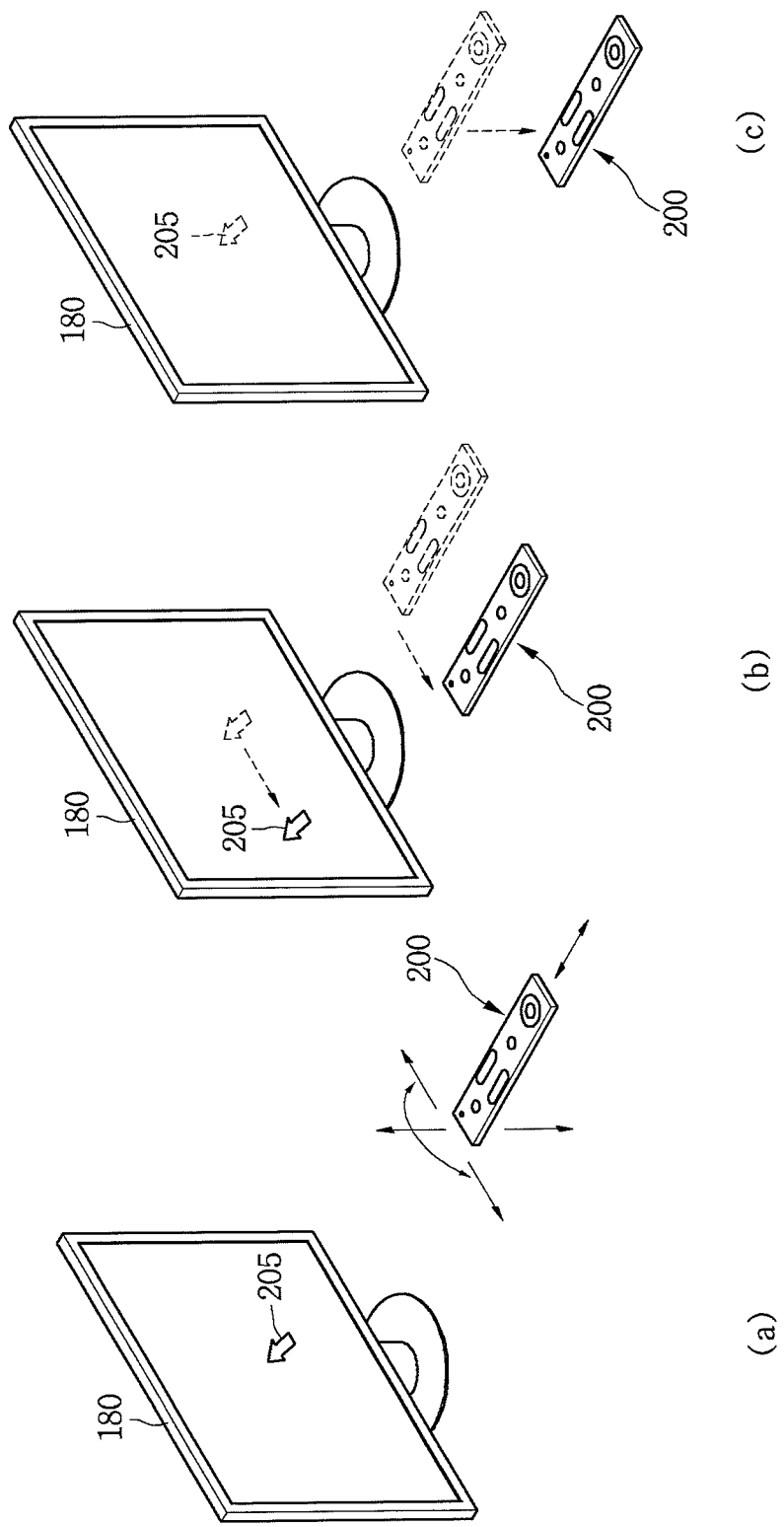
FIG. 4 is a view of utilizing a remote control device according to an embodiment of the present invention.

Next, FIG. 4 is described. FIG. 4 is a view of utilizing a remote control device according to an embodiment of the present invention. FIG. 4(a) illustrates that a pointer 205 corresponding to the remote control device 200 is displayed on the display unit 180. Hereinafter, it is described that the pointer 205 corresponds to the remote control device 200 but the present invention is not limited thereto and may correspond to an input device such as a mouse.

A user can move or rotate the remote control device 200 vertically or horizontally. The pointer 205 displayed on the display unit 180 of the terminal 100 corresponds to a movement of the remote control device 200. Since the corresponding pointer 205 is moved and displayed according to a movement on a 3D space as show in the drawing, the remote control device 200 may be referred to as a spatial remote controller.

FIG. 4(b) illustrates that if a user moves the remote control device 200, the pointer 205 displayed on the display unit 180 of the terminal 100 is moved to the left in correspondence thereto. Information on a movement of the remote control device 200 sensed through a sensor of the remote control device 200 is transmitted to the terminal 100. The coordinates of the pointer 205 may be calculated from the information on the movement of the remote control device 200. The terminal 100 can display the pointer 205 to match the calculated coordinates.

FIG. 4(c) illustrates that while a specific button in the remote control device 200 is pressed, a user moves the remote control device 200 away from the display unit 180. Thus, a selection area in the display unit 180 corresponding to the pointer 205 may be zoomed in and displayed enlarged. Further, if a user moves the remote control device 200 close to the display unit 180, a selection area in the display unit 180 corresponding to the pointer 205 may be zoomed out and displayed reduced.

Further, if the remote control device 200 is away from the display unit 180, a selection area may be zoomed out and if the remote control device 200 is close to the display unit 180, a selection area may be zoomed in. Additionally, if a specific button in the remote control device 200 is pressed, the recognition of a vertical or horizontal movement may be excluded. That is, if the remote control device 200 is moved to be away from or close to the display unit 180, the up, down, left, or right movement may not be recognized and only the back and forth movement may be recognized. While a specific button in the remote control device 200 is not pressed, only the pointer 205 is moved according to the up, down, left or right movement of the remote control device 200.

Moreover, the moving speed or moving direction of the pointer 205 may correspond to the moving speed or moving direction of the remote control device 200. Furthermore, a pointer in this specification means an object displayed on the display unit 180 in correspondence to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 may be displayed in correspondence to one point of a horizontal axis and a vertical axis on the display unit 180 and also may be displayed in correspondence to a plurality of points such as a line and a surface.

Figure 5:
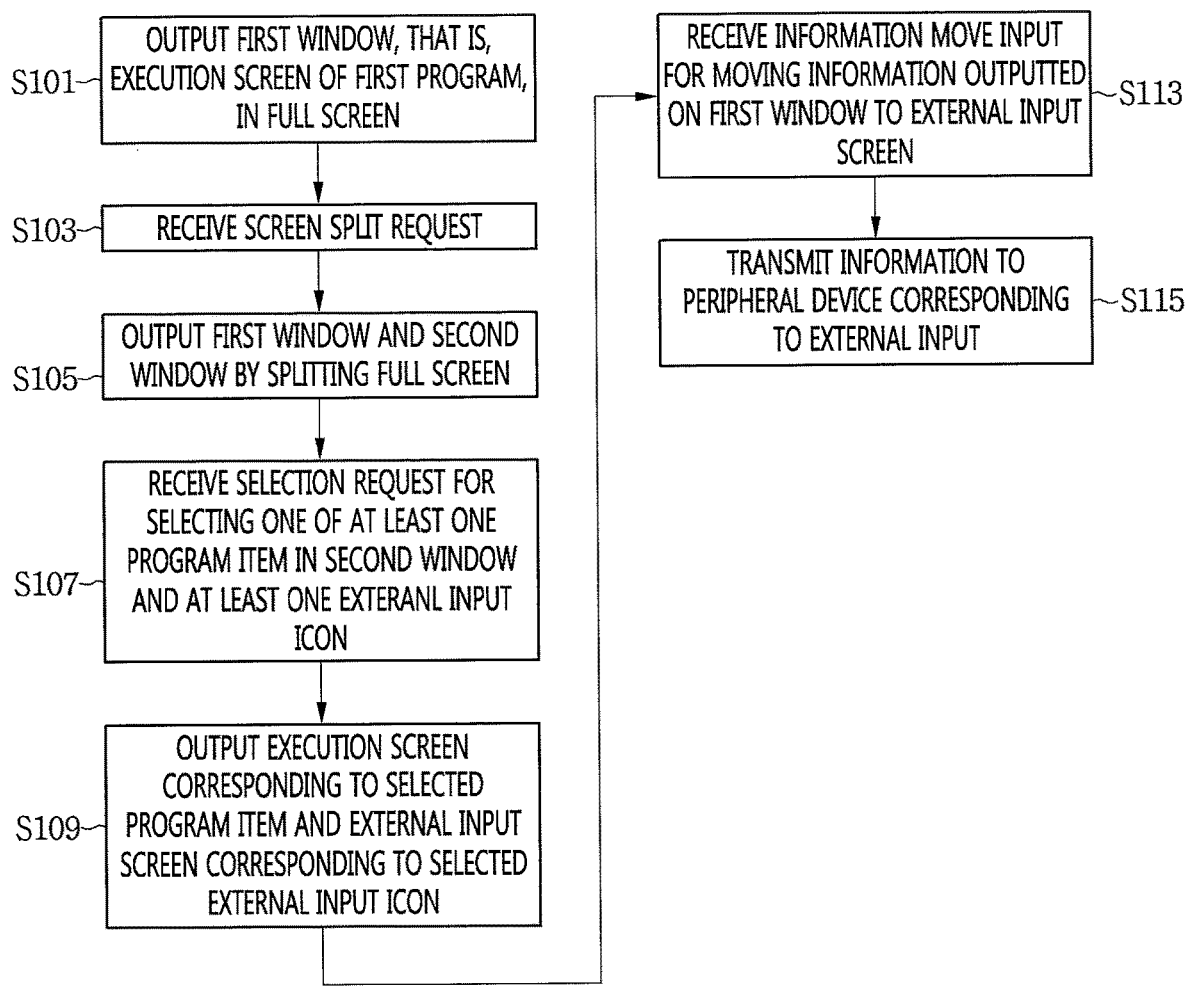
FIG. 5 is a flowchart illustrating an operating method of a terminal according to an embodiment of the present invention.

Next, an operating method of a terminal according to an embodiment of the present invention will be described with reference to FIG. 5. In particular, FIG. 5 is a flowchart illustrating an operating method of a terminal according to an embodiment of the present invention.

As shown, the control unit 170 of the terminal 100 outputs a first window representing the execution screen of a first program to the full screen of the display unit 180 in operation S101. According to an embodiment of the present invention, a program may correspond to one of an application program and application installed on the terminal 100.

Then, the control unit 170 receives a screen split request for splitting the full screen into a first area and a second area in operation S103 and outputs a first window to the first area of the full screen and outputs a second window to the second area according to the received screen split request in operation S105.

According to an embodiment of the present invention, a screen split request may be a request for splitting the full screen of the display unit 180 into first and second areas each having the same area but is not limited thereto. That is, the first area and the second area may be different from each other. A second window may also be a multitasking screen for providing a multitasking environment to a user.

According to an embodiment of the present invention, a program list representing other programs other than a first program and an external input list representing external inputs that are wiredly or wirelessly connected to the terminal 100 can be included on the second window. According to another embodiment of the present invention, a screen of a peripheral device that is wiredly or wirelessly connected to the terminal 100 can be output on the second window. This will be described later.

Figure 6:
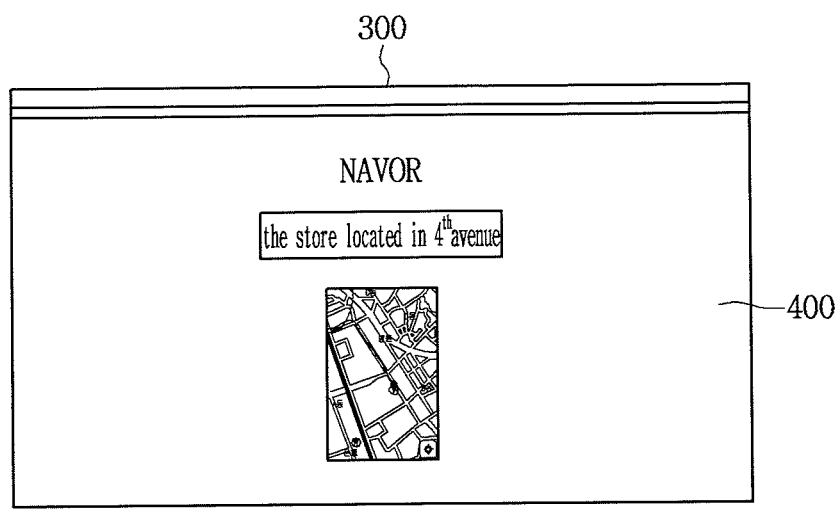
FIG. 6 is a view illustrating that an execution screen of a first program is output in full screen according to an embodiment of the present invention.

Hereinafter, operation S101 to operation S105 will be described. In particular, FIG. 6 is a view illustrating that the execution screen of a first program is output in full screen according to an embodiment of the present invention. Referring to FIG. 6, the control unit 170 can control the display unit 180 to display a first window 400 corresponding to the execution screen of the first program on the full screen 300. For example, an access screen of a website may be provided to the first window 400.

Figure 7:
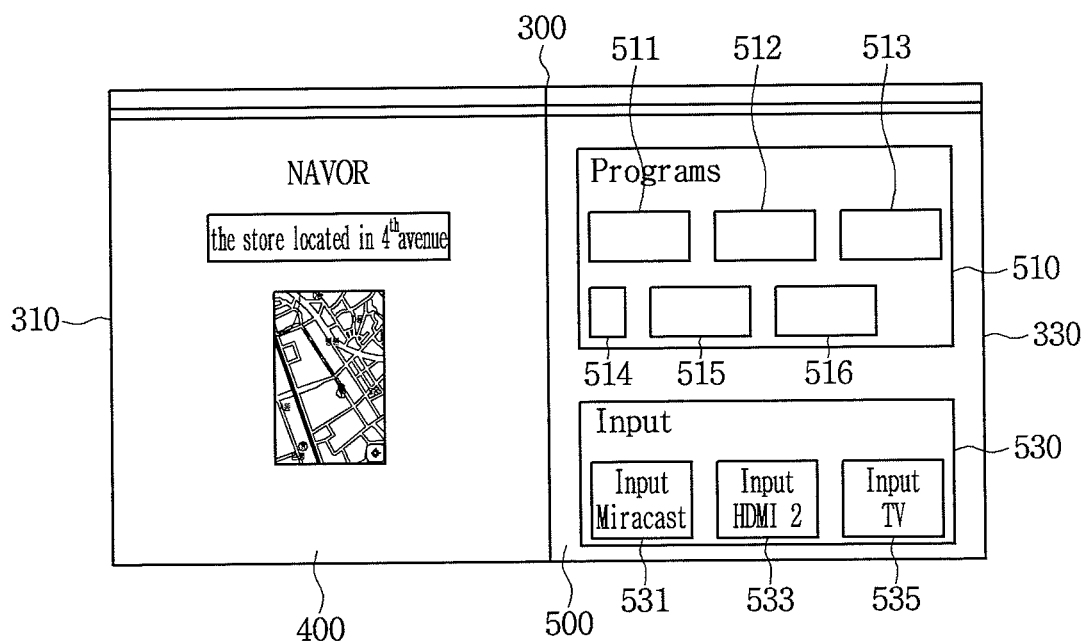
FIG. 7 is a view illustrating that a full screen is divided into a first area and a second area to additionally output a second window according to an embodiment of the present invention.

Next, FIG. 7 is described. In particular, FIG. 7 is a view illustrating that a full screen is divided into a first area and a second area to additionally output a second window according to an embodiment of the present invention. If a screen split request is received in the state of FIG. 6, the control unit 170, as shown in FIG. 7, can split the full screen 300 into a first area 310 and a second area 330.

According to an embodiment of the present invention, if the terminal 100 is one of a PC and a notebook, a screen split request can be generated by an input that simultaneously presses a control key and a tap key provided at a keyboard. Further, the screen split request being generated by simultaneously pressing a control key and a tap key is just an example, and the screen split request can vary according to a user's setting.

According to another embodiment of the present invention, if the terminal 100 is a TV such as a smart TV, a screen split request can be generated by an input that presses a specific button provided at the remote control device 200. Further, the control unit 170 can control the display unit 180 to display a first window 400 for representing the execution screen of a first program in the first area 310 and display a second window 500 for providing a multitasking environment in the second area 320. The size of the first window 400 may also be reduced to fit the size of the first area 310.

In FIG. 7, the first area 310 and the second area 330 are the same but this is just exemplary and each area may be different. Further, a program list 510 and an external input list 530 can be displayed on the second window 500. The program list 510 may include program items 511 to 516.

According to an embodiment of the present invention, each program item may represent a recent execution screen corresponding to a recently executed program or a thumbnail image corresponding to a recently executed program. The program items 511 to 516 may also be displayed in order according to a recently executed time point. That is, the first program item 511 is an item corresponding to the most recently executed program and the second program item 512 to the sixth program item 516 may follow it.

According to another embodiment of the present invention, each program item may represent a favorite execution screen corresponding to programs registered as favorite or a thumbnail image corresponding to programs registered as favorite.

In addition, the external input list 530 may include at least one external input icon. Each external input icon may represent an external input that is wirelessly or wiredly connected to the terminal 100. For example, the first external input icon 531 may be an icon for representing an external input connected through a screen mirroring technique. The screen mirroring technique is a technique for sharing a screen between terminals by transmitting data through short range wireless communication technique such as Wi-Fi and Bluetooth.

The second external input icon 533 may be an icon for representing an external input connected through the High Definition Multimedia Interface (HDMI) standards. Further, the third external input icon 535 may be an icon for representing a wiredly or wireless connected TV. In addition, the external input list 530 may further include external input icons for representing a peripheral device such as a terminal for transmitting media content through the wireless display (Wi-Di), for example, a DVR, Blu-ray player, and USB memory connected to the terminal 100.

At least one of a name for identifying an external input, a thumbnail image of recently played media content through an external input, and a name of an external input peripheral device may be displayed on each external input icon. The name for identifying an external input may include a name of an external input terminal.

As another example, an image output from an external device corresponding to an external input icon may be disposed at a position corresponding to an area where each external input icon is displayed. Further, a corresponding image may be a captured image and stored in the storage unit 140. A corresponding image may also be obtained if an image output through an external device is displayed on the full screen of the display unit 180 for more than a predetermined time.

The external input icons 531 to 535 may be disposed in order according to a time point that they are recently connected to the terminal 100. For example, the first external input icon 531 is an icon of an external input that is most recently connected to the terminal 100 and the second external input icon 533 and the third external input icon 535 may follow it.

According to another embodiment, thumbnail images of media content played through an external input instead of an external input icon may be displayed in the external input list 530. According to still another embodiment, thumbnail images of media content played through an external input may be displayed on respective input icons.

Referring again to FIG. 5, the control unit 170 of the terminal 100 receives a selection request for selecting one of at least one program item for representing a program included on the output second window 500 and at least one external input icon for representing an external input in operation S107 and outputs at last one of a first window that is the execution screen corresponding to the program item selected according to the received selection request and a second window that is an external input screen corresponding to the selected external input icon in operation S109.

Figure 8:
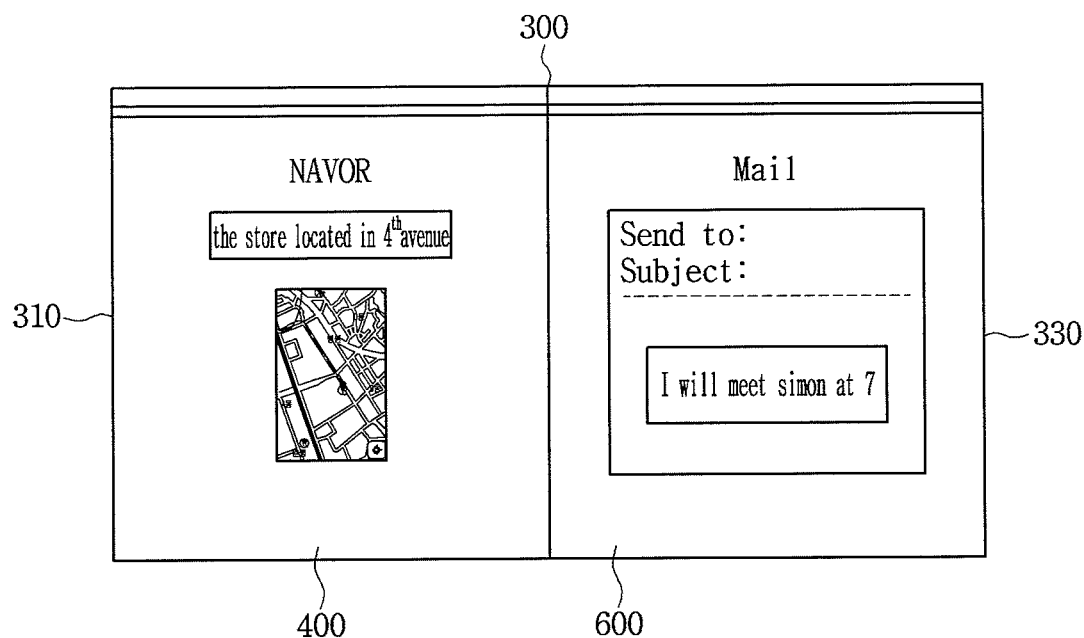
FIGS. 8 and 9 are views illustrating a screen provided if at least one program item is selected from a program list on a second window according to an embodiment of the present invention.
Figure 9:
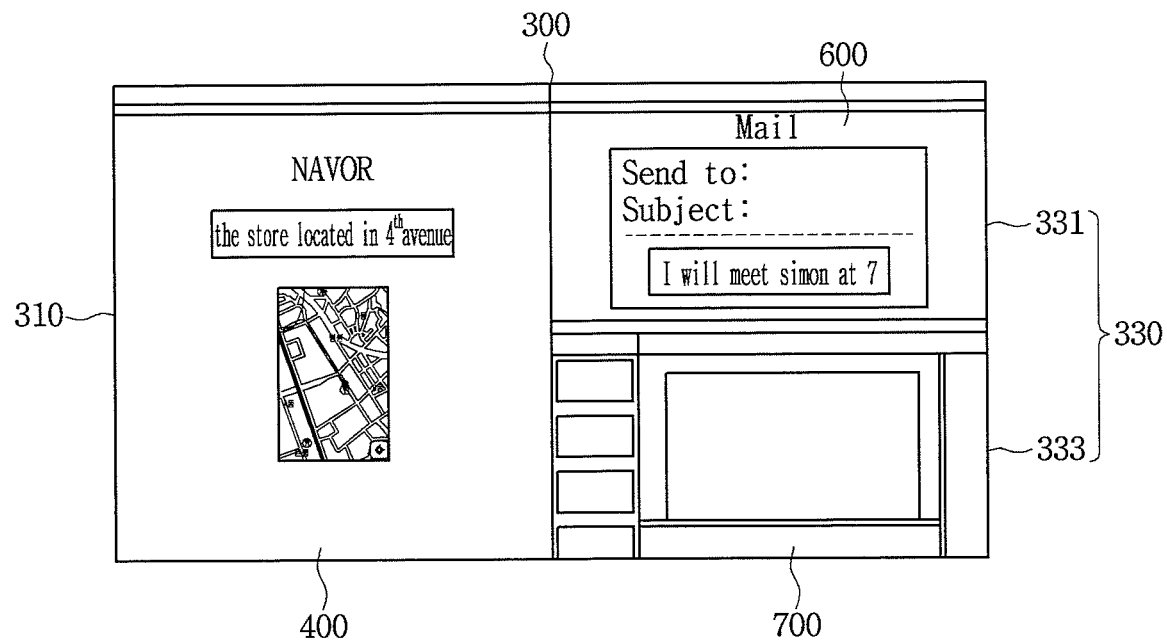

Hereinafter, operation S107 to operation S109 will be described in detail. In particular, FIGS. 8 and 9 are views illustrating a screen provided if at least one program item is selected from a program list on a second window according to an embodiment of the present invention. That is, FIG. 8 is a view illustrating a screen provided if at least one program item is selected from a program list, and FIG. 9 is a view illustrating a screen provided if two program items are selected from a program list.

As shown in FIG. 8, if a request for selecting a first program item 511 from the program list 510 of FIG. 7 is received, the control unit 170 can control the display unit 180 to display a third window 600, which is the execution screen of a program corresponding to the first program item 511, in a second area 330. In this instance, the second window 500 displayed in the second area 330 may not be displayed due to the third window 600.

That is, the third window 600 can be displayed superimposed on the second window 500. According to an embodiment of the present invention, if the terminal 100 is one of a PC and a notebook, a request for selecting the first program item 511 can be generated by a click input of a mouse or an input that simultaneously presses a control key and a tap key provided on a keyboard. According to another embodiment of the present invention, if the terminal 100 is a TV, a request for selecting the first program item 511 can be performed through the remote control device 200. Thus, a user can perform multitasking by easily executing another program through information on programs displayed on the second window 500.

As shown in FIG. 9, if a request for selecting the first program item 511 and a second program item 512 from the program list 510 is received, the control unit 170 can control the display unit 180 to display the third window 600 that is the execution screen of the program corresponding to the first program item 511 and a fourth window 700 that is the execution screen of a program corresponding to the second program item 512, in the second area 330.

If a request for selecting the first program item 511 and the second program item 512 at the same time is received, the second area can be divided into a first sub area 331 and a second sub area 333. The third window 600 can also be displayed on the first sub area 311 and the fourth window 700 can be displayed on the second sub area 700. In this instance, the second window 500 displayed in the second area 330 may not be displayed due to the fourth window 700.

The third window 600 and the fourth window 700 may also be displayed superimposed on the second window 500.

According to an embodiment of the present invention, if the terminal 100 is a PC or a notebook, a request for selecting the first program item 511 and the second program item 512 can be generated by an input for selecting the first program item 511 and the second program item 512 by pressing a control key on a keyboard and clicking a mouse. According to another embodiment of the present invention, if the terminal 100 is a TV, a request for selecting the first program item 511 and the second program item 512 can be performed through the remote control device 200.

Thus, a user can perform multitasking by easily executing another program through information on programs displayed on the second window 500. According to another embodiment of the present invention, a second window for providing a multitasking environment may be output again while the execution screens of programs are displayed. Further, the execution screen of another program may be output additionally through the output second window.

Figure 12:
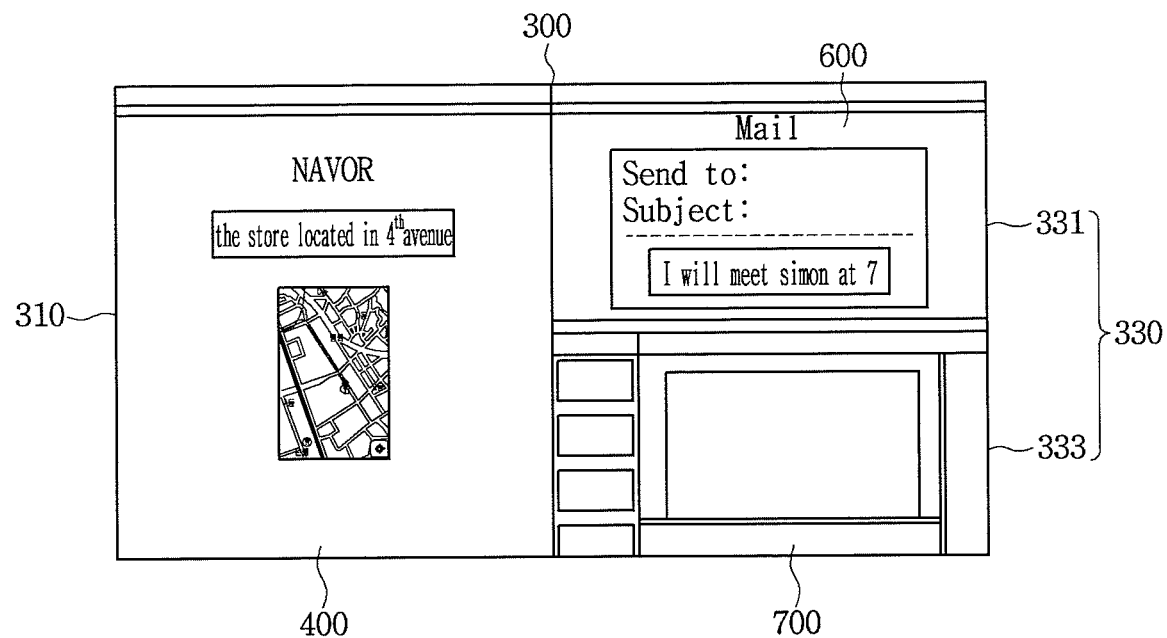

This will be described with reference to FIGS. 10 to 12. In particular, FIGS. 10 to 12 are views of outputting the execution screen of another program additionally through a second window for providing a multitasking environment according to an embodiment of the present invention.

FIG. 10(a) is identical to FIG. 8. If a second window output request for outputting the second window 500 to provide a multitasking environment is received as shown in FIG. 10(a), the control unit 170, as shown in FIG. 10(b), can control the display unit 180 to additionally display the second window 500 in a full screen 300. Herein, it is assumed that the full screen 300 includes a fourth area 351, a fifth area 353, and a sixth area 355.

The control unit 170 can control the display unit 180 to display a first window 400 that is the execution screen of a program corresponding to a first program in the fourth area 351 of the full screen 300, display the execution screen of a program corresponding to the first program item in the fifth area 353, and display the second window 500 in the sixth area 355. If a third program item is selected on the second window 500, the control unit 170 can control the display unit 180 to display the execution screen of a program corresponding to a third program item in the sixth area 355.

Figure 10:
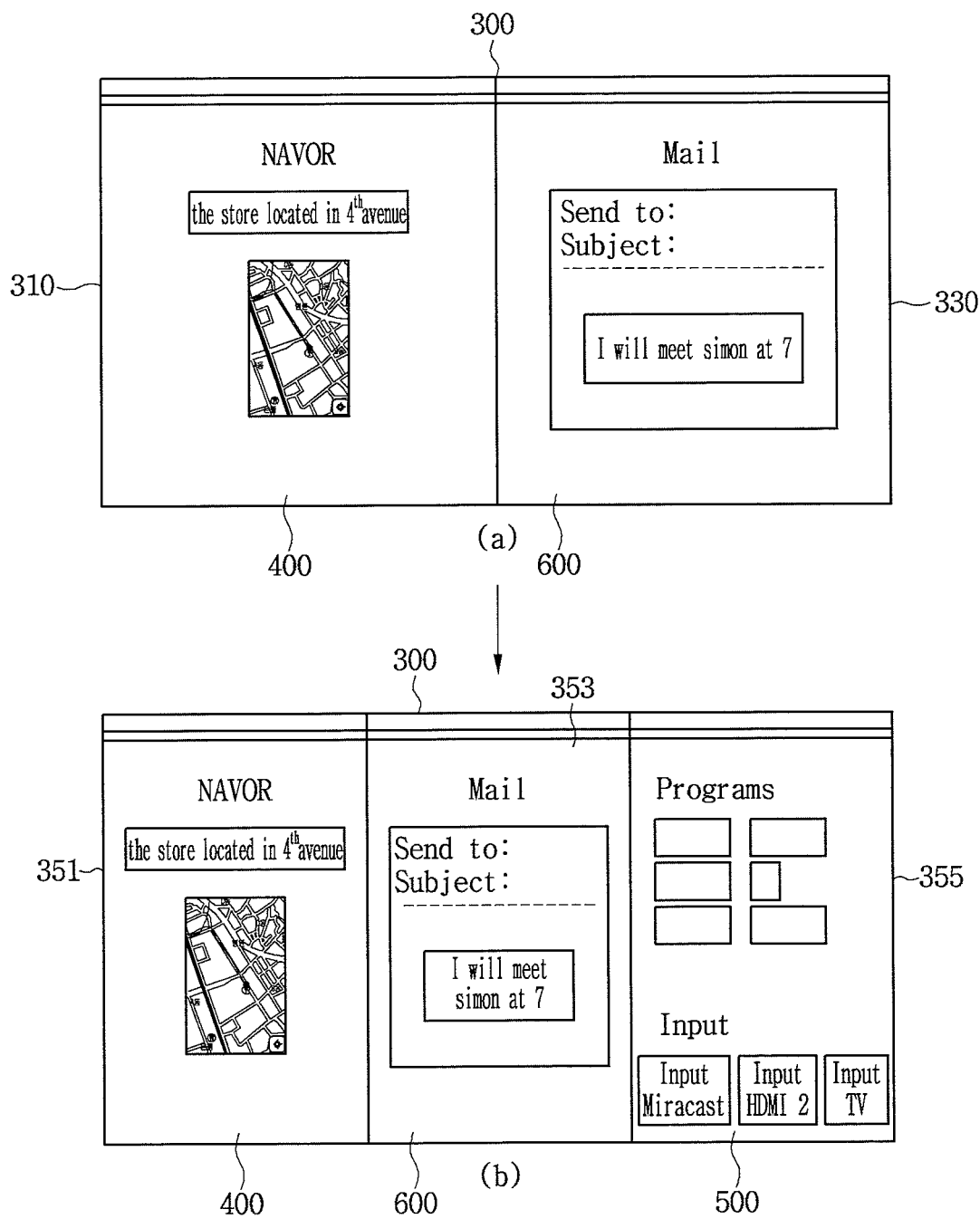

According to an embodiment of the present invention, if the terminal 100 is one of a PC and a notebook, a request for outputting the second window 500 in FIG. 10 can be generated by an input that simultaneously presses a control key and a tap key provided at a keyboard. According to another embodiment of the present invention, if the terminal 100 is a TV such as a smart TV, a request for outputting the second window 500 can be generated by an input that presses a specific button provided at the remote control device 200.

Next, FIG. 11 is described. In particular, FIG. 11(a) is identical to FIG. 10(b). If a layout change request for changing the layout of screens configuring the full screen 300 is received in FIG. 11(a), the control unit 170, as shown in FIG. 11(b), can change the layout of the first window 400, the second window 500, and the third window 600. That is, according to the layout change request, the control unit 170 can control the display 180 to display the first window 400 in the first area 310, the third window 600 in the first sub area 331 of the second area 330, and the second window 500 in the second sub area 333 of the second area 330.

According to an embodiment of the present invention, if the terminal 100 is a PC or a notebook, a layout change request can be generated by an input that simultaneously presses a control key and a direction key provided at a keyboard. According to another embodiment of the present invention, if the terminal 100 is a TV, a layout change request can be received through the remote control device 200.

Next, FIG. 12 is described. If the third program item 513 is selected on the second window 500 in FIG. 11(b), the control unit 170 can control the display unit 180 to display the fourth window 700 that is the execution screen of a program corresponding to the selected third program item 513 in the second sub area 333 of the second area 330.

Figure 13:
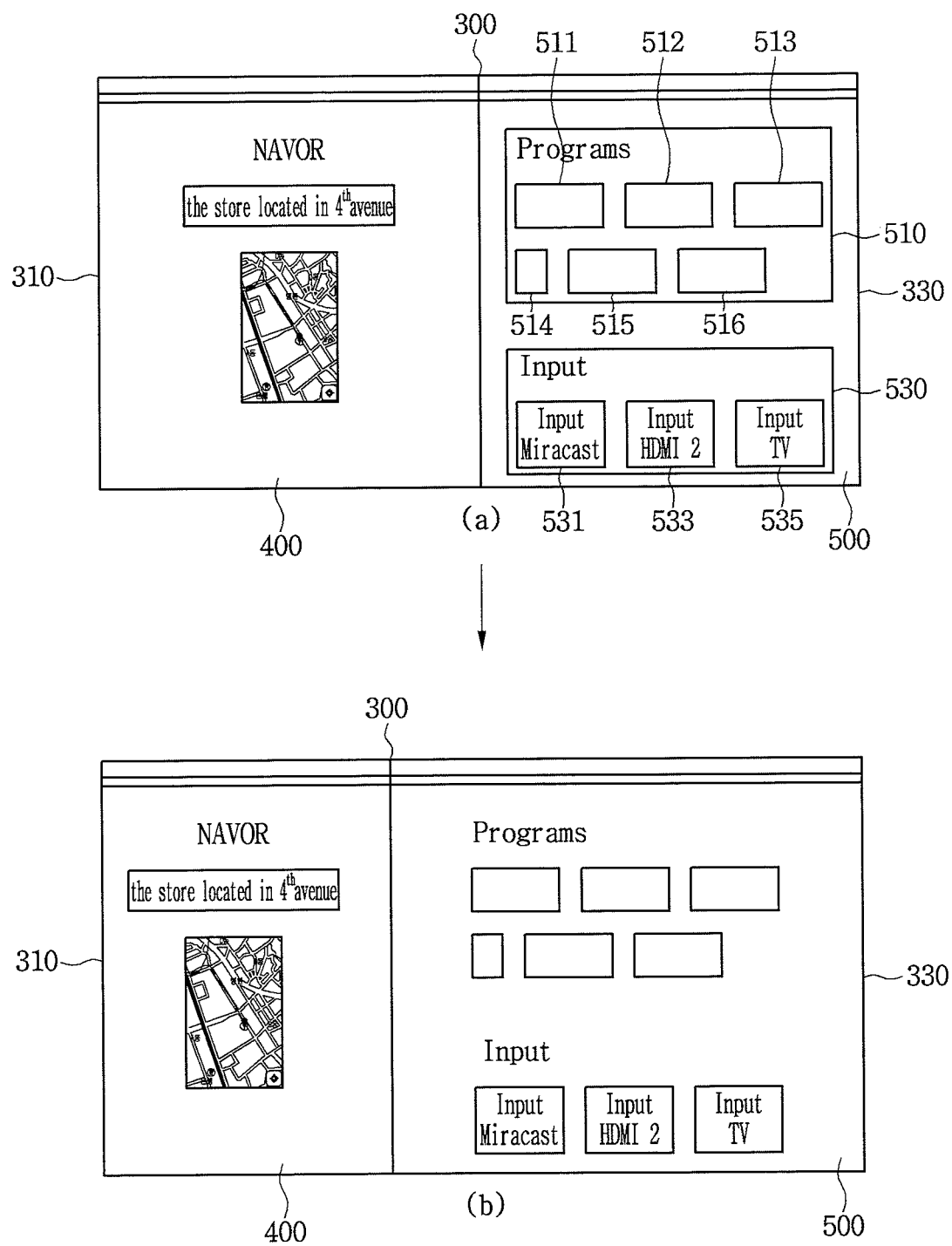
FIGS. 13 and 14 are views of changing a layout that configures a full screen and performing multitasking through the changed layout.
Figure 14:
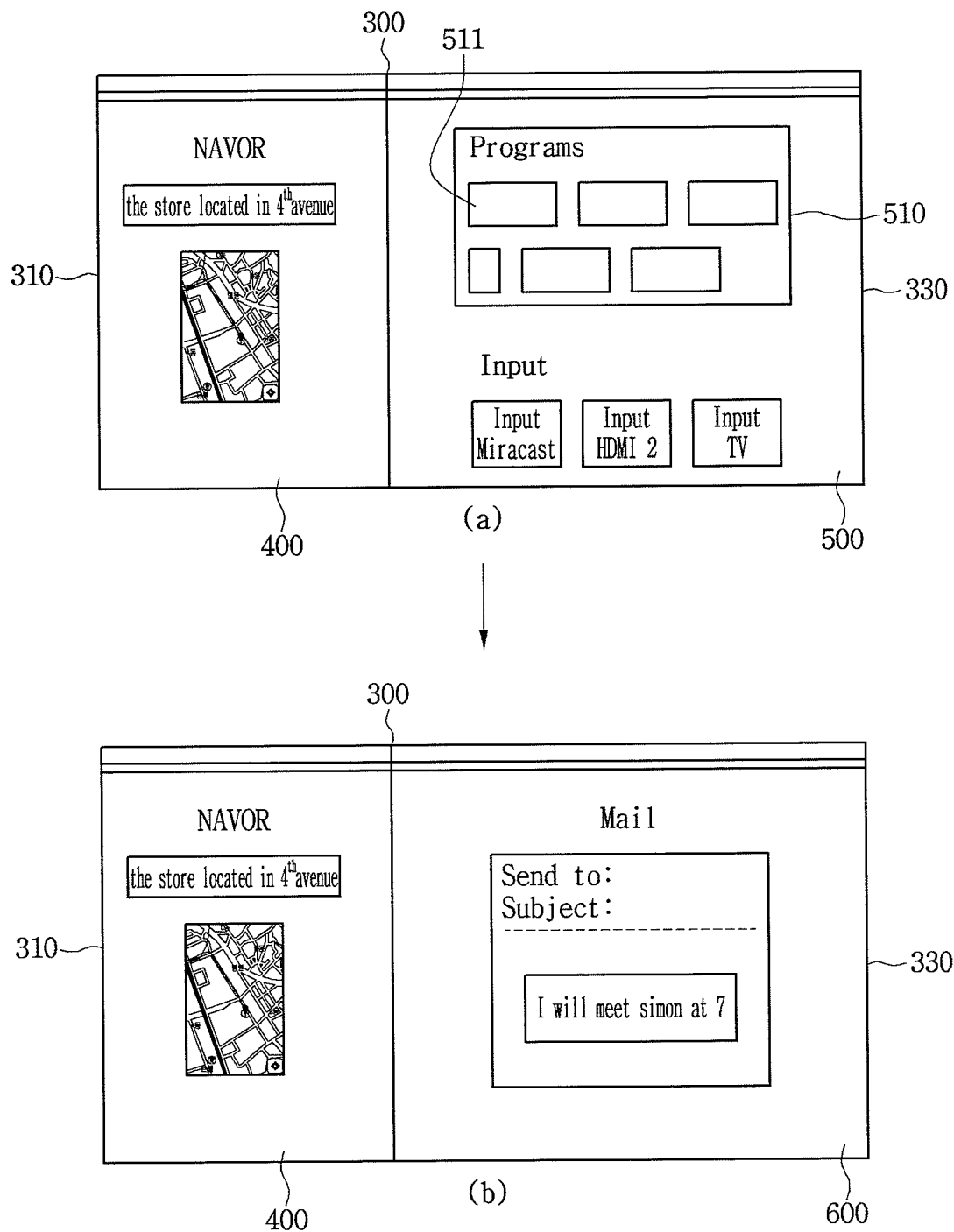

Then, referring to FIGS. 13 and 14, a process for changing a layout that configures the full screen 300 and performing multitasking through the changed layout is described. In particular, FIGS. 13 and 14 are views of changing a layout that configures a full screen and performing multitasking through the changed layout.

FIG. 13(a) is identical to FIG. 7. If a layout enlargement request for enlarging a layout is received in FIG. 13(a), the control unit 170, as shown in FIG. 13(b), can enlarge the size of the second area 330 and reduce the size of the first area 310. Accordingly, the size of the first window 400 can be reduced by the reduced size of the first area 310 and the size of the second window 500 can be enlarged by the enlarged size of the second area 330.

According to an embodiment of the present invention, if the terminal 100 is a PC or a notebook, a layout enlargement request can be generated by an input that simultaneously presses a control key, a shift key, and a left direction key provided at a keyboard. According to another embodiment of the present invention, if the terminal 100 is a TV, a layout enlargement request can be received through the remote control device 200.

Moreover, if an input that simultaneously presses a control key, a shift key, and a right direction key provided at a keyboard is received, the control unit 170 can reduce the horizontal length of the second window 500. Moreover, if an input that simultaneously presses a control key, a shift key, and an up direction key provided at a keyboard is received, the control unit 170 can increase the vertical length of the second window 500. Moreover, if an input that simultaneously presses a control key, a shift key, and a down direction key provided at a keyboard is received, the control unit 170 can reduce the vertical length of the second window 500.

FIG. 14(a) is identical to FIG. 13(b). If a request for selecting the first program item 511 included in the program list 510 is received, the control unit 170 can control the display unit 180 to display the third window 600, which is the execution screen of a program corresponding to the selected first program item 511, in the enlarged second area 330.

Next, description will be made on a screen provided if an external input icon for screen mirroring is selected from an external input list on the second window. In particular, FIGS. 15 and 16 are views illustrating a screen provided if an external input icon for screen mirroring is selected from an external input list on a second window according to an embodiment of the present invention.

If a request for selecting a first external input icon 531 for screen mirroring from an external input list 530 output to the second window 500 is received in FIG. 15(a), the control unit 170, as shown in FIG. 15(b), can control the display unit 180 to display a screen mirroring list screen 800 in the second area 330 of the full screen 300. According to an embodiment of the present invention, the screen mirroring list screen 800 may include a mobile terminal list 810 including mobile terminals that share a screen in current connection to the terminal 100. The mobile terminal list 810 may include at least one of the name of each mobile terminal and a user name of each mobile terminal.

According to another embodiment of the present invention, the screen mirroring list screen 800 may include a mobile terminal list 810 including a mobile terminal connected to the terminal 100 currently and a mobile terminal connected to the mobile terminal 100 before. If at least one mobile terminal is selected from the mobile terminal list 810, the terminal 100 can perform screen mirroring with the at least one selected mobile terminal. This will be described later.

Figure 16:
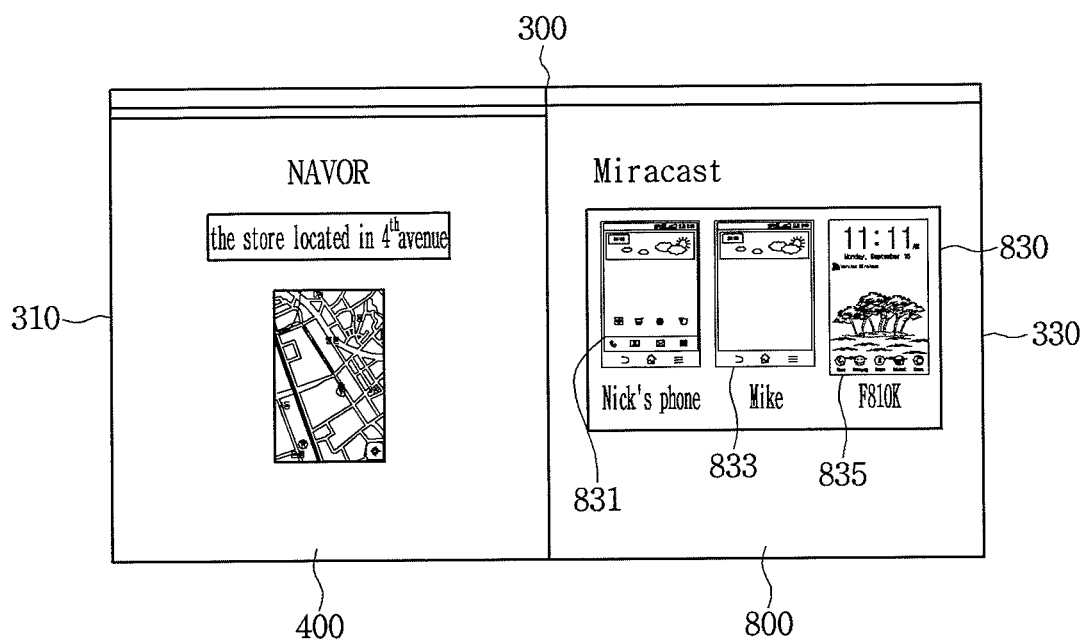

Next, FIG. 16 is described. Moreover, if a request for selecting a first external input icon 531 for screen mirroring from the external input list 530 output to the second window 500 is received in FIG. 15(a), the control unit 170, as shown in FIG. 16, can control the display unit 180 to display a screen mirroring list screen 800 in the second area 330 of the full screen 300.

Referring to FIG. 16, the screen mirroring list screen 800 may include a mobile terminal list 830 including mobile terminals that share a screen in current connection to the terminal 100. The mobile terminal list 830 may include at least one of a screen of each mobile terminal, the name of each mobile terminal, and a user name of each mobile terminal. For example, the mobile terminal list 830 may include a screen 831 of a first mobile terminal, a screen 833 of a second mobile terminal, and a screen 835 of a third mobile terminal.

According to an embodiment of the present invention, a screen of each mobile terminal may be the current screen of a mobile terminal connected to the terminal 100. According to another embodiment of the present invention, a screen of each mobile terminal may be a screen of a mobile terminal at a time point that a connection with the terminal 100 is terminated. If a screen of one in the mobile terminal list 830 is selected, the control unit 170 can output the screen of the selected mobile terminal to the second area 330 of the full screen 300. Accordingly, the terminal 100 can perform screen mirroring with a mobile terminal corresponding to the selected screen of the mobile terminal.

Next, description will be made on a screen provided if an external input icon representing an HDMI input is selected from an external input list. In particular, FIGS. 17 and 18 are views illustrating a screen provided if an external input icon for screen mirroring is selected from an external input list on a second window according to an embodiment of the present invention.

If a request for selecting a second external input icon 533 included in an external input list 530 output to the second window 500 is received in FIG. 17(a), the control unit 170, as shown in FIG. 17(b), can control the display unit 180 to display a screen 900, which is currently output by another terminal connected to the terminal 100 through the HDMI standards, in the second area 330 of the full screen 300. That is, an image based on an image signal output by another terminal (or an external device) can be displayed on the second area 330 through the external device interface unit 135. The other terminal may be one of a PC and a notebook but is not limited thereto.

Figure 18:
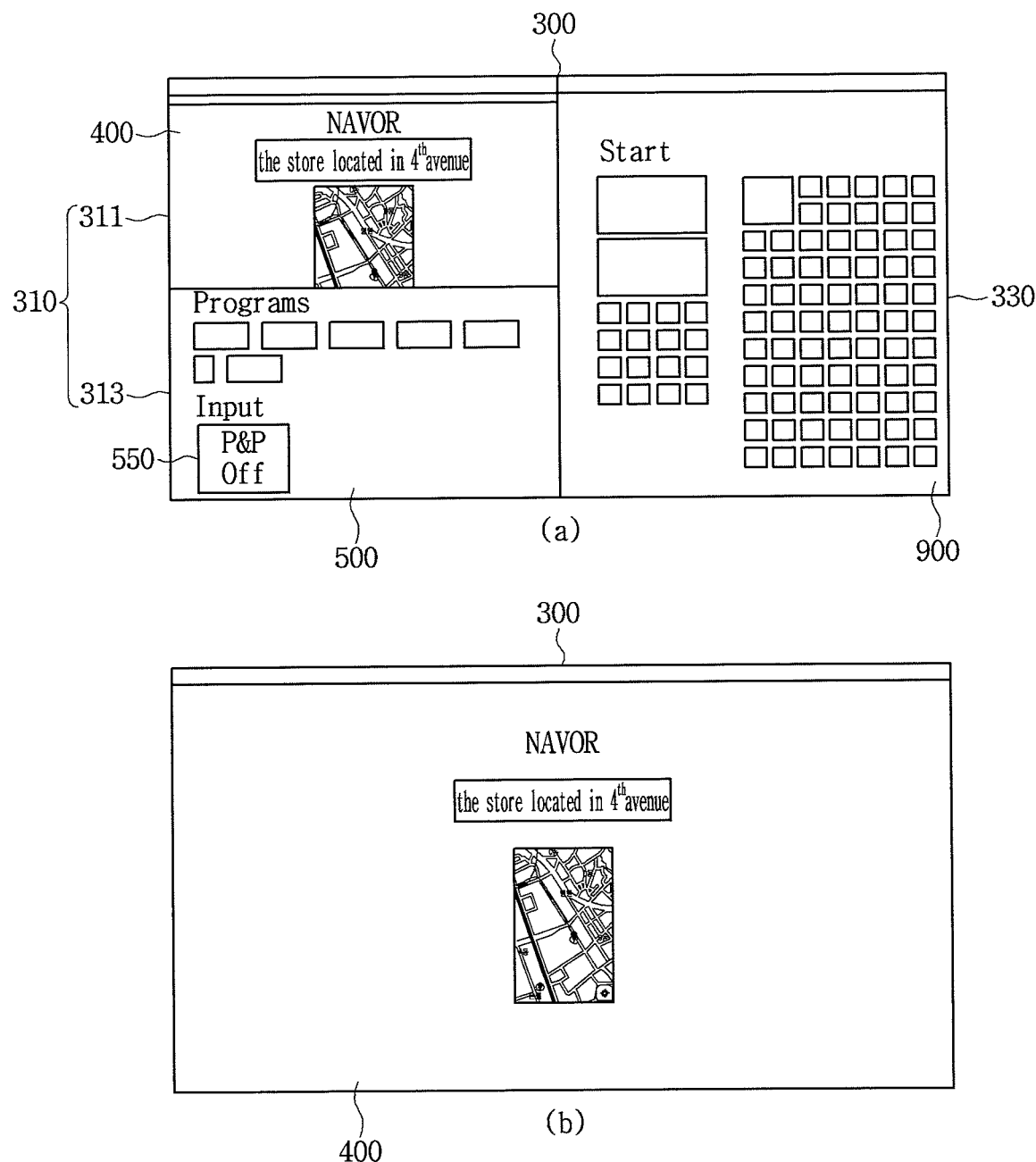

Next, FIG. 18 is described. If a request for outputting the second window 500 to the first area 310 is received in FIG. 17(b), the control unit 170, as shown in FIG. 18(a), can control the display unit 180 to display the first window 400 in the first sub area 311 of the first area 310 and display the second window 500 for providing a multitasking environment to the second sub area 313 of the first area 310. A request for outputting the second window 500 to the first area 310 may be a screen split request for splitting the first area 310 into two sub areas.

A screen split icon 550 (for example, a Picture By Picture (PBP) icon) for representing a screen split function may be displayed on the second window 500. If a request for selecting the screen split icon 550 is received in FIG. 18(a), the control unit 170, as shown in FIG. 18(b), can terminate a screen split function and control the display unit 180 to display only the first window 400 on the full screen 300.

Next, description will be made on a screen provided if an external input icon for representing a TV input is selected from an external input list. In particular, FIG. 19 is a view illustrating a screen provided if an external input icon for representing a TV input is selected from an external input list on a second window according to an embodiment of the present invention.

If a request for selecting the third external input icon 535 for representing a TV input from the external input list 530 output to the second window 500 is received in FIG. 19(a), the control unit 170, as shown in FIG. 19(b), can control the display unit 180 to display a TV screen 1000 in the second area 330 of the full screen 300. That is, the control unit 170 can control the display unit 180 to display the TV screen 1000 connected to the terminal 100 in the second area 330 according to the request for selecting the third external input icon 535. A broadcast program currently played on a TV may be displayed on the TV screen 1000.

Again, FIG. 5 is described. The control unit 170 of the terminal 100 receives an information move input for moving information output to a first window, which is an execution screen corresponding to a program item, to a second window in operation S113 and transmits the information output to the first window to a peripheral device corresponding to an external input according to the received information move input in operation S115.

According to an embodiment of the present invention, the terminal 100 can be linked with a peripheral device according to an information move input for moving information output on the execution screen of a program to an external input screen connected to the terminal 100. Hereinafter, such a link process will be described in more detail.

In particular, FIGS. 20 to 29 are views of moving information output to the execution screen of a program to the screen of an external input to transmit corresponding information to a mobile terminal according to various embodiments of the present invention. Hereinafter, it is assumed that a website screen is displayed in the first area 310 of the full screen 300 and a mirroring screen of a mobile terminal 10 connected to the terminal 100 is displayed in the second area 330.

If a screen mirroring request for screen mirroring is received from the mobile terminal 10, operation S103 to operation S109 described with reference to FIG. 5 may be omitted. That is, as a screen mirroring request is received from the mobile terminal 10, the control unit 170 can control the display unit 180 in order to divide the full screen 300 into the first area 310 and the second area 330, display a program execution screen in the first area 310, and display the mirroring screen of the mobile terminal 10 in the second area 330.

Also, according to another embodiment of the present invention, if a screen mirroring request for screen mirroring is received from the mobile terminal 10, only operation S107 to operation S109 may be omitted. That is, while the full screen 300 is divided into the first area 310 and the second area 330, as a screen mirroring request is received from the mobile terminal 10, the control unit 170 can control the display unit 180 to display a program execution screen in the first area 310 and display the mirroring screen of the mobile terminal 10 in the second area 330.

Figure 20:
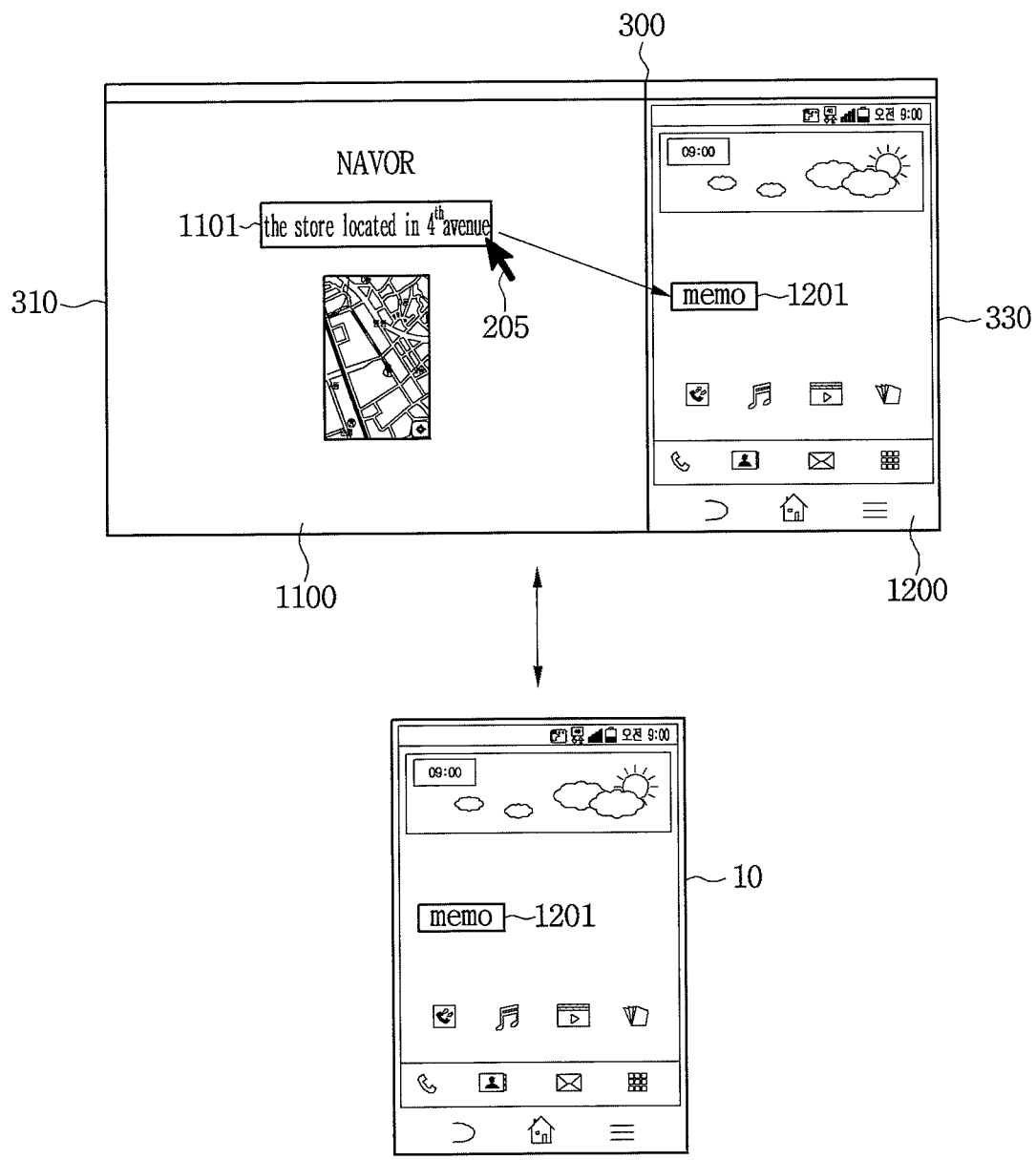
FIGS. 20 to 29 are views of moving information output to the execution screen of a program to the screen of an external input to transmit corresponding information to a mobile terminal according to various embodiments of the present invention.

Referring to FIG. 20, the terminal 100 can display a website screen 1100 in the first area 310 of the full screen 300 through the display unit 180 and the terminal 100 can display a mirroring screen 1200 of the mobile terminal 10 connected to the terminal 100 in the second area 330 through screen mirroring. The mirroring screen 1200 can be a screen that the mobile terminal 10 displays currently.

According to an embodiment of the present invention, the control unit 170 can dispose the mirroring screen 1200 on the full screen 300 according to the screen resolution of the mobile terminal 10. In more detail, as receiving a screen mirroring request, the control unit 170 can collect information on the screen resolution from the mobile terminal 10 and dispose the mirroring screen 1200 on the full screen 300 by using the received information on the screen resolution. The control unit 170 can adjust the size of the second area 330 by using the information on the screen resolution of the mobile terminal 10. Accordingly, the control unit 170 can provide a split screen to the full screen 300 in order to implement the screen of the mobile terminal as it is. The resolution of the website screen 1100 can be different from the resolution of the mirroring screen 1200.

According to an embodiment of the present invention, if an information move request for selecting a text 1101 in the information output on the website screen 1100 of FIG. 20 and moving the selected text 1101 to the mirroring screen 1200 is received, the control unit 170 can transmit the text 1101 to the mobile terminal 10 according to the received information move request. Herein, the information move request may be a drag and drop input through the pointer 205. In particular, the pointer 205 may be moved to the mirroring screen 1200.

That is, the terminal 100 can receive a command for moving the pointer 205 from the website screen 1100 to the mirroring screen 1200 and display the pointer 205 on the mirroring screen 1200 according to the received command. A user can also control the mirroring screen 1200 through the pointer 205. That is, a user can select an icon corresponding to an application output to the mirroring screen 1200 through the pointer 205 and thus, execute a corresponding application. This will be described later.

The mobile terminal 10 can store the received text 1101 in the memory of the mobile terminal 10. The mobile terminal 10 can also output a notification for notifying that the text 1101 is received through a message, voice, or vibration form. According to another embodiment of the present invention, as shown in FIG. 20, if an information move request for selecting the text 1101 in the information output on the website screen 1100 and moving the selected text 1101 to a memo icon 1201 for representing a memo application of the mirroring screen 1200 is received, the control unit 170 can transmit the text 1101 to the mobile terminal 10 according to the received information move request. Upon the receipt of the text 1101 from the terminal 100, the mobile terminal 10 can execute the memo application. This will be described with reference to FIG. 21.

Figure 21:
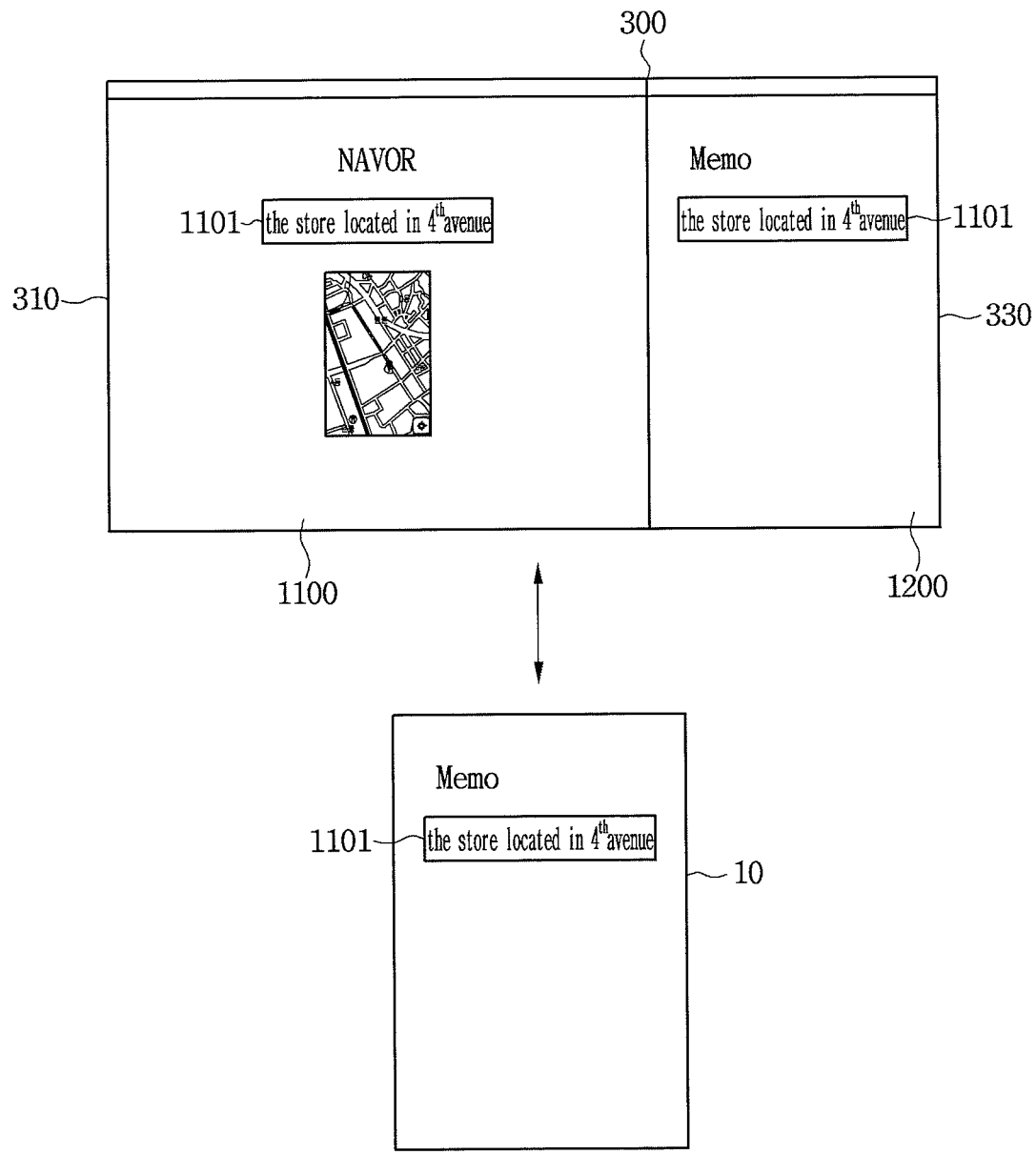

Referring to FIG. 21, the control unit 170 can control the display unit 180 to display the website screen 1100 and the execution screen 1200 of the memo application in the first area 310 of the full screen 300 according to the information move request for moving the text 1101 to the memo icon 1201. That is, the information move request for moving the text 1101 to the memo icon 1201 can be a trigger for executing the memo application installed on the mobile terminal 10. The mobile terminal 10 also can display the execution screen of the memo application. The execution screen 1200 of the memo application may include the text 1101 moved from the website screen 1100.

Further, the memory application is used exemplarily in FIGS. 20 and 21, but the present invention is not limited thereto. For example, if an information move request for moving the text 1101 to a social network service (SNS) icon corresponding to an SNS application is received, the control unit 170 can execute the SNS application. A user can transmit the text 1101 to a mobile terminal of another user through the executed SNS application. Additionally, if an information move request for moving the text 1101 to a text message icon corresponding to a text message application is received, the control unit 170 can execute the text message application. A user can transmit the text 1101 to a mobile terminal of another user through the executed text message application.

Figure 22:
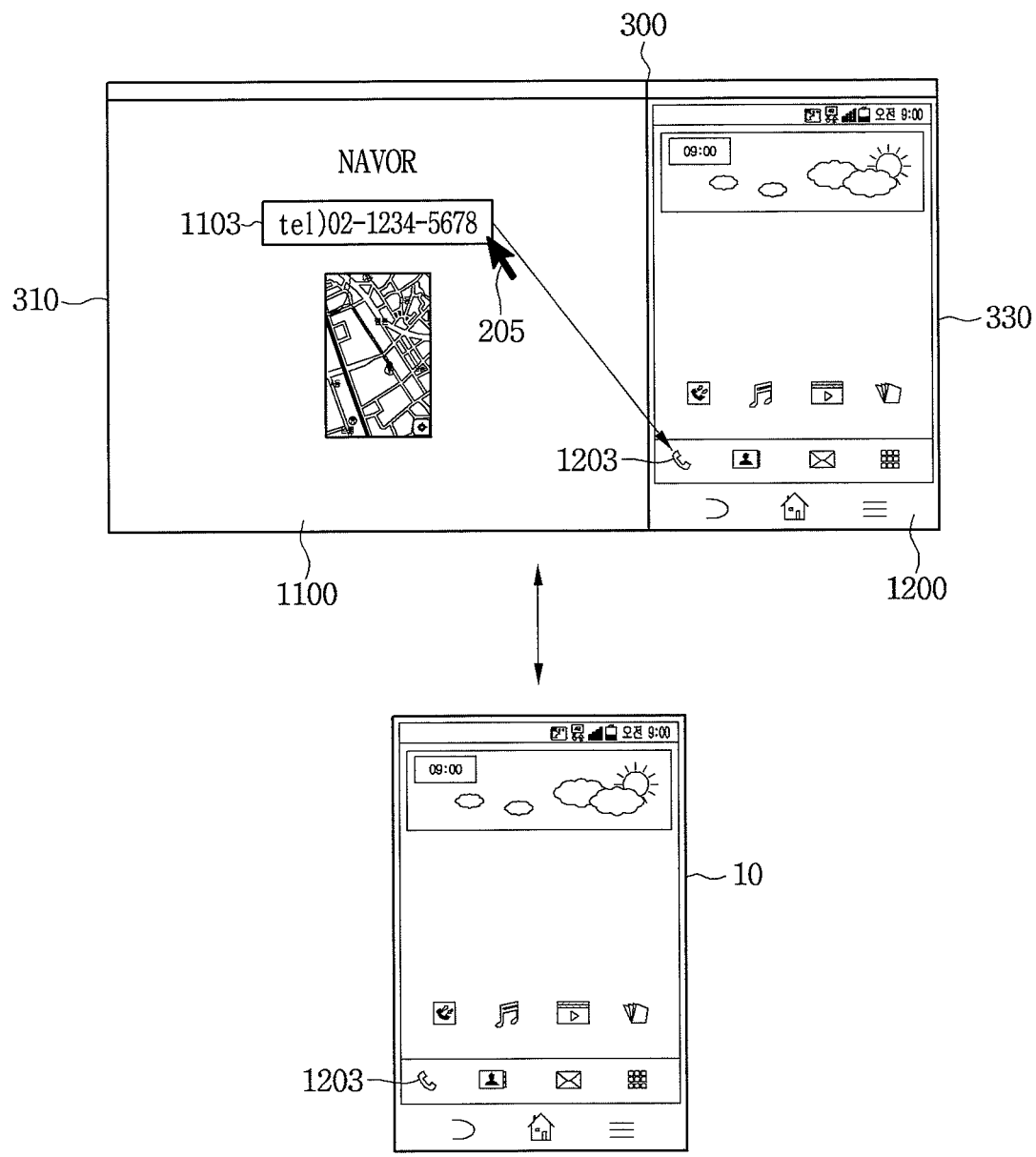
Figure 23:
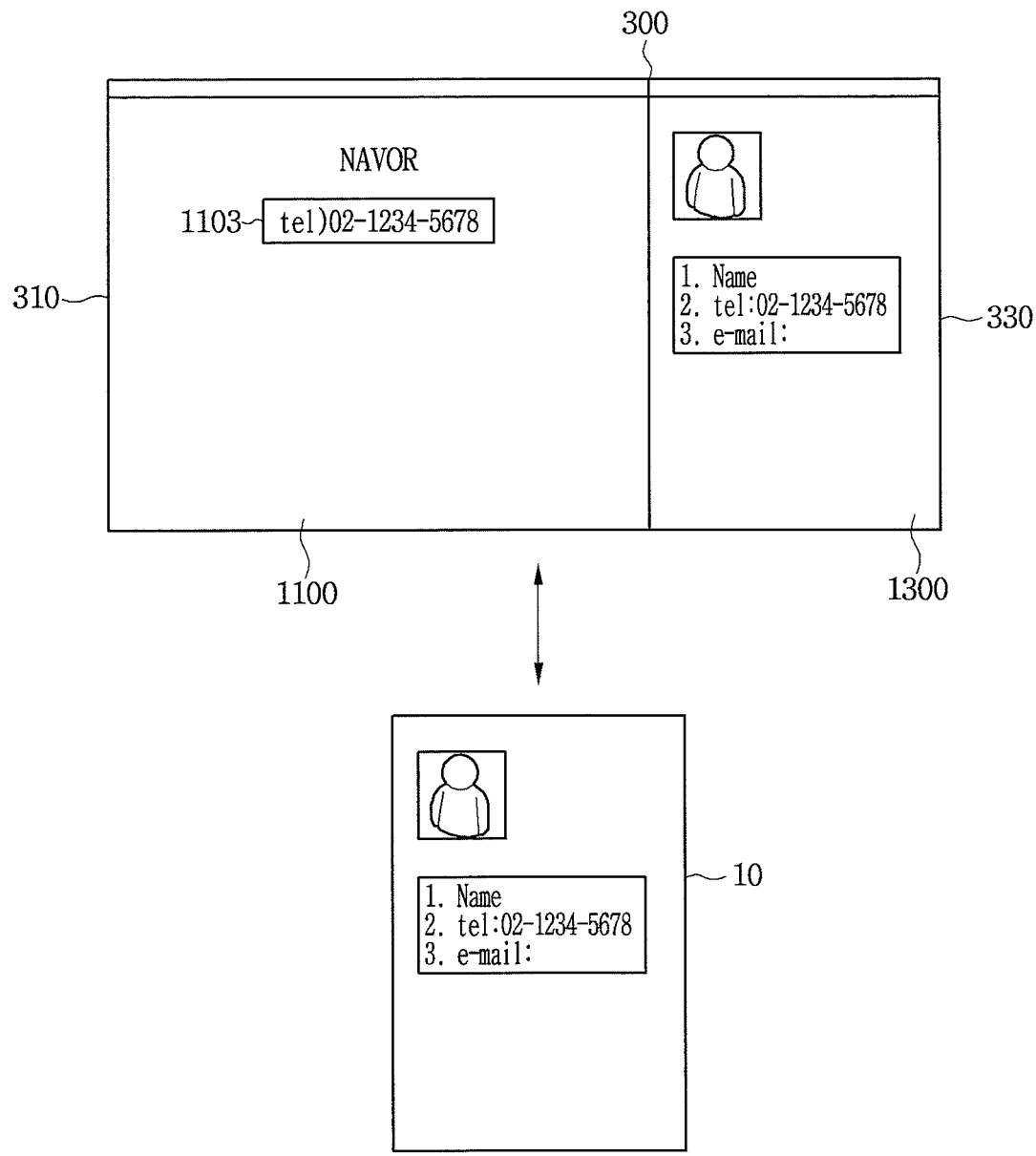

Next, FIGS. 22 and 23 are described. Referring to FIG. 22, the terminal 100 can display the website screen 1100 in the first area 310 of the full screen 300 through the display unit 180 and the terminal 100 can display the mirroring screen 1200 of the mobile terminal 10 connected to the terminal 100 in the second area 330 through screen mirroring.

According to an embodiment of the present invention, if an information move request for selecting a phone number 1103 in information output on the website screen 1100 and moving the selected phone number 1103 to the mirroring screen 1200 is received, the control unit 170 can transmit the phone number 1103 to the mobile terminal 10 according to the received information move request. Herein, the information move request may be a drag and drop input through the pointer 205.

The mobile terminal 10 can also store the received phone number 1103 in the memory of the mobile terminal 10. The received phone number 1103 may be automatically stored in a contact list of a call application. The mobile terminal 10 may output a notification for notifying that the phone number 1103 is received through a message, voice, or vibration form.

According to another embodiment of the present invention, as shown in FIG. 22, if an information move request for selecting the phone number 1103 in the information output on the website screen 1100 and moving the selected phone number 1103 to a call icon 1203 for representing a call application of the mirroring screen 1200 is received, the control unit 170 can transmit the phone number 1103 to the mobile terminal 10 according to the received information move request. Upon the receipt of the phone number 1103 from the terminal 100, the mobile terminal 10 can execute the call application. This will be described with reference to FIG. 23.

Referring to FIG. 23, the control unit 170 can control the display unit 180 to display the website screen 1100 and the execution screen 1300 of the call application in the first area 310 of the full screen 300 according to the information move request for moving the phone number 1103 to the call icon 1203. That is, the information move request for moving the phone number 1103 to the call icon 1203 may be a trigger for executing the call application installed on the mobile terminal 10. The mobile terminal 10 also may display the execution screen of the call application. The execution screen 1300 of the call application may include the phone number 1103 moved from the website screen 1103.

According to another embodiment of the present invention, according to an information move request for moving the phone number 1103 on the website screen 1100 to the call icon 1203 of the mirroring screen 1200, the control unit 170 can control the mobile terminal 10 in order to transmit a call signal to a mobile terminal corresponding to the phone number 1103. In this instance, the mirroring screen 1200 and the screen of the mobile terminal 10 may change into a screen for representing a process for transmitting a call signal.

Figure 24:
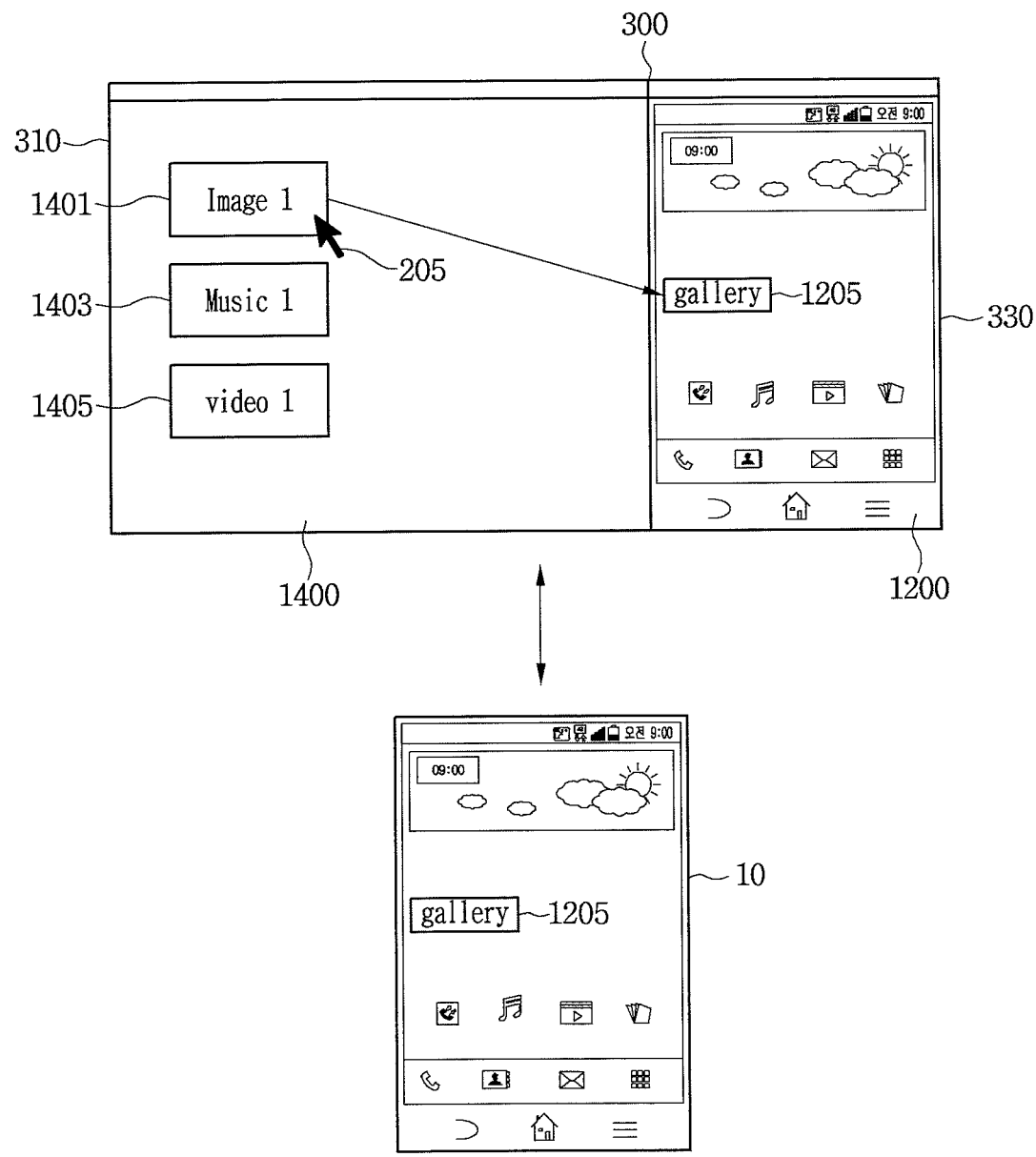
Figure 25:
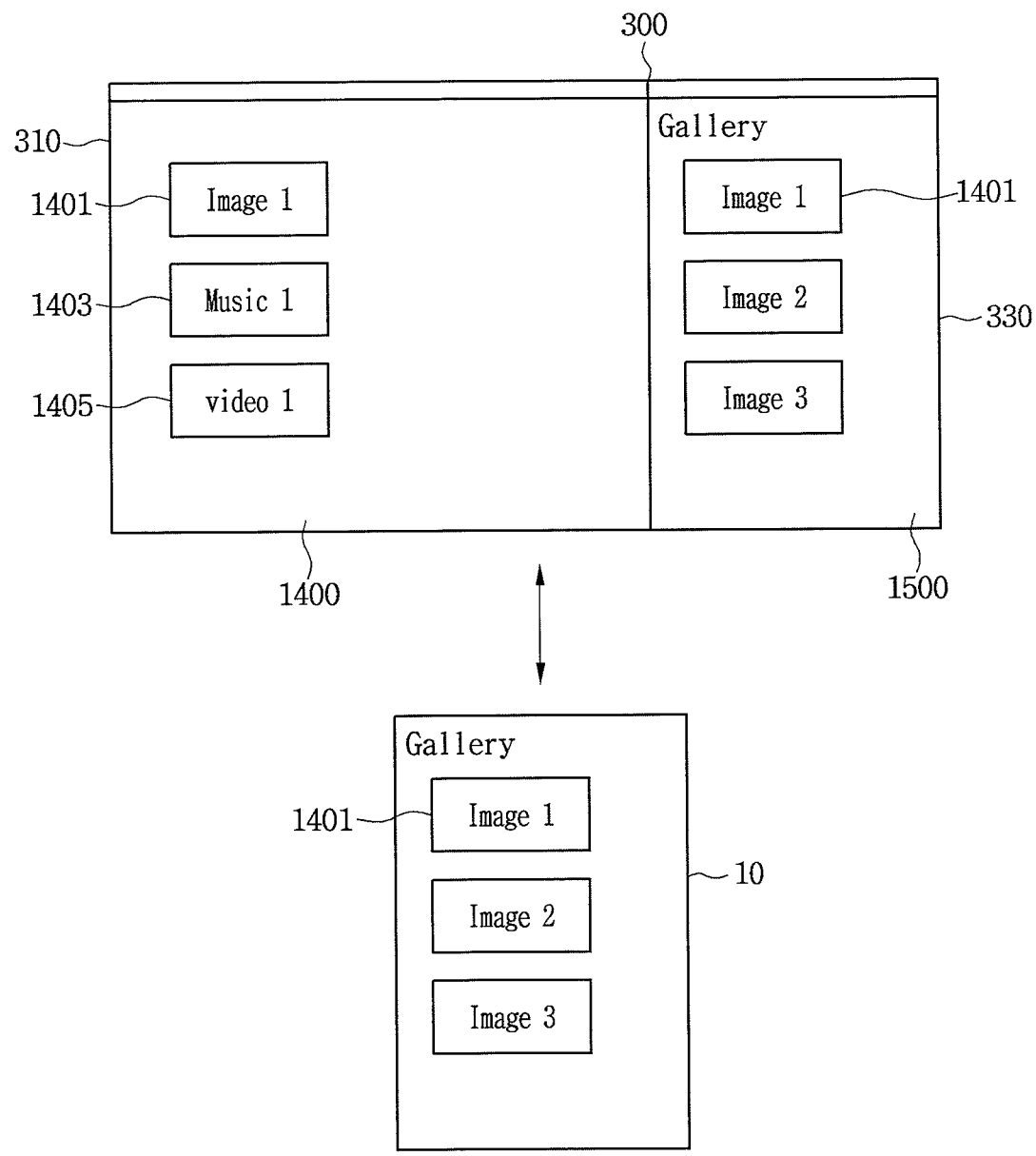

Next, FIGS. 24 to 25 are described. Referring to FIG. 24, the terminal 100 can display a content list screen 1400 including contents stored in the storage unit 140 of the terminal 100 in the first area 310 of the full screen 300 through the display unit 180 and the terminal 100 can display the mirroring screen 1200 of the mobile terminal 10 connected to the terminal 100 in the second area 330 through screen mirroring.

According to an embodiment of the present invention, if an information move request for selecting an image 1401 in the information output on the content list screen 1400 of FIG. 24 and moving the selected image 1401 to the mirroring screen 1200 is received, the control unit 170 can transmit the image 1401 to the mobile terminal 10 according to the received information move request. Herein, the information move request can be a drag and drop input through a pointer. The mobile terminal 10 can store the received image 1401 in the memory of the mobile terminal 10. Further, the mobile terminal 10 can output a notification for notifying that the image 1401 is received through a message, voice, or vibration form.

According to another embodiment of the present invention, as shown in FIG. 24, if an information move request for selecting the image 1401 in the information output on the content list screen 1400 and moving the selected image 1401 to a gallery icon 1205 for representing a gallery application of the mirroring screen 1200 is received, the control unit 170 can transmit the image 1401 to the mobile terminal 10 according to the received information move request. Upon the receipt of the image 1401 from the terminal 100, the mobile terminal 10 can execute the gallery application for providing an image or video stored in the memory of the mobile terminal 10.

Next, FIG. 25 is described. Referring to FIG. 25, the control unit 170 can control the display unit 180 to display the content list screen 1400 and the execution screen 1500 of the gallery application in the first area 310 of the full screen 300 according to the information move request for moving the image 1401 to the gallery icon 1205. That is, the information move request for moving the image 1401 to the gallery icon 1205 may be a trigger for executing the gallery application installed on the mobile terminal 10. The mobile terminal 10 also may display the execution screen of the gallery application. The execution screen 1500 of the gallery application may include the image moved from the content list screen 1400 and pre-stored images image 2 and image 3.

Figure 26:
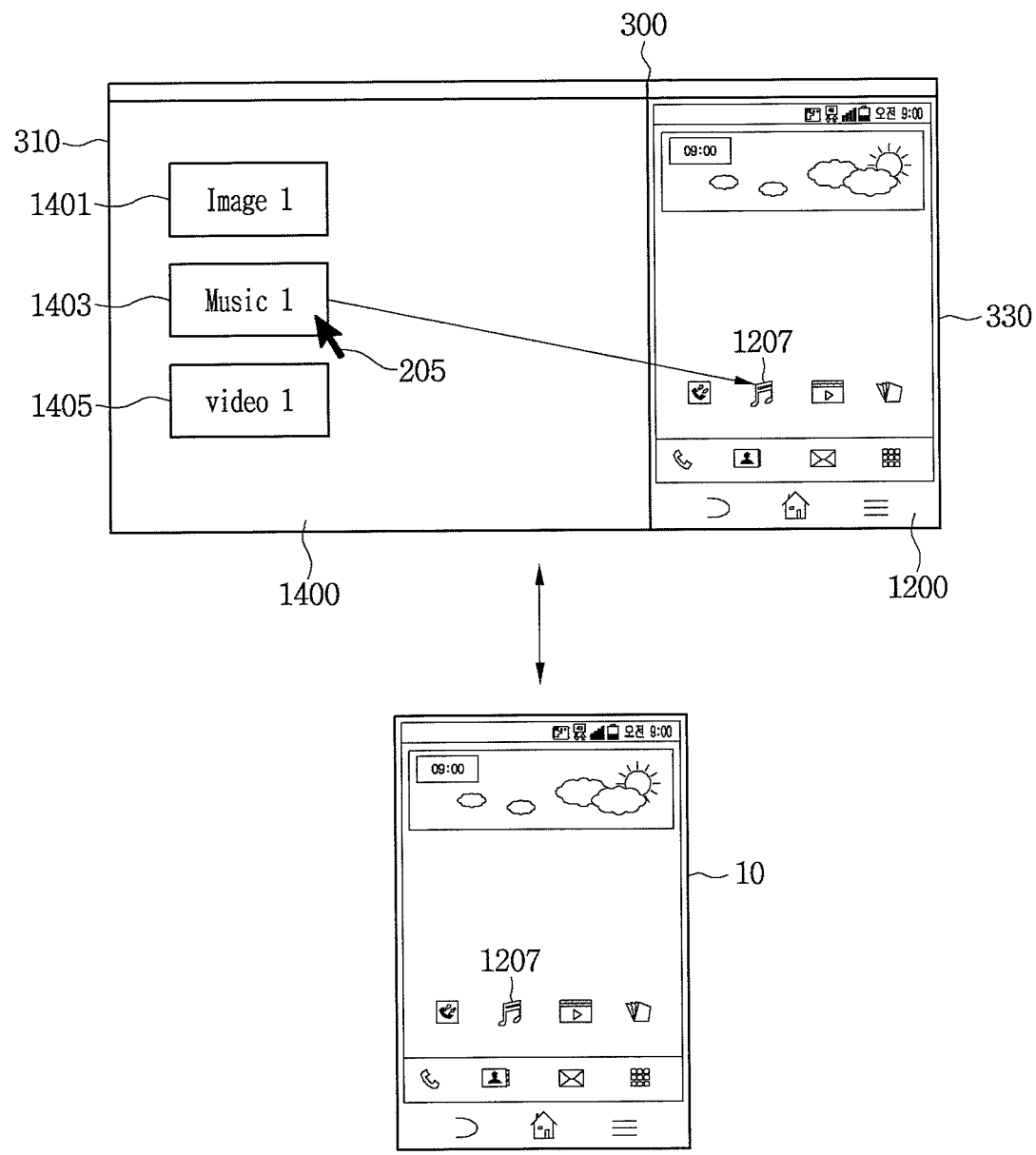
Figure 27:
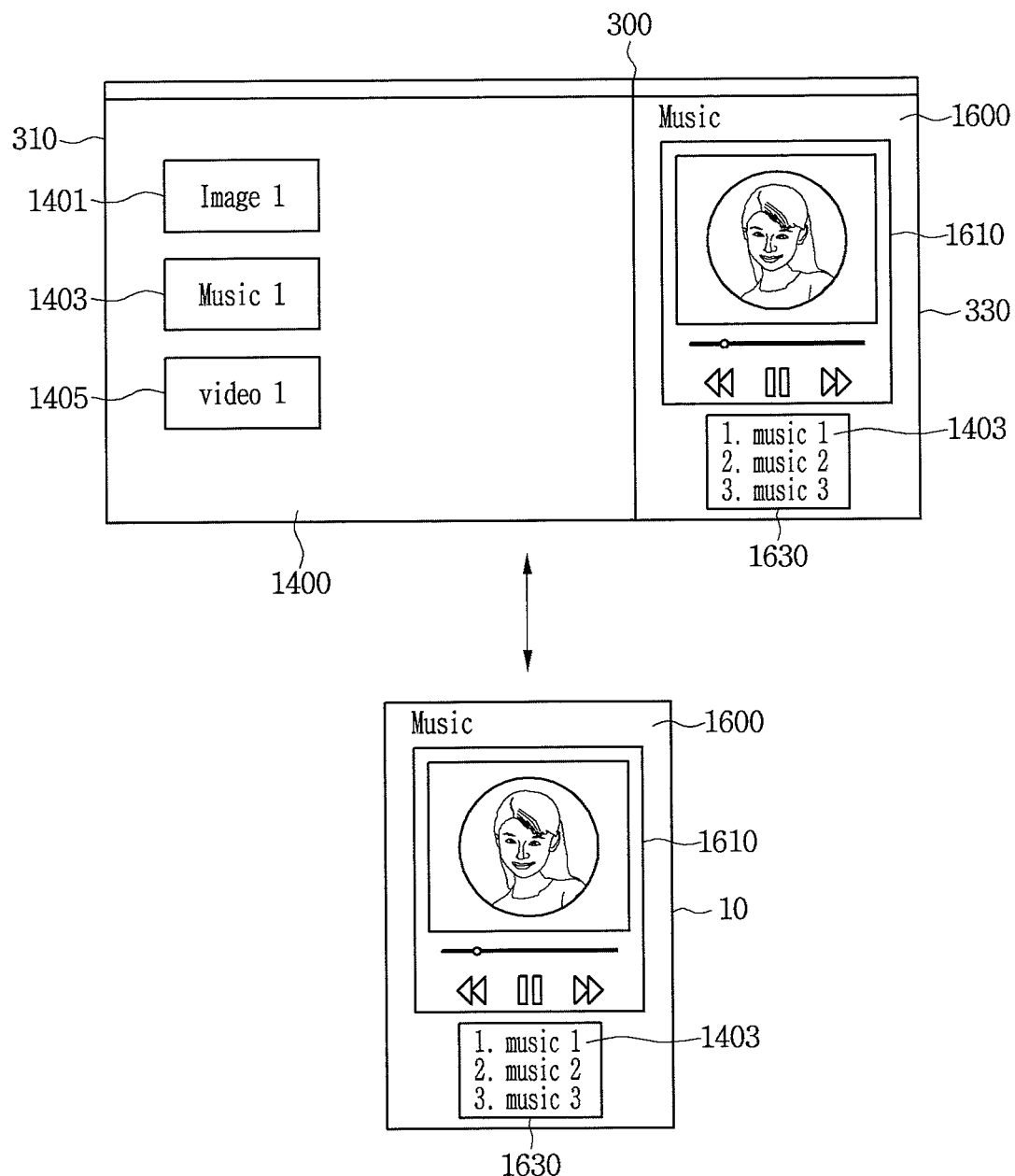

Next, FIGS. 26 and 27 are described. Referring to FIG. 26, the terminal 100 can display a content list screen 1400 including contents stored in the storage unit 140 of the terminal 100 in the first area 310 of the full screen 300 through the display unit 180 and the terminal 100 can display the mirroring screen 1200 of the mobile terminal 10 connected to the terminal 100 in the second area 330 through screen mirroring.

According to an embodiment of the present invention, if an information move request for selecting a music file 1403 in information output on the content list screen 1400 and moving the selected music file 1403 to the mirroring screen 1200 is received, the control unit 170 can transmit the music file 1403 to the mobile terminal 10 according to the received information move request. Herein, the information move request may be a drag and drop input through the pointer 205.

The mobile terminal 10 can store the received music file 1403 in the memory of the mobile terminal 10. The mobile terminal 10 can also output a notification for notifying that the music file 1403 is received through a message, voice, or vibration form.

According to an embodiment of the present invention, as shown in FIG. 26, if an information move request for selecting the music file 1403 in the information output on the content list screen 1400 and moving the selected music file 1403 to a music icon 1207 for representing a music playback application of the mirroring screen 1200 is received, the control unit 170 can transmit the music file 1403 to the mobile terminal 10 according to the received information move request. Upon the receipt of the music file 1403 from the terminal 100, the mobile terminal 10 can execute the music playback application. The music application may be an application for playing a music file stored in the memory of the mobile terminal 10.

Next, FIG. 27 is described. Referring to FIG. 27, the control unit 170 can control the display unit 180 to display the content list screen 1400 and the execution screen 1600 of the music playback application in the first area 310 of the full screen 300 according to the information move request for moving the music file 1403 to the music icon 1207. That is, the information move request for moving the music file 1403 to the music icon 1207 may be a trigger for executing the music playback application installed on the mobile terminal 10.

Further, the mobile terminal 10 also can display the execution screen of the music playback application. The execution screen 1600 of the music playback application may include the music playback screen 1610 for playing the music file 1403 moved from the content list screen 1400 and a music file list 1630 including the music file 1403 and music files music 2 and music 3 pre-stored in the music file list 1630.

Figure 28:
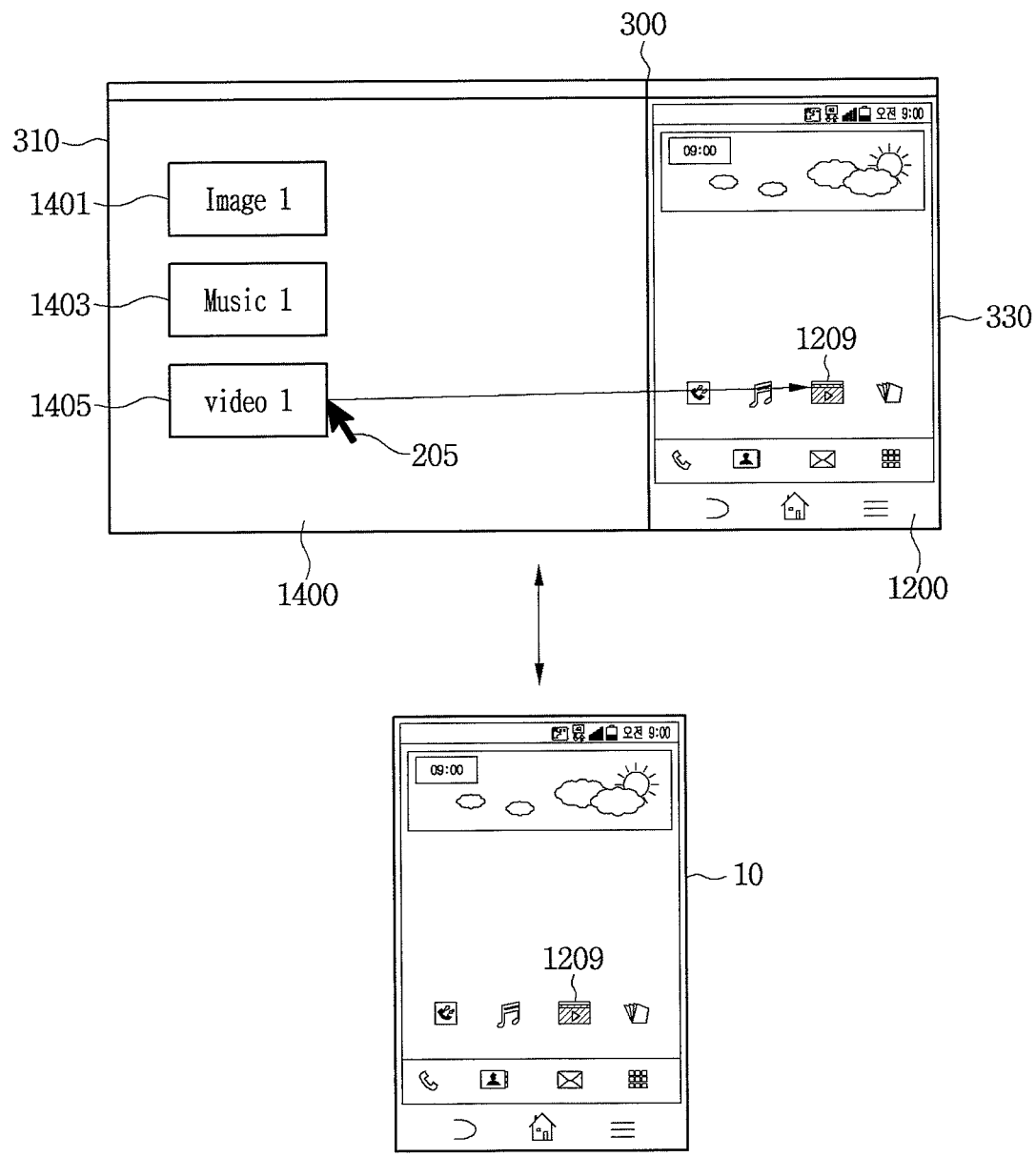
Figure 29:
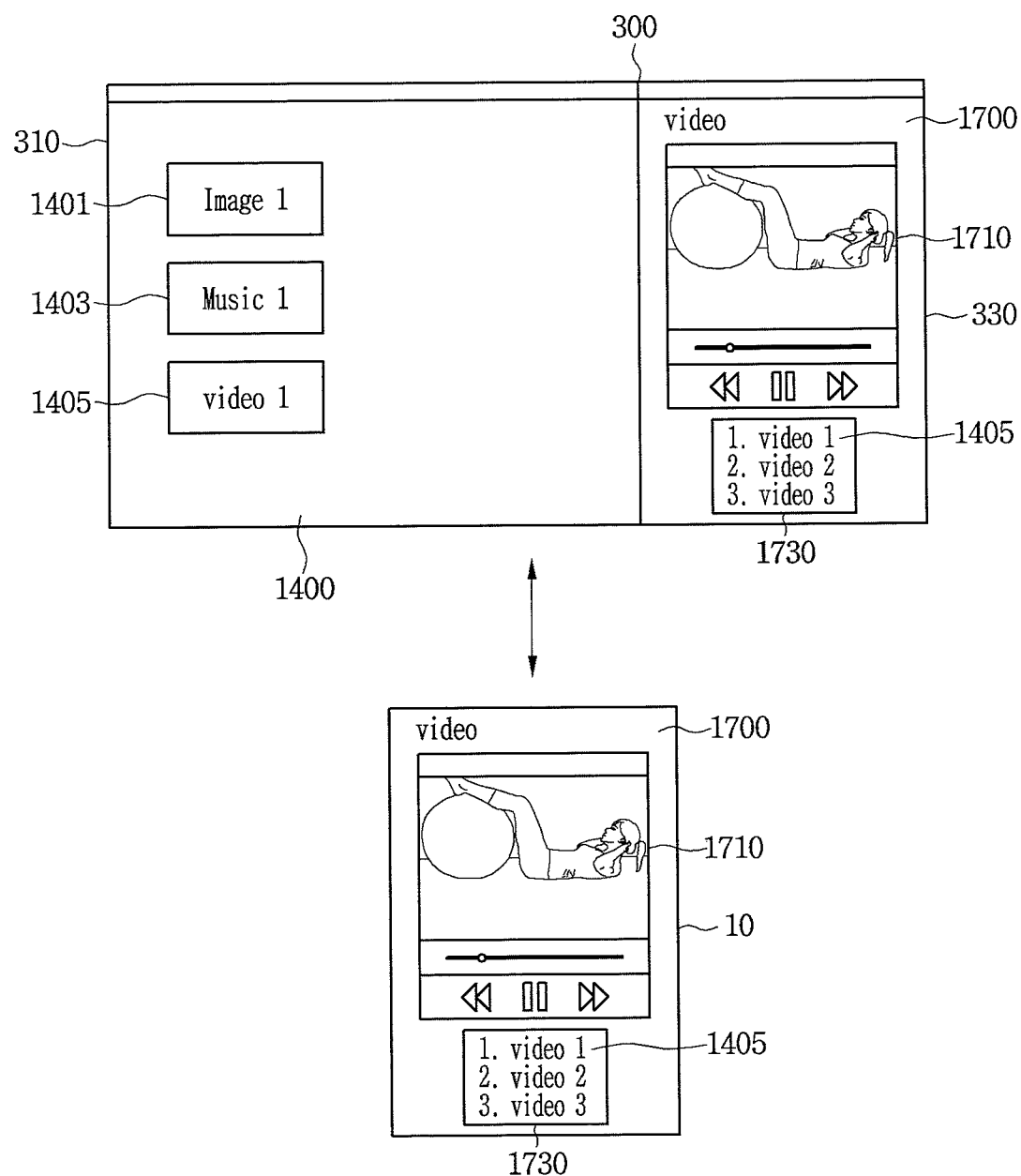

Next, FIGS. 28 and 29 are described. Referring to FIG. 28, the terminal 100 can display the content list screen 1400 including contents stored in the storage unit 140 of the terminal 100 in the first area 310 of the full screen 300 through the display unit 180, and the terminal 100 can display the mirroring screen 1200 of the mobile terminal 10 connected to the terminal 100 in the second area 330 through screen mirroring.

According to an embodiment of the present invention, if an information move request for selecting a video file 1405 in information output on the content list screen 1400 of FIG. 28 and moving the selected video file 1405 to the mirroring screen 1200 is received, the control unit 170 can transmit the video file 1405 to the mobile terminal 10 according to the received information move request. Herein, the information move request may be a drag and drop input through the pointer 205.

The mobile terminal 10 can store the received video file 1405 in the memory of the mobile terminal 10. Further, the mobile terminal 10 can output a notification for notifying that the video file 1405 is received through a message, voice, or vibration form.

According to an embodiment of the present invention, as shown in FIG. 28, if an information move request for selecting the video file 1405 in the information output on the content list screen 1400 and moving the selected video file 1405 to a video icon 1209 for representing a video playback application of the mirroring screen 1200 is received, the control unit 170 can transmit the video file 1405 to the mobile terminal 10 according to the received information move request. Upon the receipt of the video file 1405 from the terminal 100, the mobile terminal 10 can execute the video playback application. The video application may be an application for playing a video file stored in the memory of the mobile terminal 10.

Next, FIG. 29 is described. Referring to FIG. 29, the control unit 170 can control the display unit 180 to display the content list screen 1405 and the execution screen 1700 of the video playback application in the first area 310 of the full screen 300 according to the information move request for moving the video file 1405 to the video icon 1209. That is, the information move request for moving the video file 1405 to the video icon 1209 may be a trigger for executing the video playback application installed on the mobile terminal 10. The mobile terminal 10 also may display the execution screen of the video playback application. The execution screen 1700 of the video playback application may include the video playback screen 1710 for playing the video file 1405 moved from the content list screen 1405 and a video file list 1730 including the video file 1405 and pre-stored video files video 2 and video 3.

According to another embodiment of the present invention, as a control command is received on an external input screen configuring the full screen 300 described in operation S109, a function corresponding thereto may be performed. This will be described with reference to FIG. 30.

Figure 30:
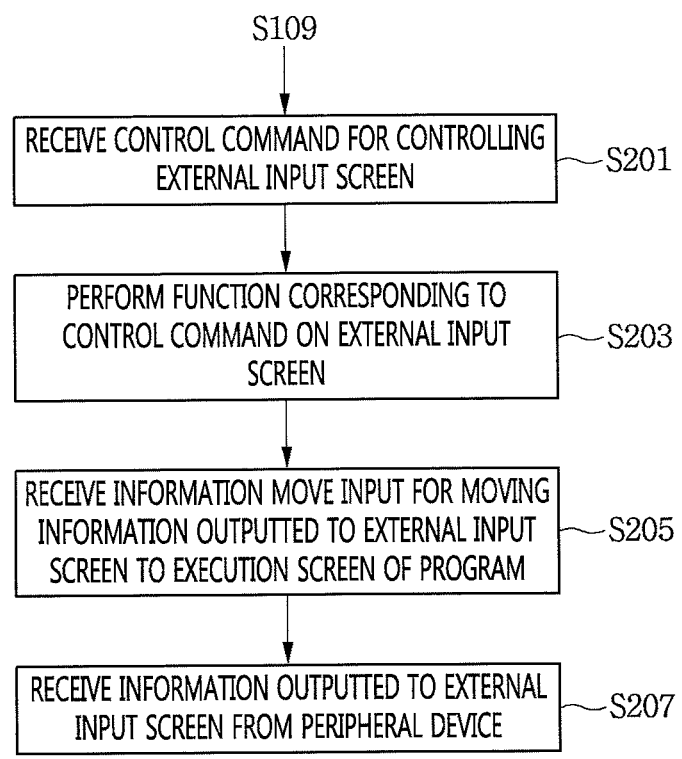
FIG. 30 is a flowchart illustrating an operating method of a terminal according to another embodiment of the present invention.

In particular, FIG. 30 is a flowchart illustrating an operating method of a terminal according to another embodiment of the present invention. After operation S109, the control unit 170 receives a control command for controlling an output external input screen in operation S201 and performs a function corresponding to the control command on the external input screen according to the received control command in operation S203.

Figure 31:
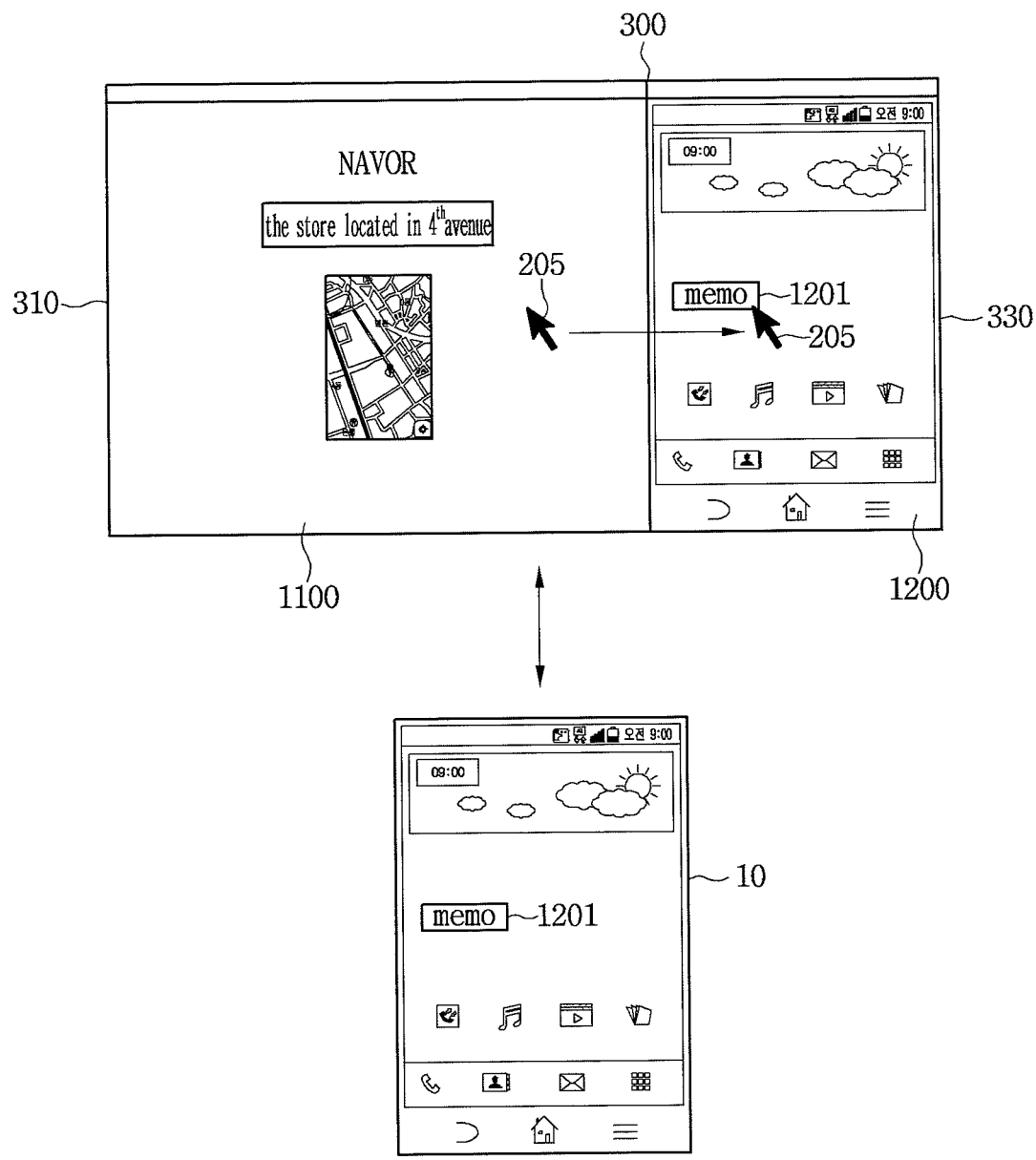
FIGS. 31 and 32 are views illustrating a process for manipulating an external input screen according to another embodiment of the present invention.

According to an embodiment of the present invention, the control command may be a command for selecting information output on an external input screen through a pointer or executing an application. This will be described with reference to FIGS. 31 and 32. In particular, FIGS. 31 and 32 are views illustrating a process for manipulating an external input screen according to another embodiment of the present invention.

Hereinafter, it is assumed that an external input screen displayed in the second area 330 of the full screen 300 is a mirroring screen that the mobile terminal 100 displays currently. Referring to FIG. 31, the control unit 170 of the terminal 100 can receive a pointer move command for moving a pointer 205 through a device such as a mouse or the remote control device 200. The control unit 170 can move the pointer 205 to a mirroring screen 1200 in a website screen 1100 according to the pointer move command.

Figure 32:
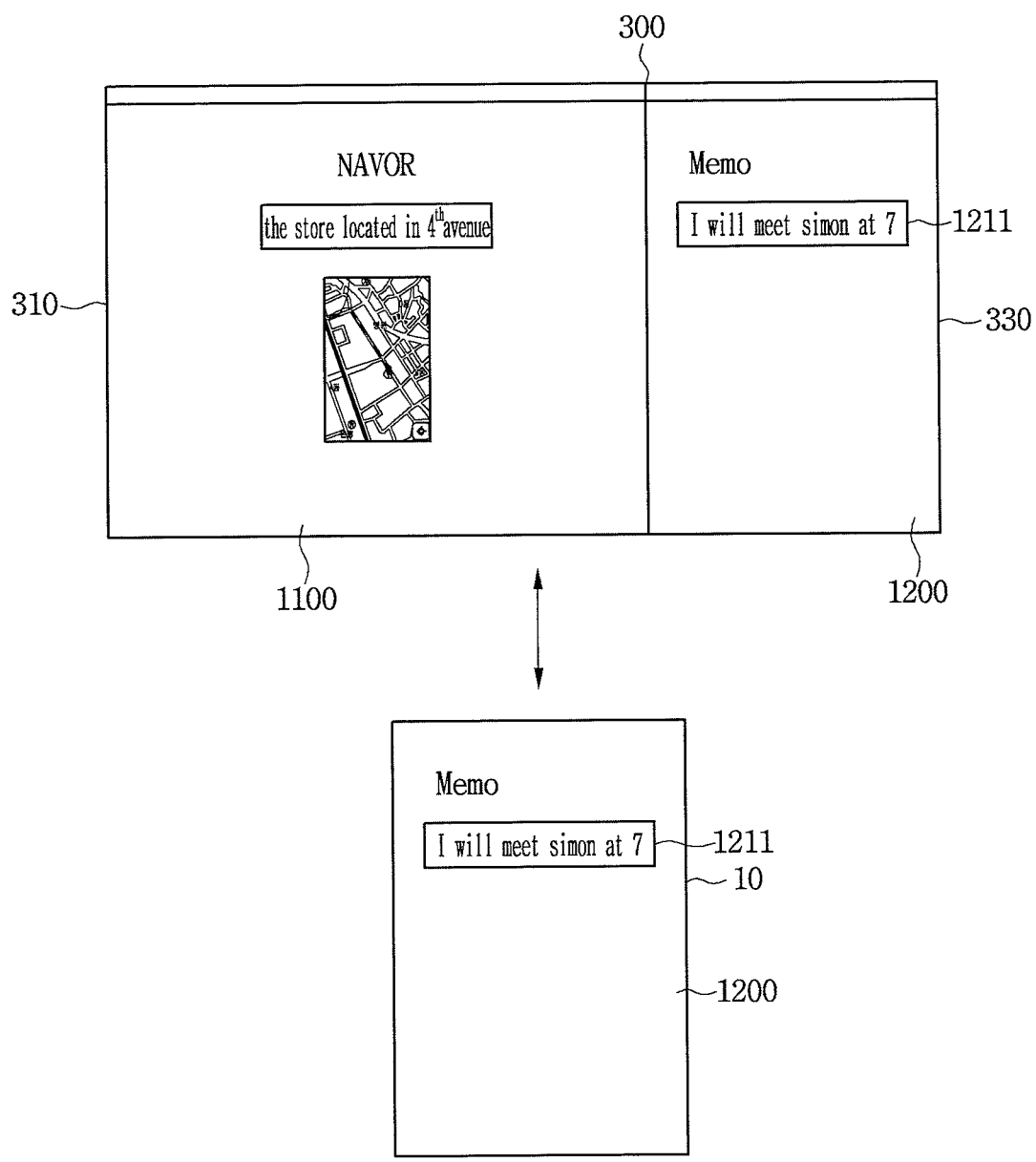

Further, the control unit 170 can receive an icon selection command for selecting a memo icon 1201 through the pointer 205 and according to the received icon selection command, as shown in FIG. 32, control the display unit 180 to display the execution screen of a memo application in a mirroring screen 1200. In this instance, the execution screen of the memo application may be displayed on the screen of the mobile terminal 10.

The control unit 170 of the terminal 100 can perform screen mirroring with the mobile terminal 10 by using a User Input Back Channel (UIBC) technique. The UIBC technique is a technique that the terminal 100 transmits a received user input to the mobile terminal 10. The control unit 170 can extract the coordinates of the pointer 205 controlled by the remote control device 200 through the UIBC technique. The control unit 170 can transmit an input on the pointer 205 to the mobile terminal 10 based on the extracted coordinates of the pointer 205.

The mobile terminal 10 may receive the input on the pointer 205 received from the terminal 100 and perform a function corresponding to the received input A result of the function performed in the mobile terminal 10 may be displayed on the mirroring screen 1200 as it is. The input on the pointer 205 may be one of an input for moving the pointer 205, an input for selecting an icon corresponding to a specific application, and an input for moving specific information. According to various embodiments of the present invention, information output on the program execution screen of the terminal 100 is transmitted to the mobile terminal 10, so that intuitive sense and user convenience may be increased.

Again, FIG. 30 is described. The control unit 170 receives an information move input for moving the information output on an external input screen to the execution screen of a program in operation S205 and receives information output on an external input screen from a peripheral device according to the received information move input in operation S207.

According to an embodiment of the present invention, according to an information move input for moving information output on an external input screen (for example, a mirroring screen) to the program execution screen of the terminal 100, the terminal 100 can be linked with a peripheral device. Such a link process will be described in more detail.

Figure 33:
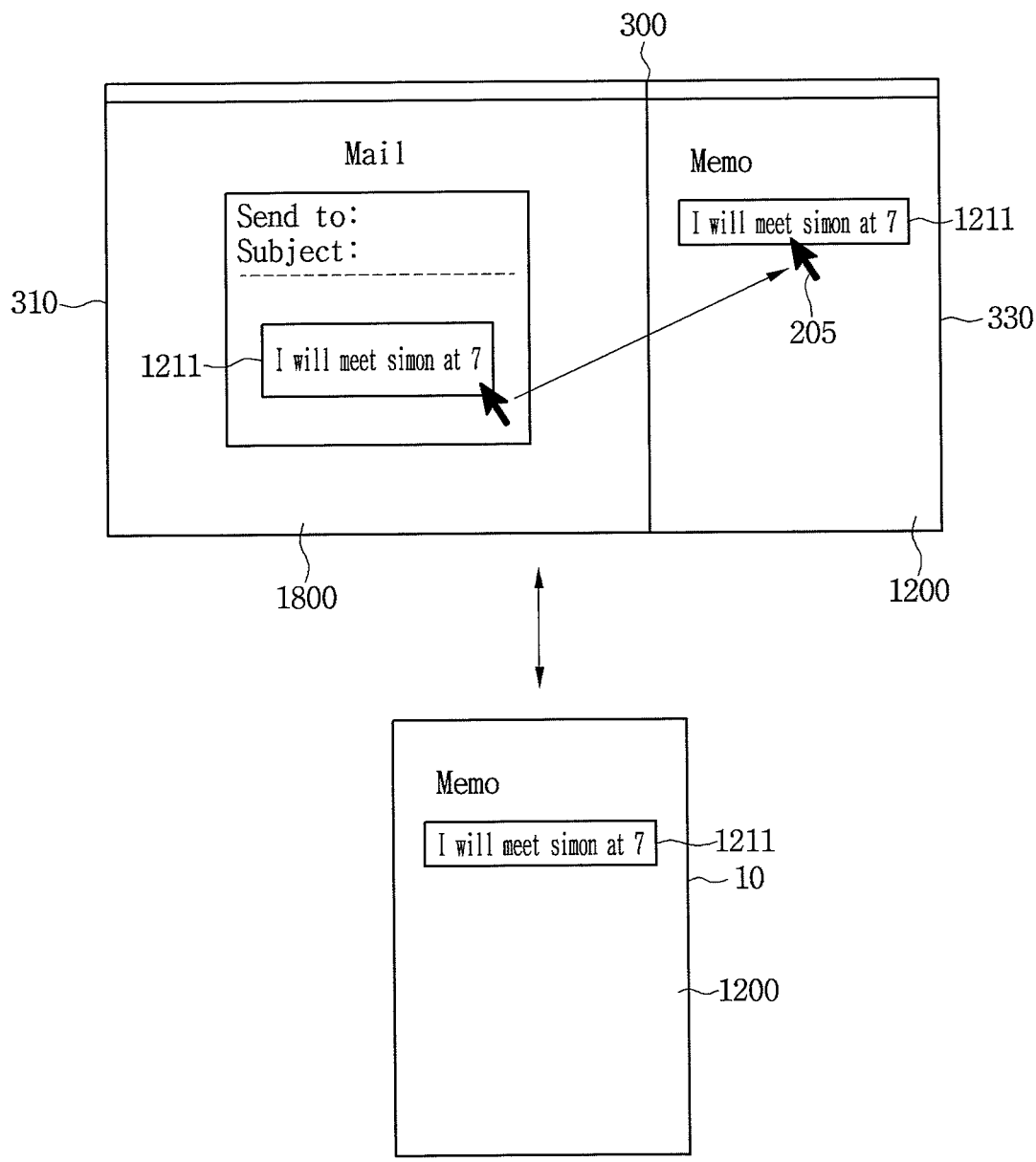
FIGS. 33 and 34 are views of receiving corresponding information from a mobile terminal by moving information output on an external input screen to a program execution screen according to various embodiments of the present invention.
Figure 34:
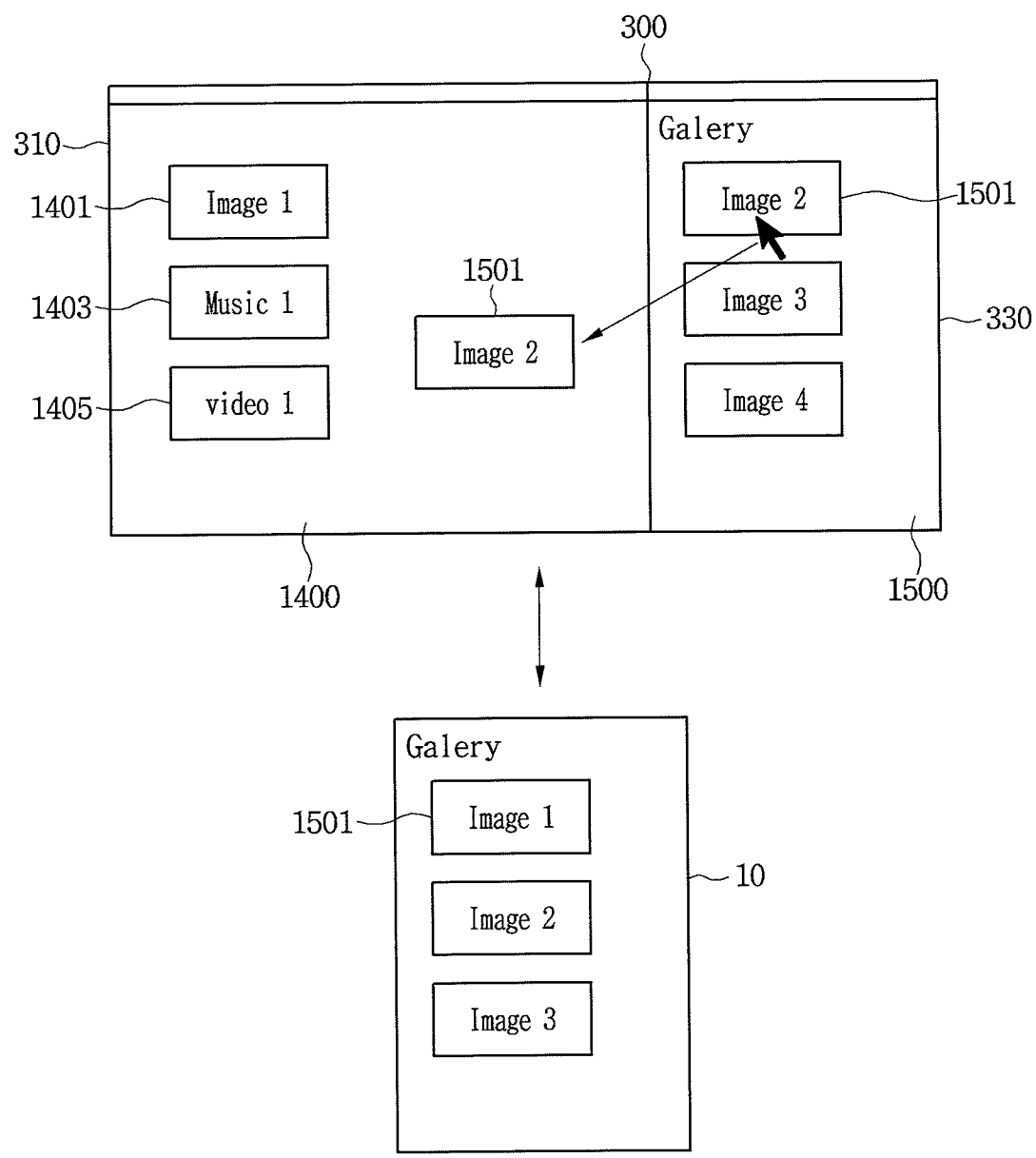

In particular, FIGS. 33 and 34 are views of receiving corresponding information from a mobile terminal by moving information output on an external input screen to a program execution screen according to various embodiments of the present invention. Herein, the external input screen is the mirroring screen of the mobile terminal 10 connected to the terminal 100 and the information move input is a drag and drop input through the movement of a pointer 205.

First, referring to FIG. 33, an execution screen 1800 of a mail application for transmitting/receiving a mail is displayed in a first area 310 of a full screen 300 and a mirroring screen 1200 that is a screen of the mobile terminal 10 may be displayed in a second area 320. The execution screen of a memo application installed on the mobile terminal 10 is displayed on the mirroring screen 1200.

If an information move input for moving a text 1211 on the mirroring screen 1200 to the execution screen 1800 of the mail application through a pointer 205 is received, the control unit 170 can receive the text 1211 from the mobile terminal 10 and control the display unit 180 to display the received text 1211 on the execution screen 1800 of the mail application. Herein, the information move input may be a trigger that the terminal 100 requests information from the mobile terminal 10 and the mobile terminal 10 may transmit information to the terminal 100 according to a received trigger.

Next, FIG. 34 is described. First, referring to FIG. 34, a content list screen 1400 including contents stored in the storage unit 140 of the terminal 100 is displayed in a first area 310 of a full screen 300 and a mirroring screen that is the execution screen 1500 of a gallery application of the mobile terminal 10 is displayed in a second area 320. If an information move input for moving an image 1501 on the execution screen 1500 of the gallery application to the content list screen 1400 through the pointer 205 is received, the control unit 170 can receive the image 1501 from the mobile terminal 10 and control the display unit 180 to display the received image 1501 on the content list screen 1400. Herein, the information move input may be a trigger that the terminal 100 requests information from the mobile terminal 10 and the mobile terminal 10 may transmit information to the terminal 100 according to a received trigger.

According to another embodiment of the present invention, a request for screen mirroring may be received from the mobile terminal 10. This will be described with reference to FIGS. 35 and 36. In particular, FIGS. 35 and 36 are views of providing a split screen as a screen mirroring request is received from a mobile terminal according to an embodiment of the present invention.

Figure 35:
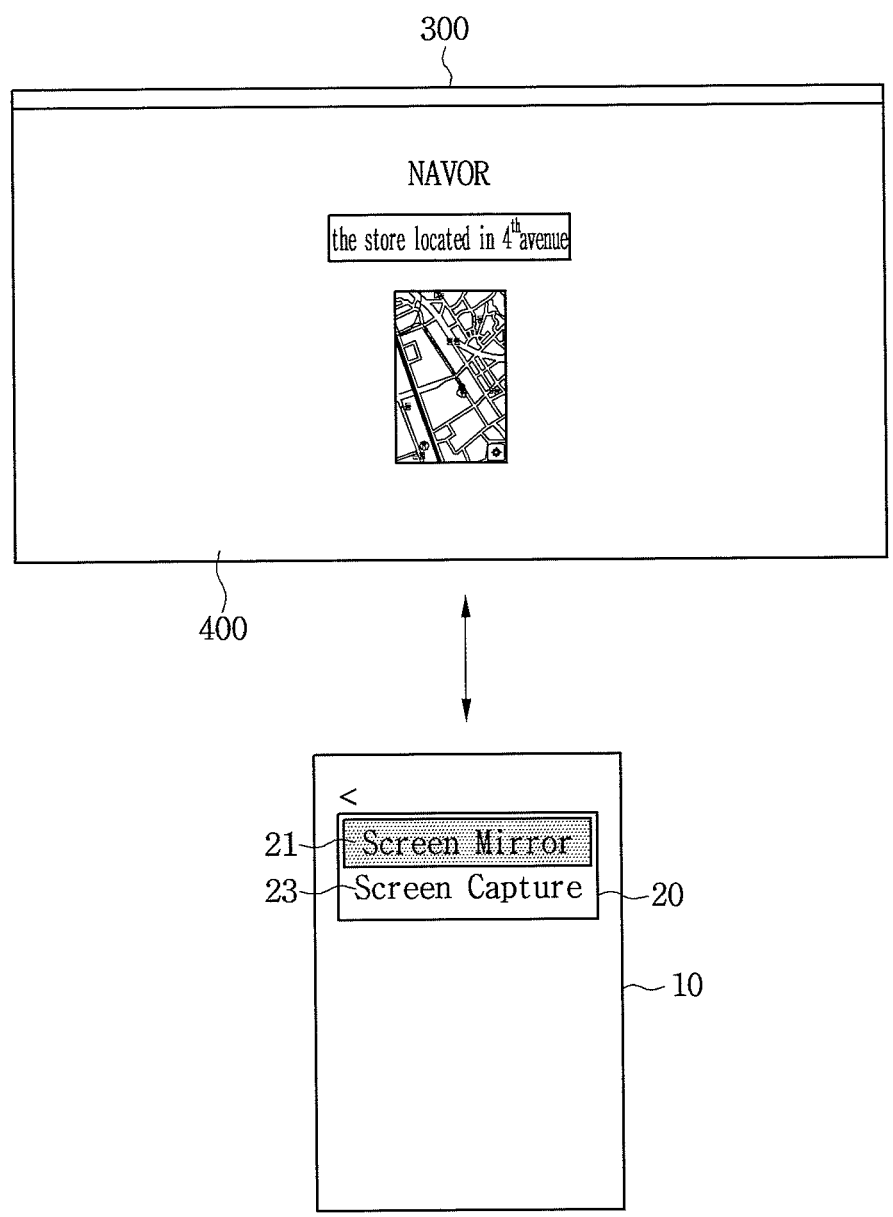
FIGS. 35 and 36 are views of providing a split screen as a screen mirroring request is received from a mobile terminal according to an embodiment of the present invention.
Figure 36:
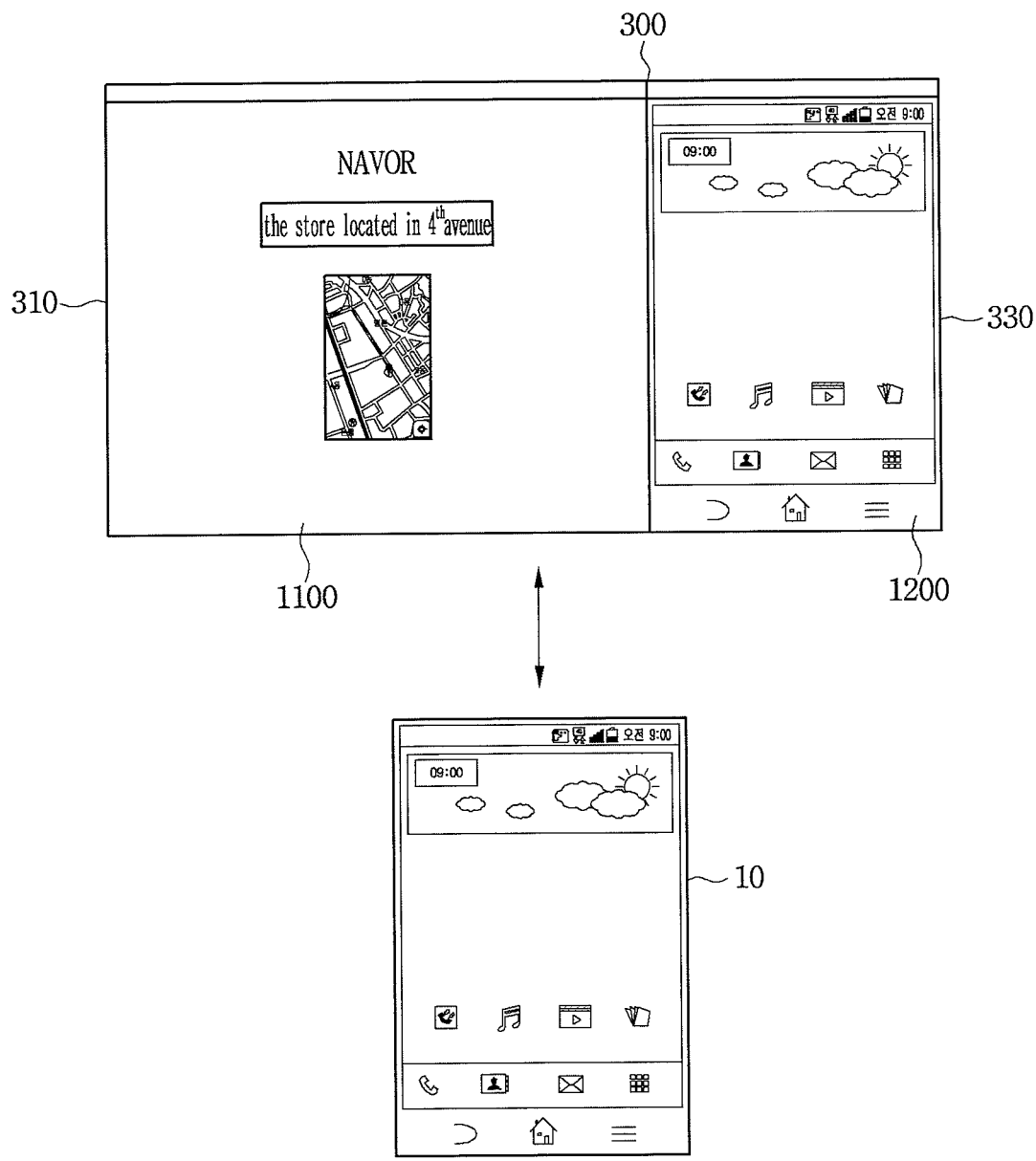

Referring to FIG. 35, the mobile terminal 10 can display a screen control unit 20 by executing a remote control application installed on the mobile terminal 10. The remote control application may be an application for allowing the mobile terminal 10 to remotely control a function of the terminal 100. The screen control menu 20 may include a screen mirroring menu 21 for providing a screen mirroring function and a screen capture menu 23 for providing a screen capture function.

If a request for selecting the screen mirroring menu 21 is received, the mobile terminal 10 may transmit a screen mirroring request to the terminal 100. The control unit 170 of the terminal 100 can split the full screen 300 into a first area 310 and a second area 330 in response to a screen mirroring request received from the mobile terminal 10 and attempt a connection with the mobile terminal 10. If the terminal 100 is connected to the mobile terminal 10, the control unit 170 can control the display unit 180 to display a program execution screen 1100 in the split first area 310 and display a mirroring screen 1200 that is a screen of the mobile terminal 10 in the split second area 330.

Figure 37:
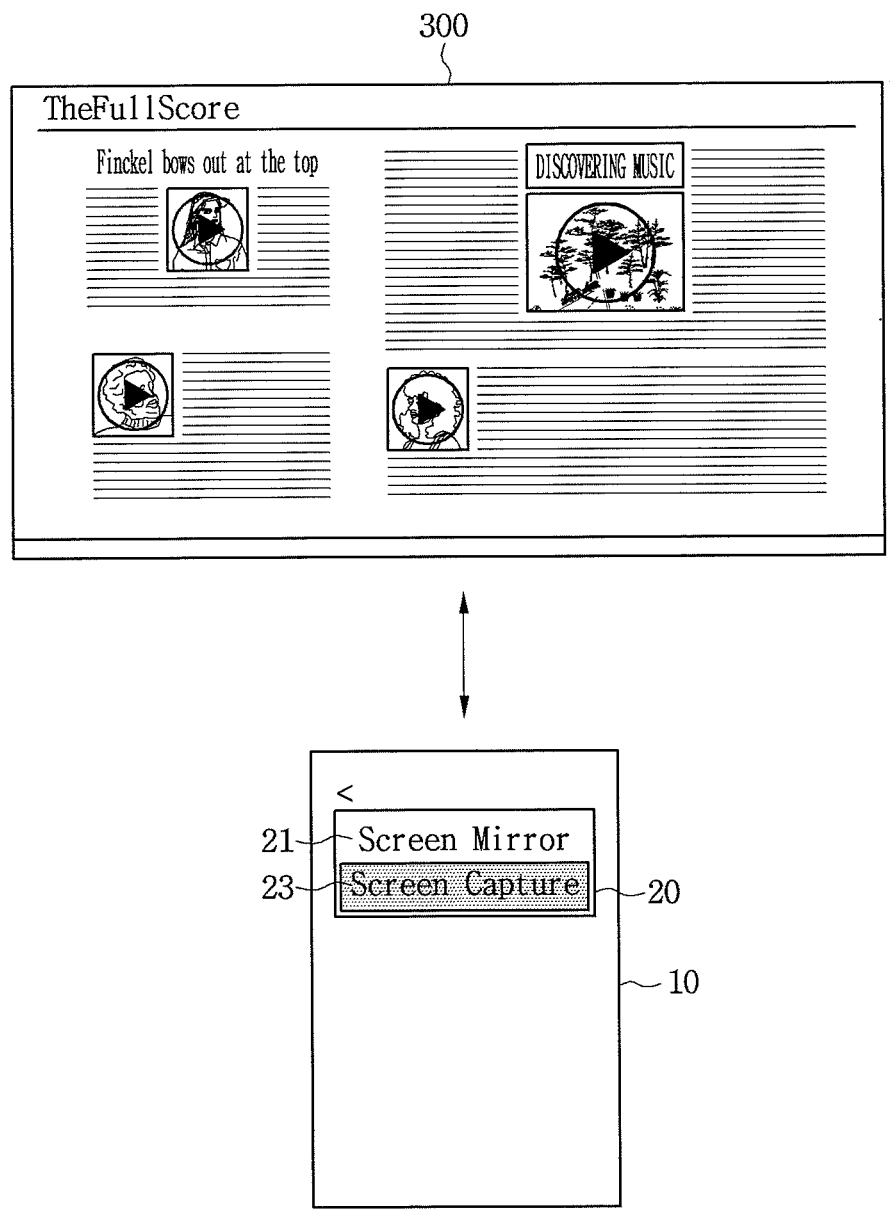
FIGS. 37 and 38 are views illustrating a process for capturing a part of a screen of a terminal through a screen capture function of a mobile terminal according to an embodiment of the present invention.
Figure 38:
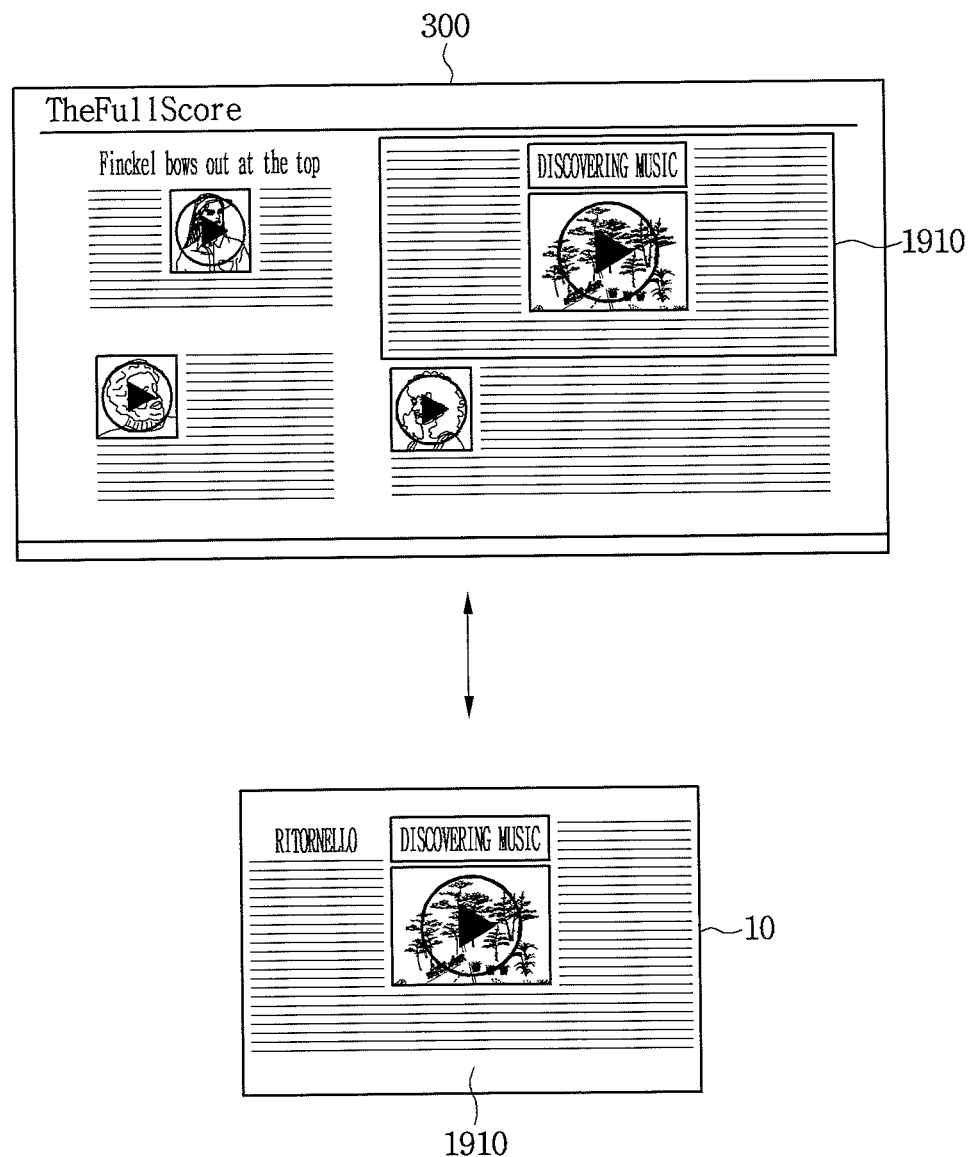

Next, FIGS. 37 and 38 are described. In particular, FIGS. 37 and 38 are views illustrating a process for capturing a part of a screen of a terminal through a screen capture function of a mobile terminal according to an embodiment of the present invention. Referring to FIG. 37, if a request for selecting a screen capture menu 23 included in the screen control menu 20 of FIG. 35 is received, the mobile terminal 10, as shown in FIG. 38, can operate in a camera mode by executing a camera application.

If a partial screen 1910 is captured on the full screen 300 of the terminal 100 through the mobile terminal 10, the mobile terminal 10 may transmit information on the captured partial screen 1910 to the terminal 100. The information on the partial screen 1910 may include an image of the partial screen 1910 captured by the mobile terminal 10.

The terminal 100 can extract the partial screen 1910 by using the information on the partial screen 1910 received from the mobile terminal 10 and store an image corresponding to the extracted partial screen 1910. The terminal 100 can transmit information on a screen provided from the full screen 300 to the mobile terminal 10. For example, the terminal 100 can transmit the address of a website corresponding to a website screen provided from the full screen 300 to the mobile terminal 10.

Figure 39:
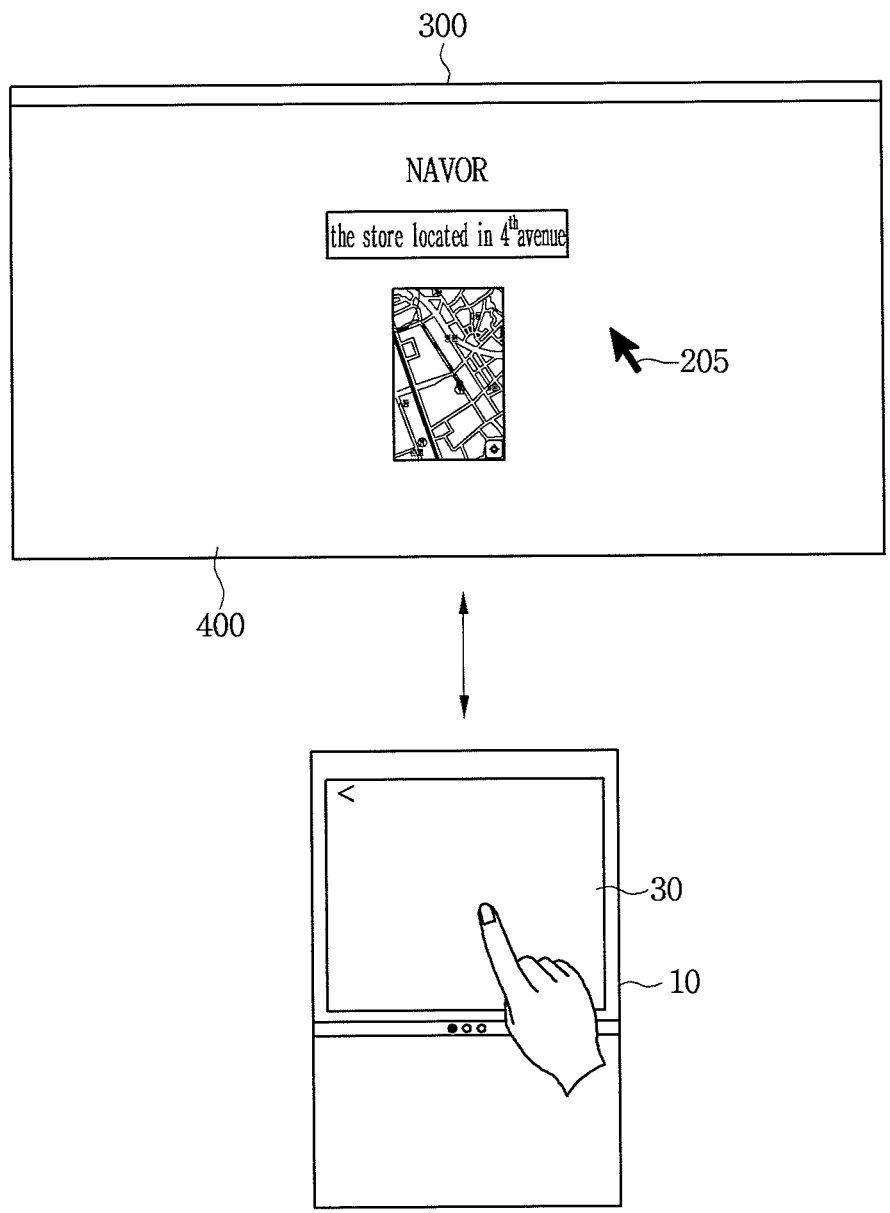
FIG. 39 is a view of controlling a terminal by utilizing a mobile terminal as a wireless touch pad according to an embodiment of the present invention.

Next, FIG. 39 is described. FIG. 39 is a view of controlling a terminal by utilizing a mobile terminal as a wireless touch pad according to an embodiment of the present invention. Referring to FIG. 39, the mobile terminal 10 may display a touch pad area 30 on a screen according to the execution of a remote control application.

The touch pad area 30 may be an area for controlling a function of the terminal 100 through a user's touch input. For example, if a command for moving a touch input is received on the touch pad area 30, the mobile terminal 10 can transmit the received command to the terminal 100 and the terminal 100 can move the pointer 205 in correspondence to a movement direction of the touch input according to the received command.

Next, FIG. 40 is described. FIG. 40 is a view of controlling a terminal by utilizing a mobile terminal as a wireless keyboard according to an embodiment of the present invention. Referring to FIG. 40, the mobile terminal 10 may display a touch pad area 30 and a keypad area 50 on a screen according to the execution of a remote control application. The keypad area 50 may be an area for inputting characters or symbols.

If a command for inputting a specific character is received on the keypad area 50, the mobile terminal 10 may transmit the received command to the terminal 100 while displaying the input character in the touch pad area 303. The terminal 100 can display an input character according to a command received from the mobile terminal 10. A user can easily perform a process for inputting a search word to the screen of the terminal 100 by utilizing the mobile terminal 10 as a wireless keyboard.

Next, FIG. 41 is described. FIG. 41 is a view of controlling a terminal by utilizing a mobile terminal as a remote controller according to an embodiment of the present invention. Referring to FIG. 41, the mobile terminal 10 may display a touch pad area 30 and a media content playback control area 60 on a screen according to the execution of a remote control application. The media content playback control area 60 may be an area for controlling a function relating to the playback of media content such as stop, play, fast forward, and rewind of media content being played in the screen 300 of the terminal 100.

If a playback control command is received on the media content playback control area 60, the mobile terminal 10 may transmit the received playback control command to the terminal 100. The terminal 100 can perform a function relating to the playback of media content according to a playback control command received from the mobile terminal 10. A user can easily perform a function of the terminal 100 by using the mobile terminal 10 as the remote control device 200.

Figure 42:
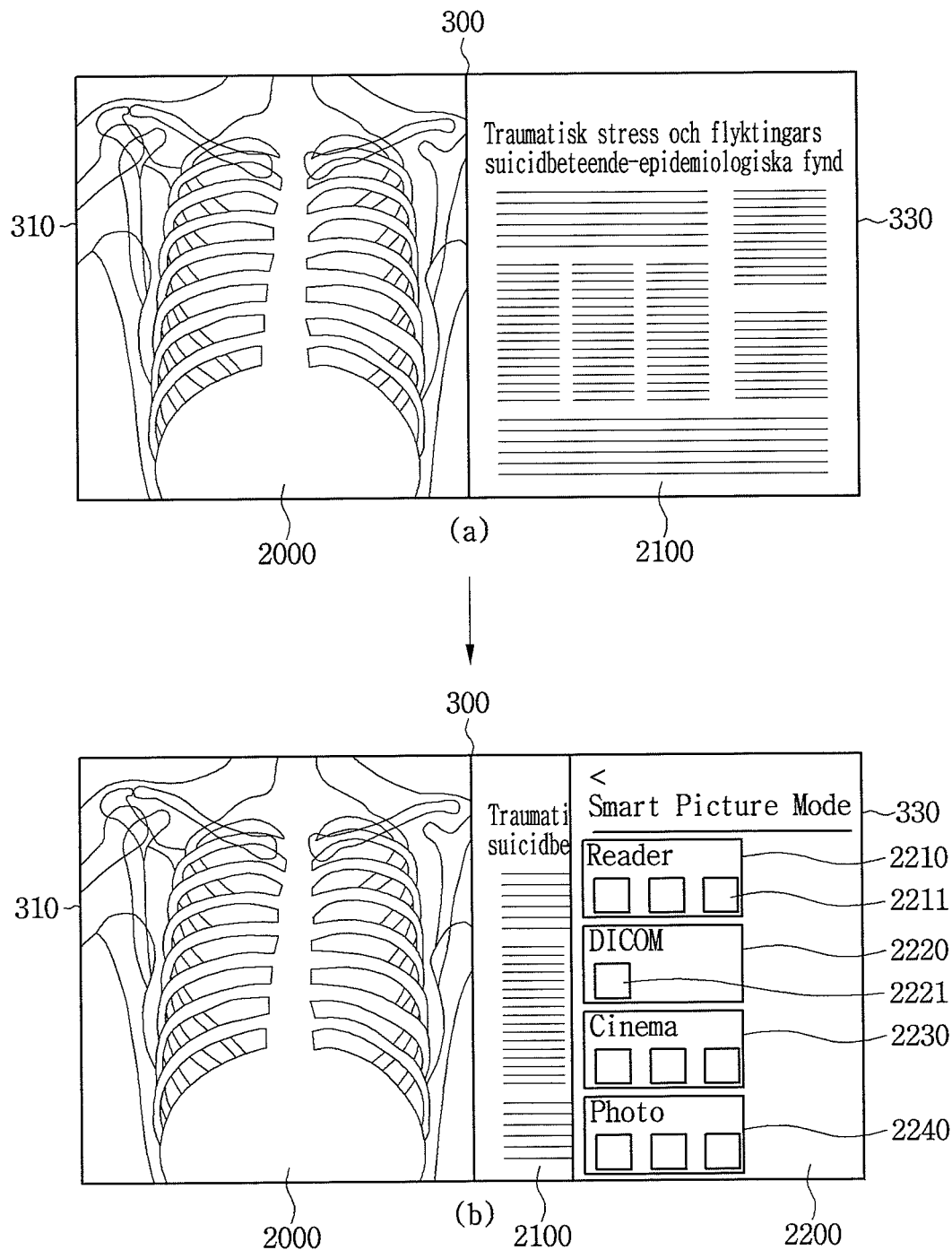
FIGS. 42 and 43 are views of providing a screen mode corresponding to the type of a file based on the type of the file output on the screen of a terminal according to an embodiment of the present invention.
Figure 43:
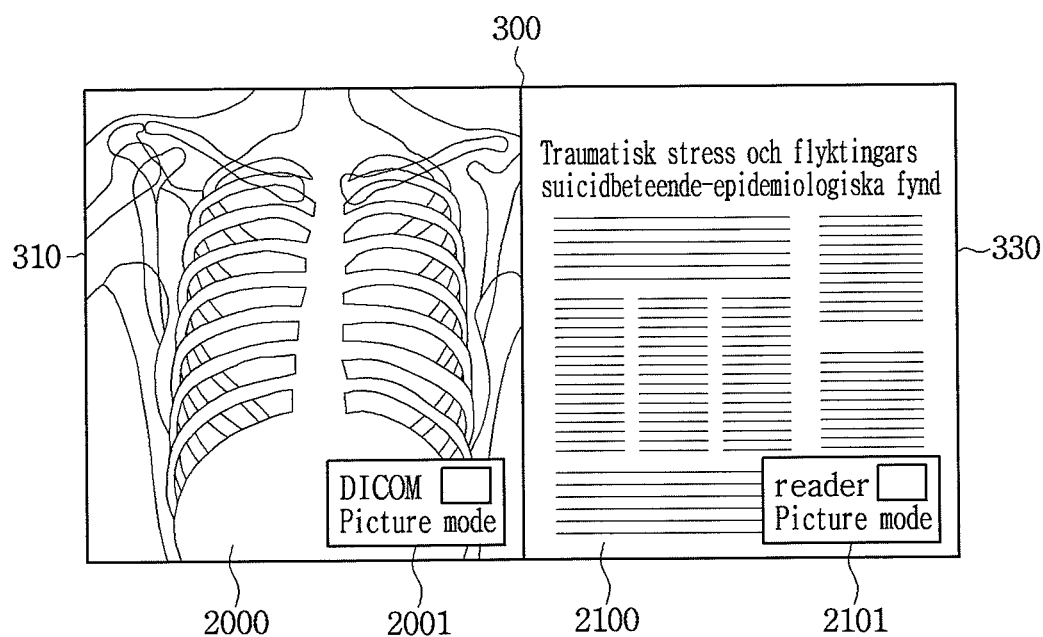

According to another embodiment of the present invention, a screen mode corresponding to the type of a file may be provided based on the type of a file output on the screen of the terminal 100. This will be described with reference to FIGS. 42 and 43. FIGS. 42 and 43 are views of providing a screen mode corresponding to the type of a file based on the type of the file output on the screen of a terminal according to an embodiment of the present invention.

First, referring to FIG. 42(*a*), a medical image screen 2000 is displayed in a first area 310 of a full screen 300 of the terminal 100 and a text screen 2100 displaying a text document is displayed in a second area 330. According to an execution request of a remote control application, the control unit 170, as shown in FIG. 42(*b*), can control the display unit 180 to display a smart picture mode setting menu 2200. The smart picture mode may be a mode for allowing a user to easily perform the utilization of each screen by providing a program appropriate for the type of content output to each screen. The type of a file may include a medical image file type, a text file type, a cinema file type, and a picture file type.

The smart picture mode setting menu 2200 may include a text reader program list 2210, a medical image program list 2220, a cinema program list 2230, and a picture program list 2240. The text reader program list 2210 may include program icons corresponding to text file utilization programs and a program add icon 2211. The medical image program list 2220 may include program icons corresponding to medical image file utilization programs and a program add icon 2221. The cinema program list 2230 may include program icons corresponding to cinema file utilization programs and a program add icon. The picture program list 2240 may include program icons corresponding to picture file utilization programs and a program add icon.

If a medical image program corresponding to the medical image screen 2000 is selected from the medical image program list 2220, the control unit 170, as shown in FIG. 43, may display the medical image screen 2000 by executing the selected medical image program. In the same manner, if a text reader program corresponding to the text screen 2200 is selected from the text reader program list 2210, the control unit 170, as shown in FIG. 43, may display the text screen 2000 by executing the selected text reader program. If executing a medical image file, the control unit 170 can execute the medial image file though a selected medical image program and if executing a text file, execute the text file through a selected text reader program. The control unit 170 can display indicators 2001 and 2102 for notifying that the smart picture mode is executed, on each screen. Each indicator may include information on an executed program.

Figure 44:
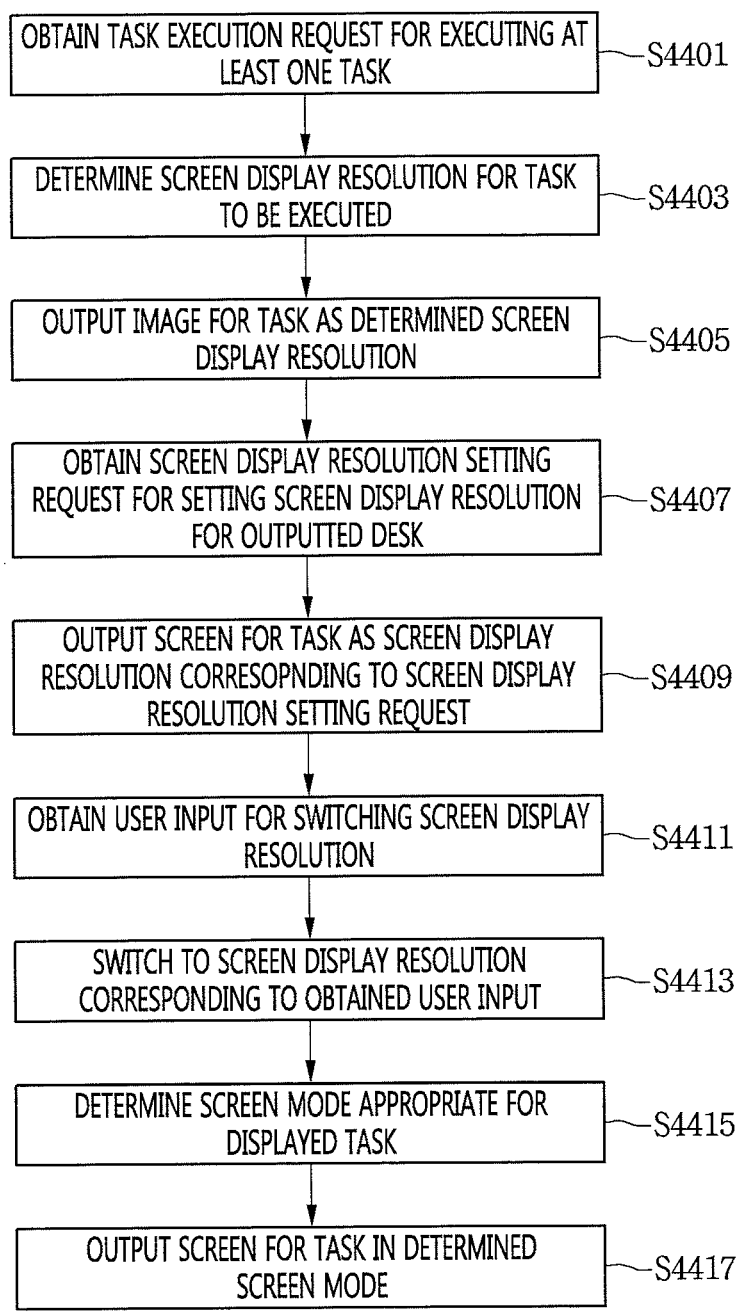
FIG. 44 is a flowchart illustrating an operating method of a terminal according to another embodiment of the present invention.

FIG. 44 is a flowchart illustrating an operating method of a terminal according to another embodiment of the present invention. Referring to FIG. 44, the control unit 170 of the terminal 100 obtains a task execution request for executing at least one task in operation S4401. Herein, a task corresponding to a task execution request may include processing on the execution of at least one content or the execution of at least one application.

According to an embodiment of the present invention, a user input corresponding to a task execution request for executing at least one task may be obtained through the user input interface unit 150. According to another embodiment of the present invention, the control unit 170 can obtain a task execution request for executing at least one task based on at least one of tasks in execution.

The control unit 170 of the terminal 100 determines a screen display resolution for outputting an image for a task corresponding to the obtained task execution request in operation S4403. The control unit 170 can determine the screen display resolution for outputting the image for the task corresponding to the obtained task execution request, to the display unit 180. Herein, the screen display resolution may include at least one of the screen size of an image corresponding to a task execution request and the resolution of an image output with respect to a task corresponding to a task execution request.

According to an embodiment of the present invention, if a task corresponding to a task execution request is one, the control unit 170 can recognize at least one of the default screen size and default resolution of an image for a task corresponding to the obtained task execution request. Then, the control unit 170 can recognize at least one of the screen size and support resolution of the display unit 180 of the terminal 100. Herein, the default resolution of an image may be a resolution supported by a corresponding task and the default screen size may be a screen size supported by a corresponding task.

The control unit 170 can compare at least one of the default screen size and default resolution of an image for a recognized task with at least one of the recognized screen size and support resolution of the display unit 180. The control unit 170 can determine the screen display resolution for outputting the image for the task corresponding to the obtained task execution request based on a comparison result.

For example, if a task corresponding to a task execution request is content playback, the control unit 170 can recognize at least one of the default screen size and default resolution of a content corresponding to the task execution request. Then, the control unit 170 can compare at least one of the default screen size and default resolution of the recognized content with at least one of the screen size and support resolution of the display unit 180. The control unit 170 can determine the screen display resolution for outputting an image for the content corresponding to the obtained task execution request based on a comparison result.

According to another embodiment of the present invention, if a task corresponding to a task execution request is more than one, the control unit 170 can recognize at least one of the default screen size and default resolution of an image for each task corresponding to the obtained task execution request. Then, the control unit 170 can recognize at least one of the screen size and support resolution of the display unit 180 of the terminal 100. Herein, the default resolution of an image may be a resolution supported by each corresponding task and the default screen size may be a screen size supported by each corresponding task.

The control unit 170 can compare at least one of the default screen size and default resolution of an image for each recognized task with at least one of the recognized screen size and support resolution of the display unit 180. The control unit 170 can determine the screen display resolution for outputting an image for each task corresponding to each obtained task execution request based on a comparison result. Herein, a plurality of tasks may be output to the full screen of the display unit 180 at the same time and one of a plurality of tasks may be output to the full screen of the display unit 180.

For example, if a task corresponding to a task execution request is the execution of a plurality of applications, the control unit 170 can recognize at least one of the default screen size and default resolution of the plurality of applications corresponding to the task execution request. Then, the control unit 170 can compare at least one of the default screen size and default resolution of the plurality of recognized applications with at least one of the recognized screen size and support resolution of the display unit 180. The control unit 170 can determine the screen display resolution for outputting an image for each task corresponding to the obtained task execution request based on a comparison result. Accordingly, the control unit 170 can determine that that the screen display resolution for each of a plurality of applications is identical or different.

The control unit 170 of the terminal 100 outputs with the determined screen display resolution, to the display unit 180, an image for a task corresponding to the obtained task execution request in operation 54405. The control unit 170 can output an image for at least one task corresponding to the obtained task execution request, to the full screen or a partial screen of the display unit 180.

Herein, the screen display resolution may include at least one of the screen size of an image corresponding to a task execution request and the resolution of an image output with respect to a task corresponding to a task execution request. According to an embodiment of the present invention, if a task corresponding to a task execution request is one, the control unit 170 can output an image for a task corresponding to the task execution request to the full screen of the display unit 180 with a screen display resolution determined for the task corresponding to the task execution request.

For example, if a task corresponding to a task execution request is content playback, the control unit 170 can output an image for the content to the full screen of the display unit 180 with a screen display resolution determined for the content corresponding to the task execution request. In more detail, if it is determined that the screen display resolution of a content corresponding to a task execution request corresponds to a first resolution, the control unit 170 can output the content to the full screen of the display unit 180 with the first resolution.

Figure 45:
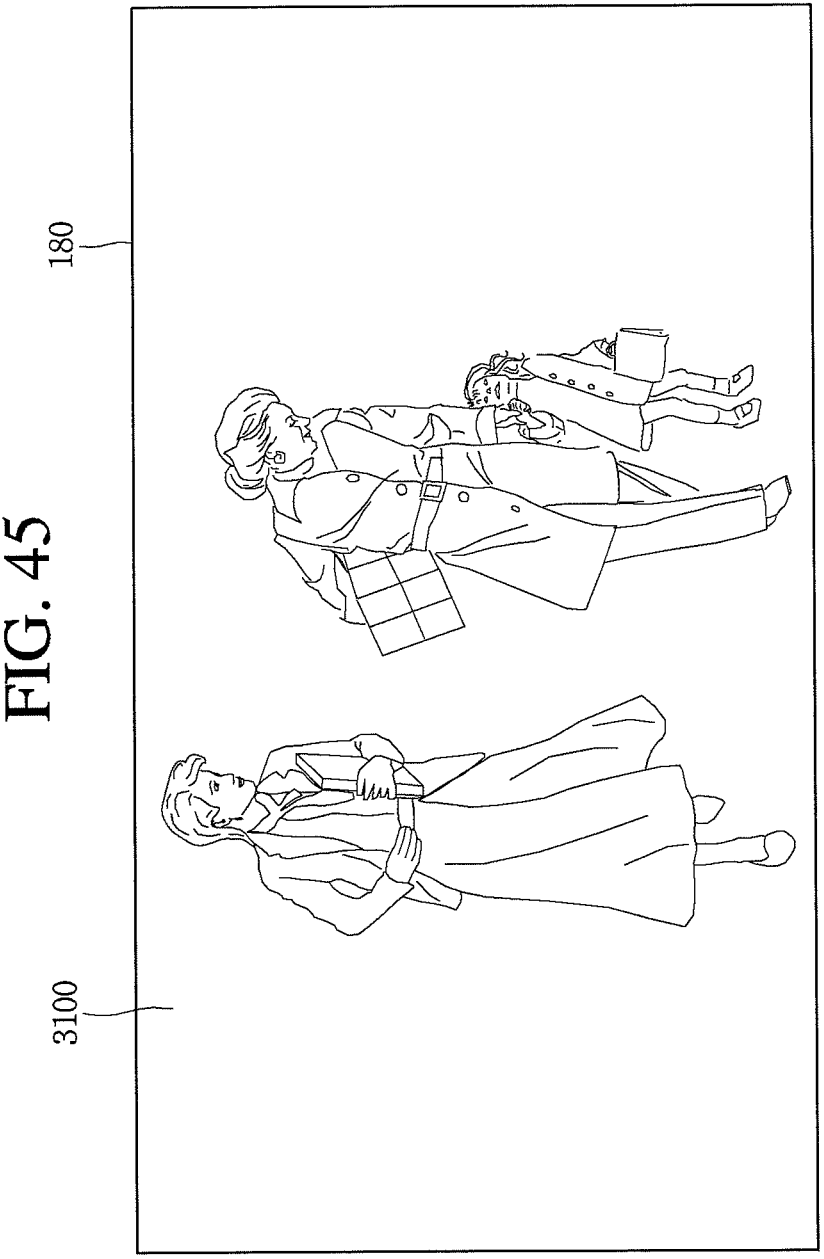
FIG. 45 is a view illustrating a task display screen corresponding to content execution according to an embodiment of the present invention.

This will be described with reference to FIG. 45. FIG. 45 is a view illustrating a task display screen corresponding to content execution according to an embodiment of the present invention. Referring to FIG. 45, the control unit 170 can output a first screen 3100 for the content playback that is a first task corresponding to a task execution request, to the display unit 180. The control unit 170 can output the content with a first resolution that is a screen display resolution determined for the content playback, that is, the first task.

Accordingly, even if the resolution of the display unit 180 supports a second resolution, the control unit 170 can output a screen for the content playback, that is, the first task, with the first resolution corresponding to the determined screen display resolution, to the display unit 180. Then, the control unit 170 can output the screen for the content playback, that is, the first task, with a first screen size corresponding to the determined screen display resolution, to the display unit 180.

According to another embodiment of the present invention, if a task corresponding to a task execution request is more than one, the control unit 170 can output an image for each task corresponding to the task execution request with each screen display resolution determined for the each task, to the display unit 180. In addition, each screen display resolution determined for each task may be identical or different. Additionally, a plurality of tasks may be output to one screen of the display unit 180 at the same time or only one task may be output to one screen of the display unit 180.

Figure 46:
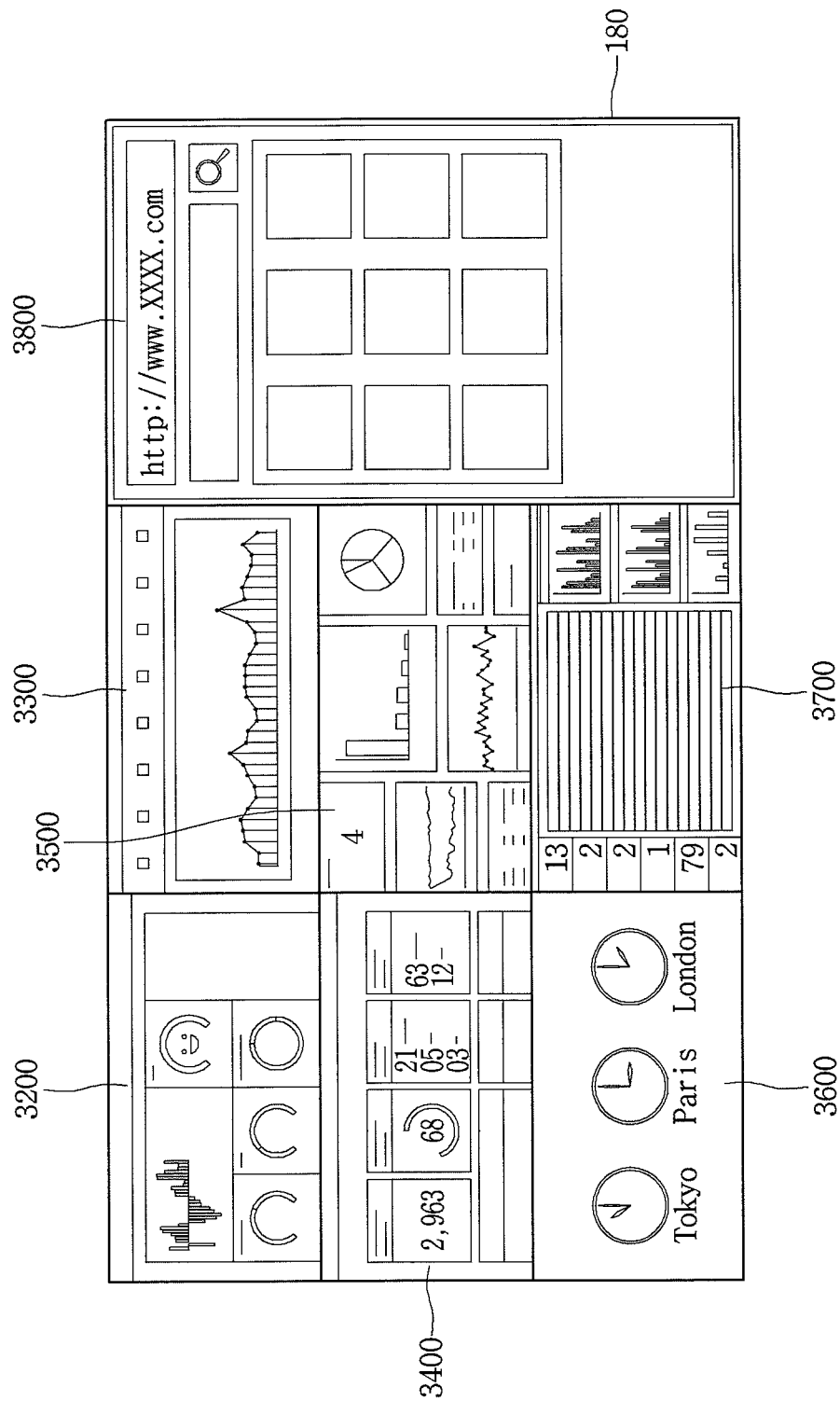
FIG. 46 is a view of outputting a screen for each of a plurality of tasks according to an embodiment of the present invention.

This will be described with reference to FIG. 46. FIG. 46 is a view of outputting a screen for each of a plurality of tasks according to an embodiment of the present invention. Referring to FIG. 46, the control unit 170 can output, to the display unit 180, second to eighth screens 3200, 3300, 3400, 3500, 3600, 3700, and 3800, that is, a plurality of tasks, for respective second to eighth tasks that are the plurality of tasks corresponding to a task execution request.

Then, the control unit 170 can output the screen 3200 for the second task to a partial screen of the display unit 180 with a second resolution corresponding to a determined screen display resolution. The control unit 170 can output the screen 3200 for the second task to the display unit 180 with a second screen size corresponding to the screen display resolution.

The control unit 170 can output the screen 3300 for the third task to a partial screen of the display unit 180 with the second resolution corresponding to the determined screen display resolution. The control unit 170 can output the screen 3300 for the second task to the display unit 180 with the second screen size corresponding to the screen display resolution. The control unit 170 can output the screen 3400 for the fourth task to a partial screen of the display unit 180 with the first resolution corresponding to the determined screen display resolution.

The control unit 170 can output the screen 3400 for the fourth task to the display unit 180 with the second screen size corresponding to the screen display resolution. The control unit 170 can output the screen 3500 for the fifth task to a partial screen of the display unit 180 with the first resolution corresponding to the determined screen display resolution. The control unit 170 can output the screen 3500 for the fifth task to the display unit 180 with the second screen size corresponding to the screen display resolution. The control unit 170 can output the screen 3600 for the sixth task to a partial screen of the display unit 180 with the second resolution corresponding to the determined screen display resolution.

The control unit 170 can output the screen 3600 for the sixth task to the display unit 180 with the second screen size corresponding to the screen display resolution. The control unit 170 can output the screen 3700 for the seventh task to a partial screen of the display unit 180 with a third resolution corresponding to the determined screen display resolution. The control unit 170 can output the screen 3700 for the seventh task to the display unit 180 with the second screen size corresponding to the screen display resolution.

The control unit 170 can output the screen 3300 for the eighth task to a partial screen of the display unit 180 with a fourth resolution corresponding to the determined screen display resolution. The control unit 170 can output the screen 3800 for the eighth task to the display unit 180 with a third screen size corresponding to the screen display resolution. The first to fourth resolutions may be different from each other. Also, the first to third screen sizes may be different from each other.

In such a way, the terminal 100 can output a screen for each of a plurality of tasks output to the display unit 180 with a different resolution and screen size. Moreover, the control unit 170 can output information on a screen display resolution determined for each of a plurality of tasks, to each of a plurality of screens for the plurality of tasks output to the display unit 180.

Figure 47:
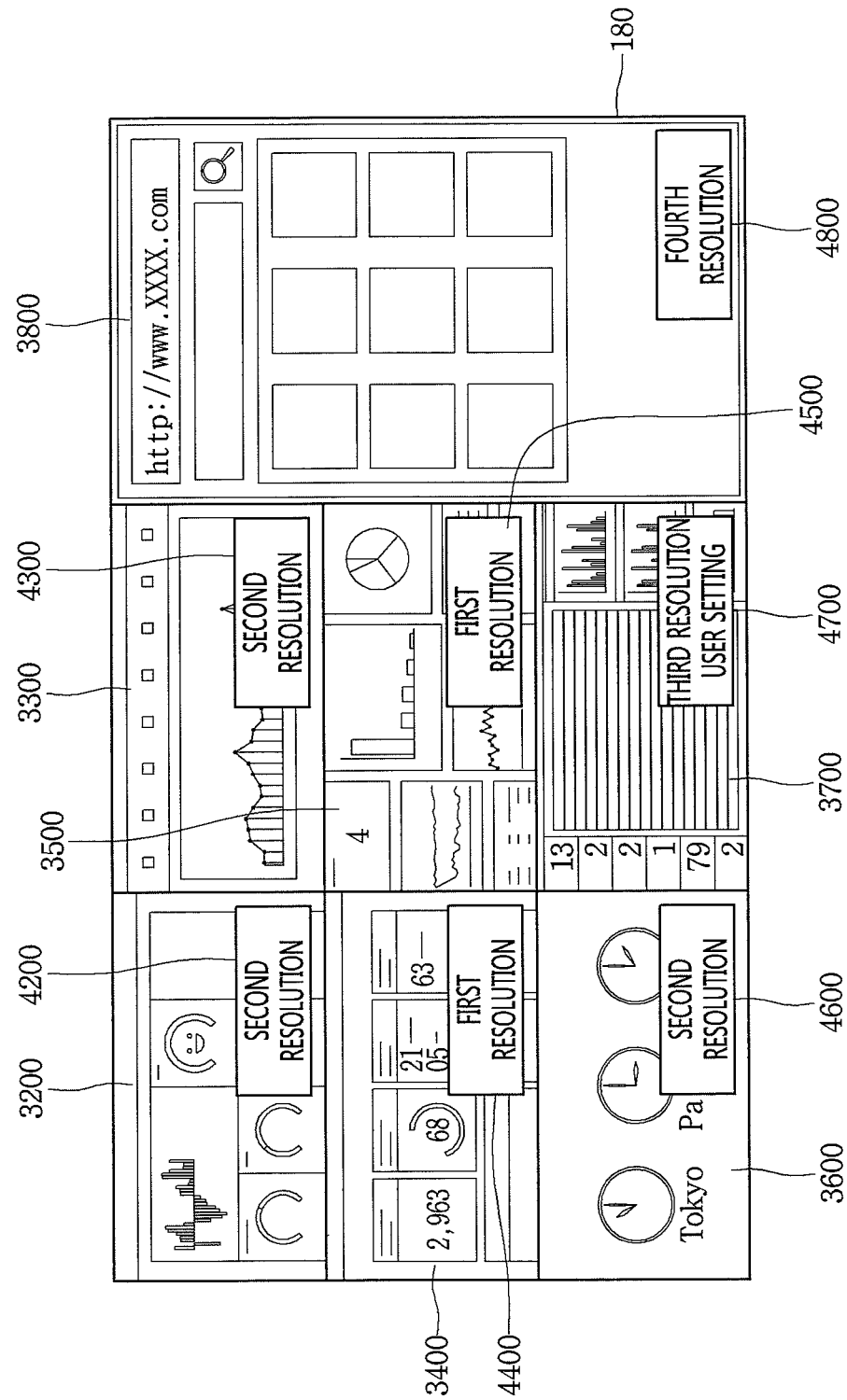
FIG. 47 is a view illustrating an information display screen for a screen display resolution according to an embodiment of the present invention.

This will be described with reference to FIG. 47. FIG. 47 is a view illustrating an information display screen for a screen display resolution according to an embodiment of the present invention. Referring to FIG. 47, the control unit 170 can output, to the display unit 180, second to eighth screens 3200, 3300, 3400, 3500, 3600, 3700, and 3800, that is, a plurality of tasks, for respective second to eighth tasks that are the plurality of tasks corresponding to a task execution request.

Then, the control unit 170 can output screen display resolution information windows 4200, 4300, 4400, 4500, 4600, 4700, and 4800 for outputting resolution information that is information on a screen display resolution determined for and applied to each of the second to eighth tasks, that is, a plurality of tasks, to second to eighth screens 3200, 3300, 3400, 3500, 3600, 3700, and 3800, that is, a plurality of screens for the plurality of tasks.

Additionally, the control unit 170 can display information on a screen size on the screen display resolution information window and display whether there is a user setting for screen display resolution. For example, as shown in FIG. 7, the control unit 170 can output a third resolution (that is, resolution information) and a user setting display for a screen display resolution corresponding to a user setting, to the screen display resolution information window 4700 of the screen 3700 for the seventh task with a screen display resolution according to the user setting. Description for the information display of the screen display resolution is not limited to the above embodiment. Accordingly, the description may vary according to a user's or designer's selection.

Again, FIG. 44 is referenced. The control unit 170 obtains a screen display resolution setting request for setting a screen display resolution for at least one task output to the display unit 180 in operation S4407. The control unit 170 outputs at least one output task to the display unit 180 with a screen display resolution corresponding to the obtained screen display resolution setting request in operation 54408.

The control unit 170 can obtain a screen display resolution setting request for setting a screen display resolution for a specific task. For example, the control unit 170 can obtain a user input for setting a screen display resolution for a specific task. Accordingly, the control unit 170 can output a screen for a specific task to the display unit 180 with a screen display resolution corresponding to the obtained user input.

Figure 48:
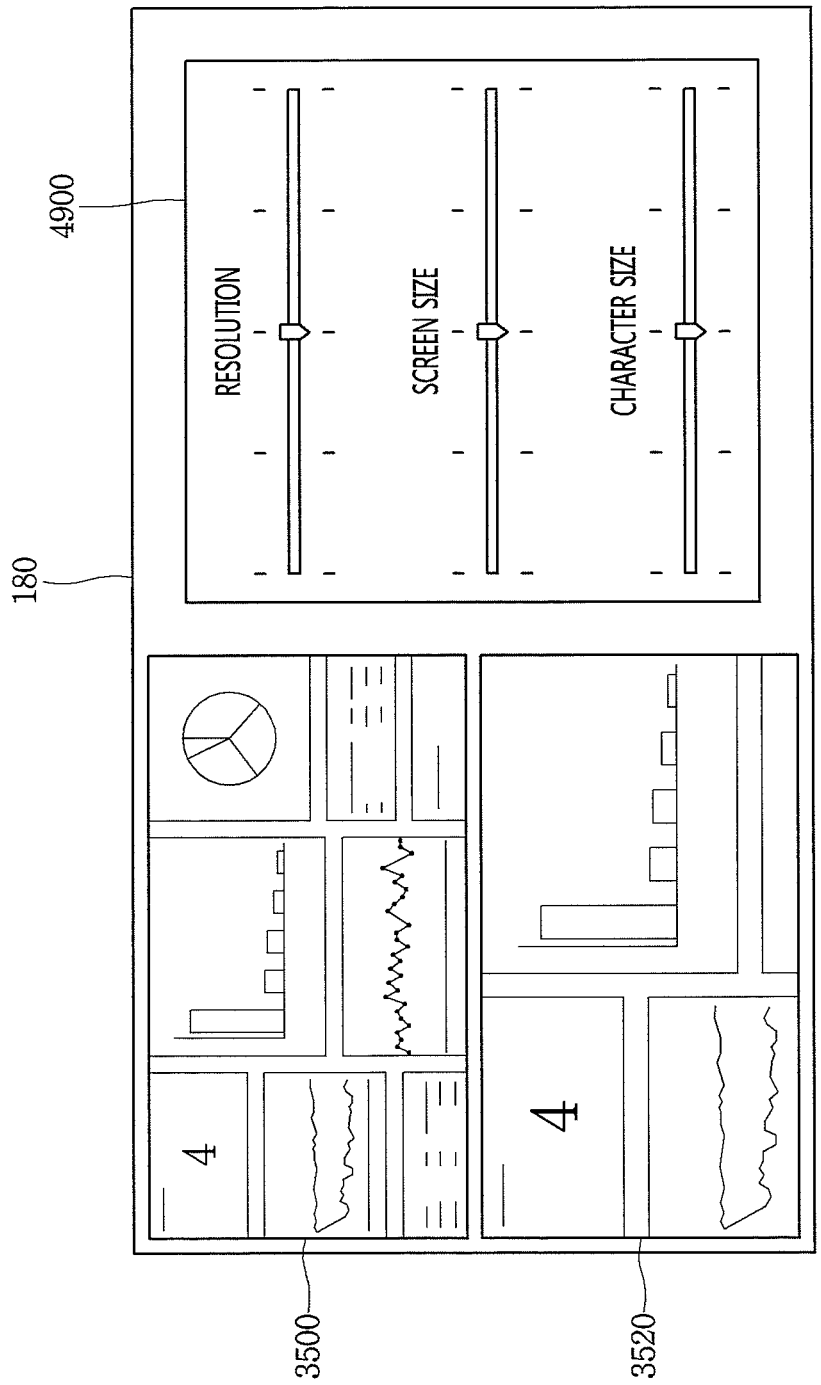
FIG. 48 is a view illustrating a screen display resolution setting screen according to an embodiment of the present invention.

This will be described with reference to FIG. 48. FIG. 48 is a view illustrating a screen display resolution setting screen according to an embodiment of the present invention. Referring to FIG. 48, the control unit 170 can output a setting screen for setting a screen display resolution for at least one task to the display unit 180. The control unit 170 can output a setting window 4900 for setting a screen display resolution to the display unit 180. The control unit 170 can output a menu for setting at least one of a resolution, a screen size, and a character size, which are included in the screen display resolution for at least one task.

For example, the control unit 170 can output a slide for setting each of a resolution, a screen size, and a character size, which are included in the screen display resolution in the setting window 4900. Then, the control unit 170 can obtain a user input for a slide for each of a resolution, a screen size, and a character size, which are displayed on the setting window 4900 for setting the screen display resolution for at least one task. The control unit 170 can output a screen for at least one selected task to the display unit 180 with a screen display resolution corresponding to the obtained user input.

Then, the control unit 170 can output an original screen before setting a screen for a task corresponding to a setting for a screen display resolution and a setting screen corresponding to the obtained screen display resolution setting, to the display unit 180. Herein, the original screen may be a screen output with a screen display resolution determined in operation S105.

This will be described with reference to FIG. 48. Referring to FIG. 48, the control unit 170 can output a fifth screen 3500 that is an original screen for a fifth task to a partial area of the display unit 180 and output a fifth setting screen 3520 that is a setting screen corresponding to a screen display resolution setting for the fifth task in another partial area. Accordingly, a user can compare a setting screen according to a screen display resolution setting for the fifth task, that is, a selected task, with a screen before setting.

Moreover, the control unit 170 can output a plurality of screen display resolutions to a setting screen for setting a screen display resolution for at least one task output to the display unit 180. The control unit 170 can obtain a user input for selecting one of the plurality of screen display resolutions and output at least one output task to a screen corresponding to the selected screen display resolution.

In such a way, the control unit 170 can obtain a user input for setting a screen display resolution for at least one task and output a screen for at least one selected task to the display unit 180 with a screen display resolution corresponding to the obtained user input. Moreover, the control unit 170 can output information on a screen display resolution corresponding to the performance of the terminal 100 to a setting screen for setting a screen display resolution. In more detail, the control unit 170 can calculate a screen display resolution corresponding to the performance of the terminal 100 based on the performance of the control unit 170 and the screen size and screen resolution of the display unit 180, and output information on the calculated screen display resolution to the display unit 180.

Again, FIG. 44 is referenced. The control unit 170 obtains a user input for switching a screen display resolution in operation S4411 and switches at least one task output to the display unit 180 to a screen display resolution corresponding to the obtained user input in operation S4413.

The control unit 170 can obtain a user input for switching a screen display resolution for at least one task output to the display unit 180. Then, the control unit 170 can switch at least one task output to the display unit 180 to a screen display resolution corresponding to the obtained user input and output it. Accordingly, the control unit 170 can switch a screen display resolution of one among a plurality of tasks output to the display unit 180, some tasks among the plurality of tasks, or all of the plurality of tasks and output it.

Figure 49:
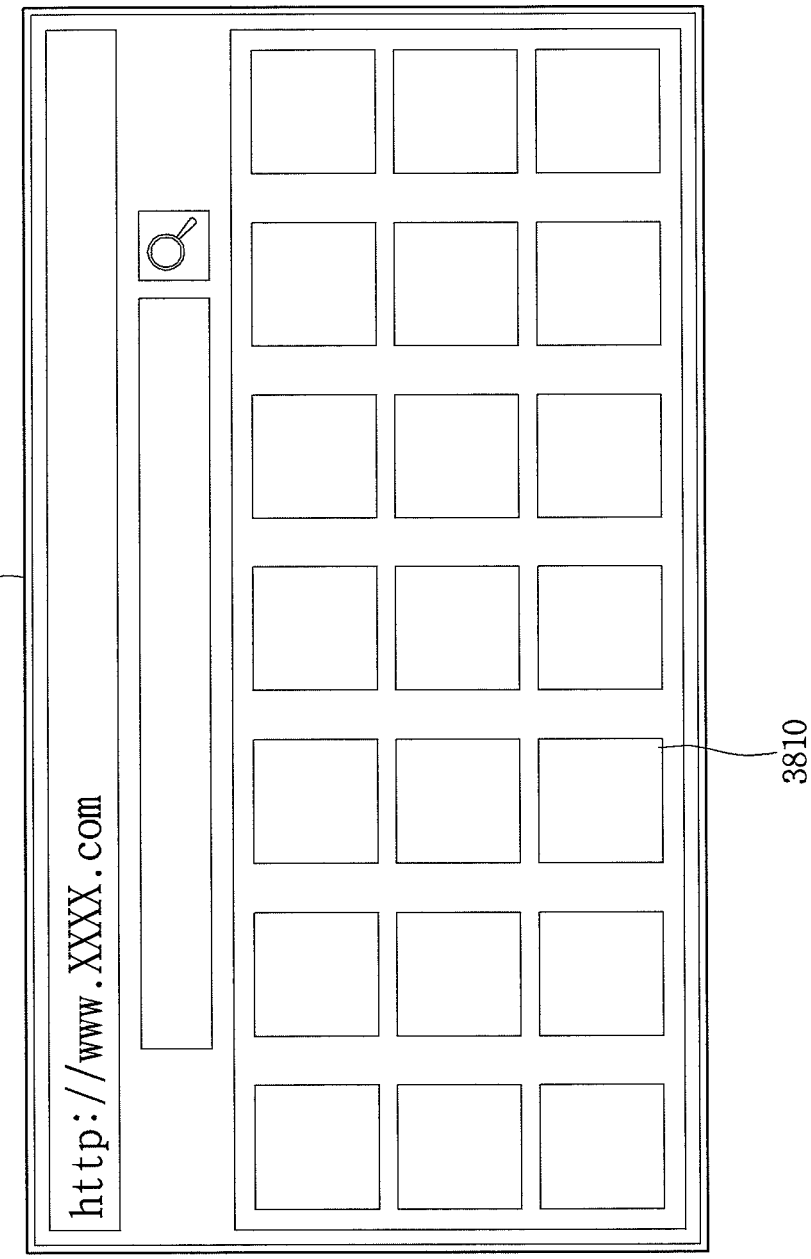
FIG. 49 is a view illustrating a screen before screen display resolution switching according to an embodiment of the present invention.
Figure 50:
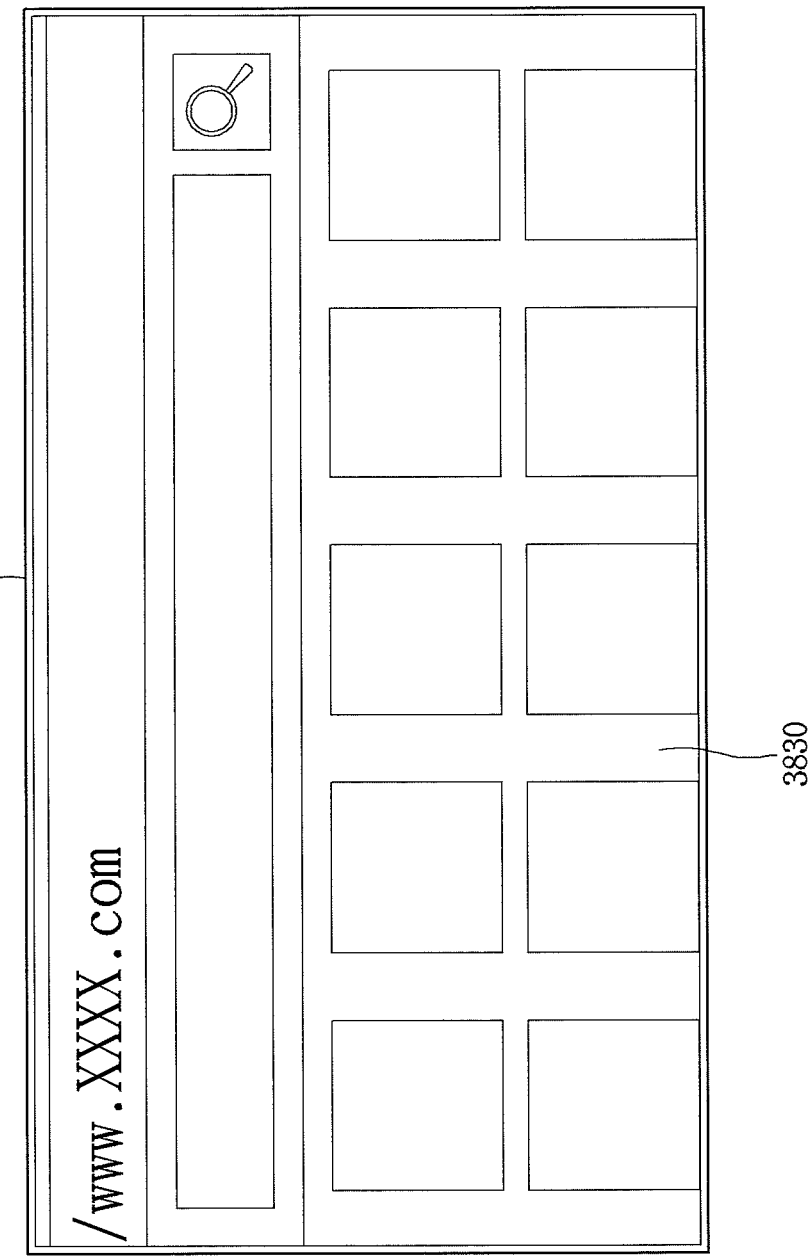
FIG. 50 is a view illustrating a screen after screen display resolution switching according to an embodiment of the present invention.

This will be described with reference to FIGS. 49 and 50. FIG. 49 is a view illustrating a screen before screen display resolution switching according to an embodiment of the present invention. FIG. 50 is a view illustrating a screen after screen display resolution switching according to an embodiment of the present invention.

Referring to FIG. 49, the control unit 170 can output a web browser screen 3810 for a web browser, that is, an eighth task, to the display unit 180 with a first resolution corresponding to the determined screen display resolution. Then, if obtaining a user input for switching the screen display resolution of the output web browser screen 3810, the control unit 170 can output the web browser screen with a screen display resolution corresponding to the obtained user input. Accordingly, as shown in FIG. 50, the control unit 170 can output the web browser screen 3830 with a screen display resolution for a web browser, that is, an eighth task, which switches from the first resolution to the third resolution.

Moreover, a user input for switching a screen display resolution may be various user inputs such as a hot key and a shortcut key. For example, a user input for switching a screen display resolution may be a user input for inputting a first hot key provided at the remote control device 200. In another example, a user input for switching a screen display resolution may be a user input for inputting a shortcut key that presses a control key and an R key of a keyboard device connected to the terminal 100 at the same time.

In another example, a user input for switching a screen display resolution may be a user input for inputting a shortcut key that selects a control key and an R key of a keyboard screen displayed on the display unit 180 of the terminal 100. Description for the user input for switching the screen display resolution is not limited to the above embodiment. Accordingly, a user input for switching a screen display resolution may be input to the terminal 100 through various inputs according to a user's or designer's selection.

Moreover, if obtaining a user input for switching a screen display resolution again, the control unit 170 can output a screen before the switching of the screen display resolution, to the display unit 180. For example, if the control unit 170 obtains a user input for switching a screen display resolution while a screen for a first task is output with a first screen display resolution, the control unit 170 can output the screen for the first task to the display unit 180 with a second screen display resolution.

Then, if the control unit 170 obtains a user input for switching a screen display resolution while the screen for the first task is output with the second screen display resolution, the control unit 170 can output the screen for the first task to the display unit 180 with the first second screen display resolution.

Moreover, while outputting a screen for one among a plurality of tasks to the display unit 180 based on a user input for switching a task screen, the control unit 170 can output a screen for another task. For example, if obtaining a user input for switching a task screen during the outputting of the screen for the first task, the control unit 170 can output a screen for a second task to the display unit 180.

Additionally, if obtaining a user input for switching a task screen during the outputting of the screen for the first task, the control unit 170 can output a list screen for a plurality of tasks to the display unit 180. Then, if a user input for selecting one task from the output list screen for a plurality of tasks is obtained, the control unit 170 can output a screen for the selected task to the display unit 180.

Figure 51:
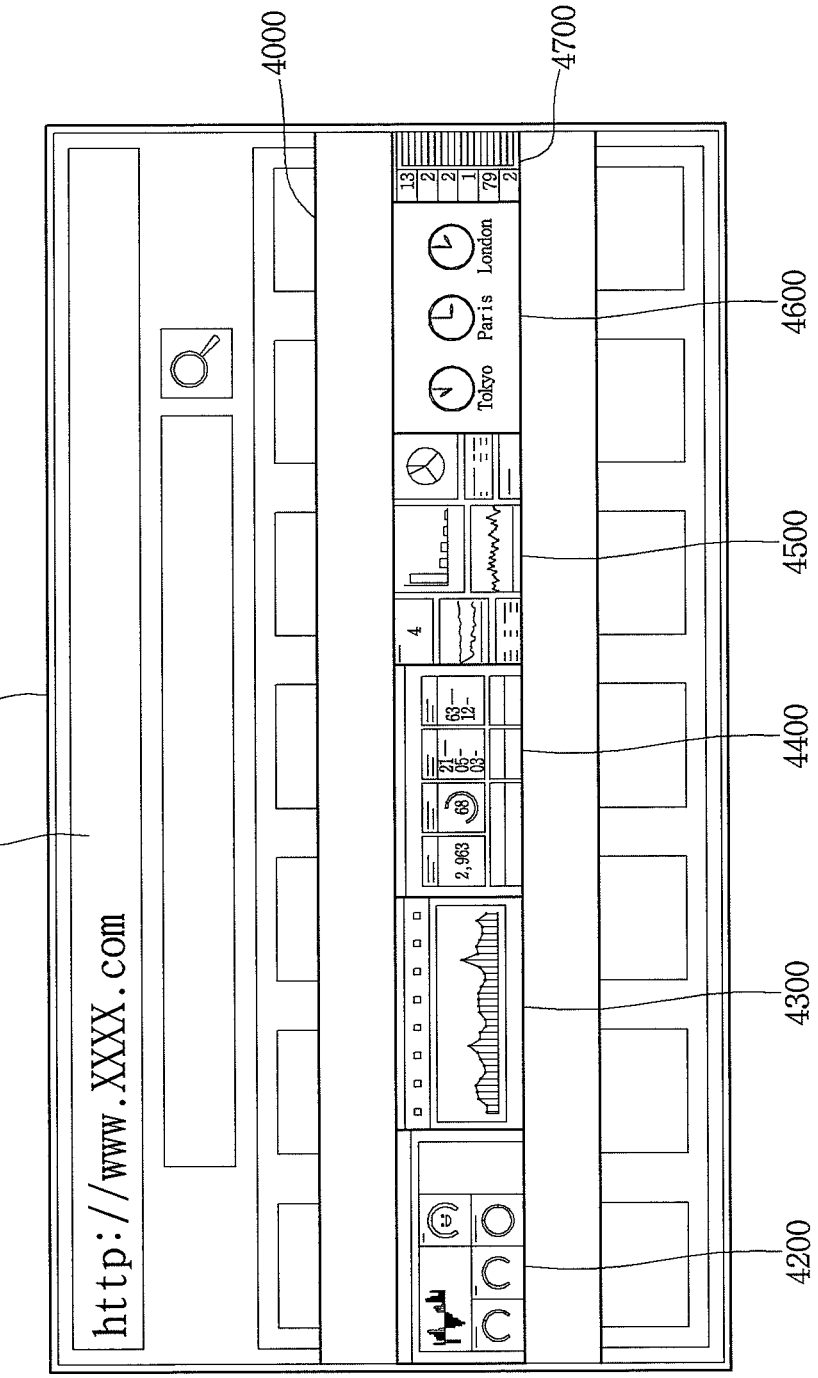
FIG. 51 is a view illustrating a screen that represents a plurality of task lists according to an embodiment of the present invention.

This will be described with reference to FIG. 51. FIG. 51 is a view illustrating a screen that represents a plurality of task lists according to an embodiment of the present invention. Referring to FIG. 51, the control unit 170 can output, to the display unit 180, a screen 3810 for a third task among second to seventh tasks, that is, a plurality of tasks. The control unit 170 can obtain a user input for outputting a screen for another task other than the third task among the second to seventh tasks, that is, a plurality of tasks, to the display unit 180. Accordingly, the control unit 170 can output, to the display unit 180, a list window 4000 for representing a list for the second to seventh tasks, that is, a plurality of tasks.

The control unit 170 can output thumbnail images 4200, 4300, 4400, 4500, 4600, and 4700 for the respective second to seventh tasks, that is, a plurality of tasks, to the list window 4000. Then, if obtaining a user input for selecting one among the plurality of thumbnail images 4200, 4300, 4400, 4500, 4600, and 4700, the control unit 170 can output a screen for a task corresponding to the selected thumbnail image to the display unit 180.

Again, FIG. 44 is referenced. The control unit 170 can determine a screen mode appropriate for at least one task output to the display unit 180 in operation S4415. Then, the control unit 170 can output at least one task output to the display unit 180 in the determined screen mode in operation S4417.

The control unit 170 can determine a screen mode appropriate for at least one task output to the display unit 180. Herein, the screen mode may be a mode for adjusting at least one of power consumption, brightness, screen size, character size, and resolution for outputting a screen for a task output to the display unit 180.

For example, the screen mode may include at least one of a power saving mode for saving power, a screen size adjustment mode for adjusting a screen size, a character size adjustment mode for adjusting a character size, and a resolution adjustment mode for adjusting a resolution. Additionally, the control unit 170 can adjust at least one of the color, color temperature, brightness, and contrast of a screen for a task according to the determined screen mode.

In more detail, the control unit 170 can determine an appropriate screen mode based on at least one of the number of user inputs, a screen display time, and an execution time for at least one task output to the display unit 180, and the number of characters in a screen for a task.

Figure 52:
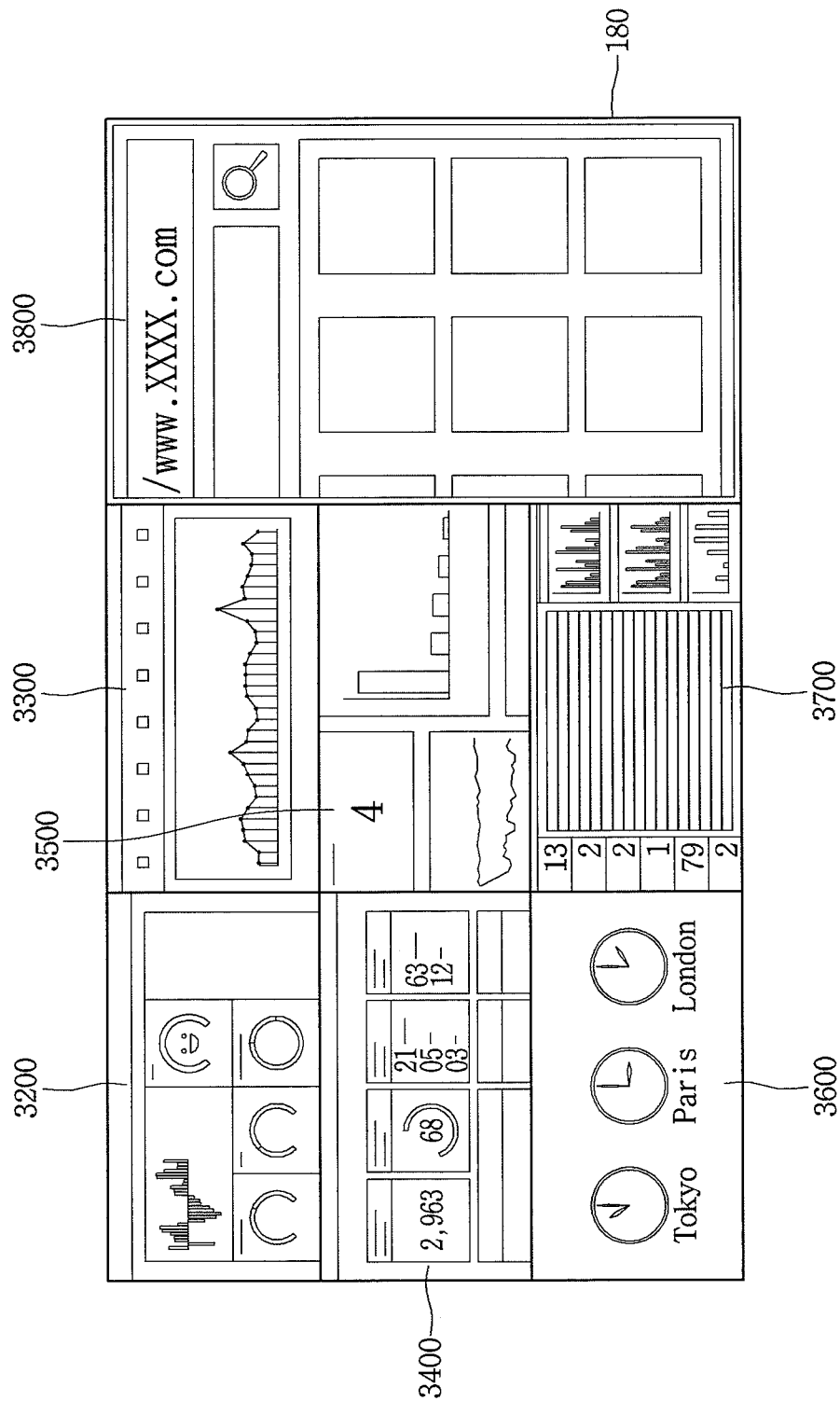
FIG. 52 is a view illustrating a task screen output in a resolution adjustment mode according to an embodiment of the present invention.
Figure 56:
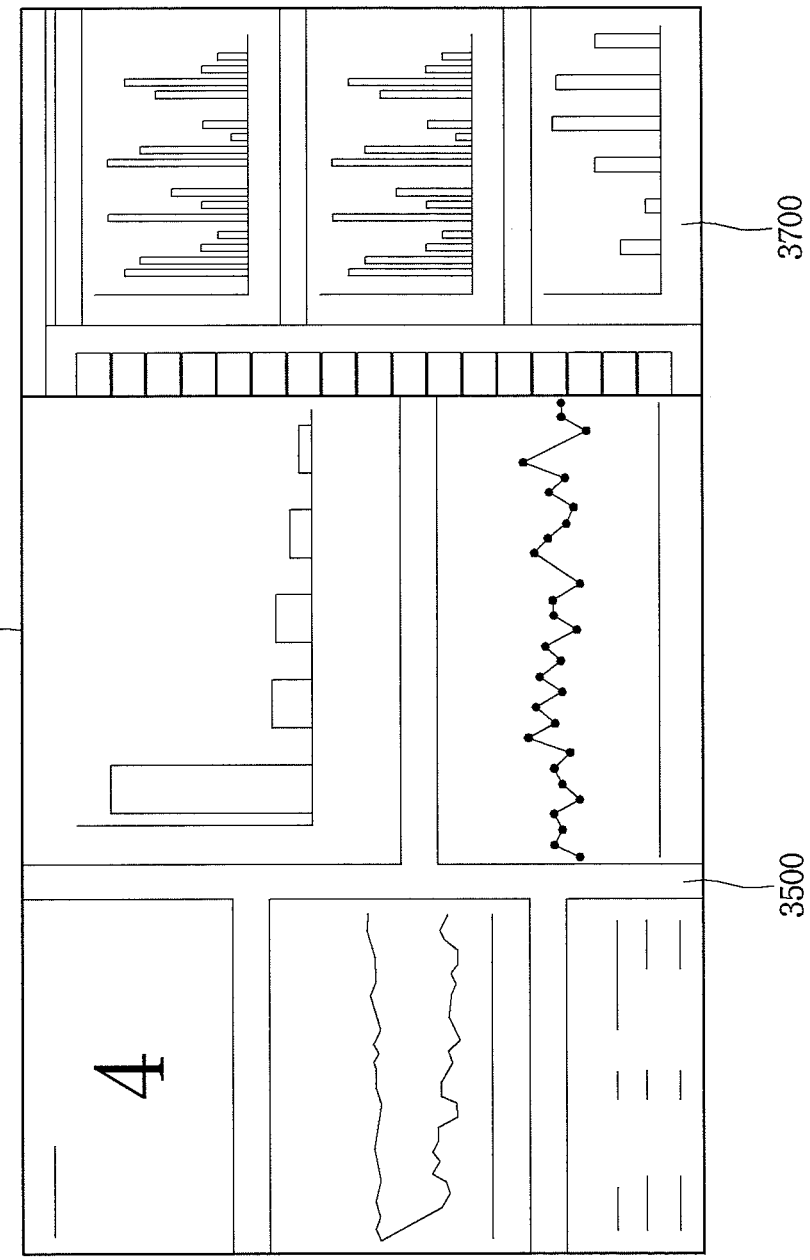
FIG. 56 is a view illustrating a screen corresponding to a screen size adjustment mode according to another embodiment of the present invention.

This will be described with reference to FIGS. 52 and 56. FIG. 52 is a view illustrating a task screen output in a resolution adjustment mode according to an embodiment of the present invention. Referring to FIG. 52, the control unit 170 can output, to the display unit 180, second to eighth screens 3200, 3300, 3400, 3500, 3600, 3700, and 3800, that is, a plurality of screens, for respective second to eighth tasks, that is, a plurality of tasks.

The control unit 170 can determine a screen mode appropriate for a task having the number of user inputs greater than a reference number among the second to eighth tasks as a resolution adjustment mode, based on the number of user inputs for each of the second to eighth tasks. Accordingly, the control unit 170 can output the screens 3500 and 3800 for the fifth and the eighth tasks having the number of user inputs greater than a reference number among the second to eighth tasks, in the resolution adjustment mode.

Therefore, the control unit 170 can output the resolutions of the screens 3500 and 3800 for the fifth task and the eighth task with a resolution different from a resolution for a screen for a task instead of a resolution adjustment mode. For example, the control unit 170 can output the resolution of the screen 3500 for the fifth task with a fifth resolution and output the resolution of the screen 3800 for the eighth task with a sixth resolution.

Additionally, the control unit 170 can determine a screen mode appropriate for a task having an execution time greater than a reference time among the second to eighth tasks as a resolution adjustment mode, based on an execution time for each of the second to eighth tasks. Additionally, the control unit 170 can determine a screen mode appropriate for a task having a screen display time greater than a reference time as a resolution adjustment mode, based on a screen display time for each of second to eighth screens 3200, 3300, 3400, 3500, 3600, 3700, and 3800, that is, a plurality of screens for the second to eighth tasks.

Figure 53:
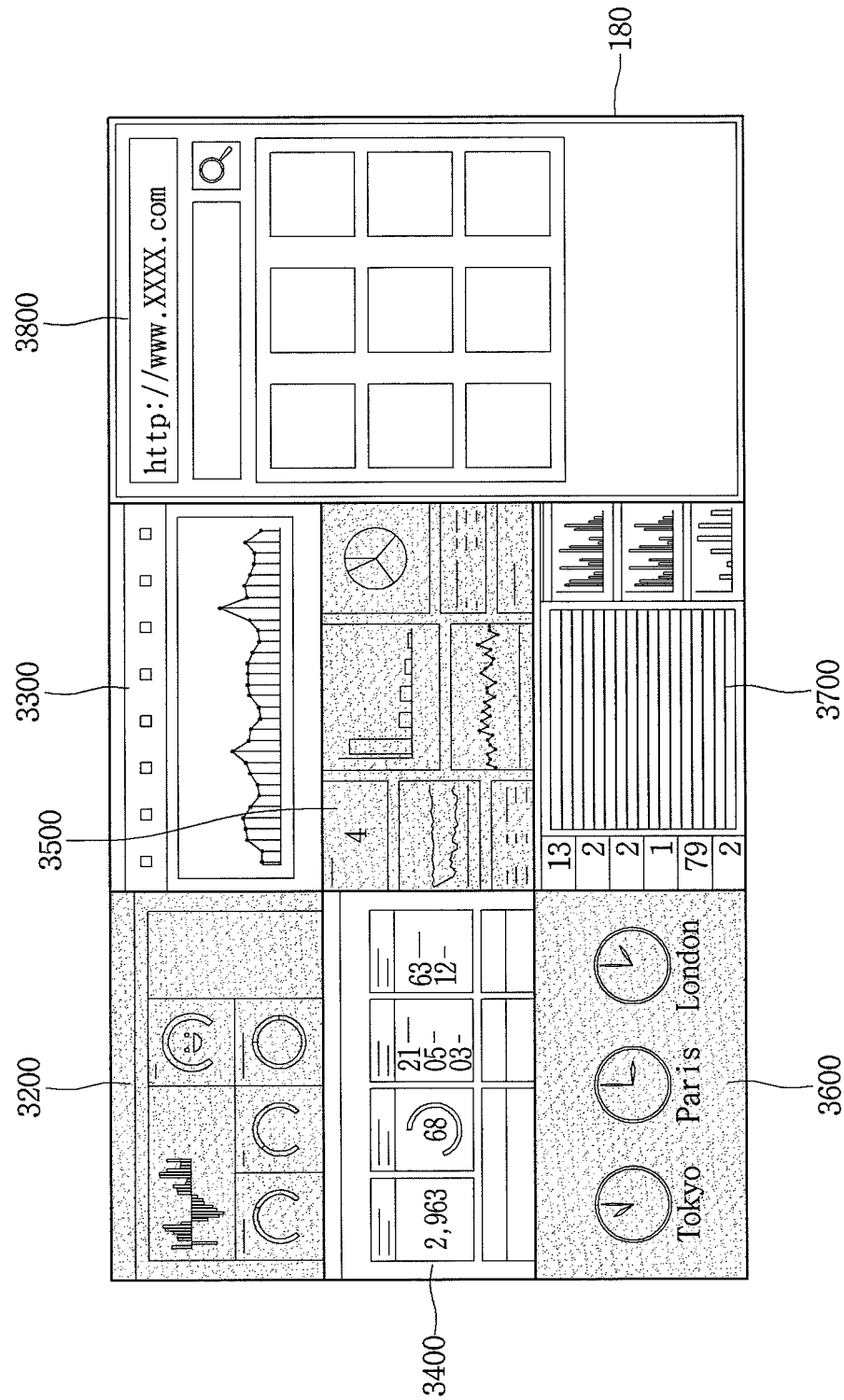
FIG. 53 is a view illustrating a task screen output in a power saving mode according to an embodiment of the present invention.

FIG. 53 is a view illustrating a task screen output in a power saving mode according to an embodiment of the present invention. Referring to FIG. 53, the control unit 170 can output, to the display unit 180, second to eighth screens 3200, 3300, 3400, 3500, 3600, 3700, and 3800, that is, a plurality of screens, for respective second to eighth tasks, that is, a plurality of tasks. The control unit 170 can determine a screen mode appropriate for a task having the number of user inputs less than a reference number among the second to eighth tasks as a power saving mode, based on the number of user inputs for each of the second to eighth tasks.

Accordingly, the control unit 170 can output the screens 3200 for the second task, the screen 3500 for the fifth task, and the screen 3600 for the sixth task, which are screens for the second, fifth, and sixth tasks having the number of user inputs less than a reference number among the second to eighth tasks. Therefore, the control unit 170 can lower the brightness of the screen 3200 for the second task, the screen 3500 for the fifth task, and the screen 3600 for the sixth task in comparison to a non-power saving mode.

Additionally, the control unit 170 can determine a screen mode appropriate for a task having an execution time less than a reference time among the second to eighth tasks as a power saving mode, based on an execution time for each of the second to eighth tasks. In addition, the control unit 170 can determine a screen mode appropriate for a task having a screen display time less than a reference time as a power saving mode, based on a screen display time for each of the second to eighth screens 3200, 3300, 3400, 3500, 3600, 3700, and 3800, that is, a plurality of screens for the second to eighth tasks.

Further, if the number of characters included in a screen for a task is greater than a predetermined number, the control unit 170 can determine a screen mode appropriate for a corresponding task as a document mode included in a character size adjustment mode. Additionally, the control unit 170 can output information on the determined screen mode to the display unit 180.

Figure 54:
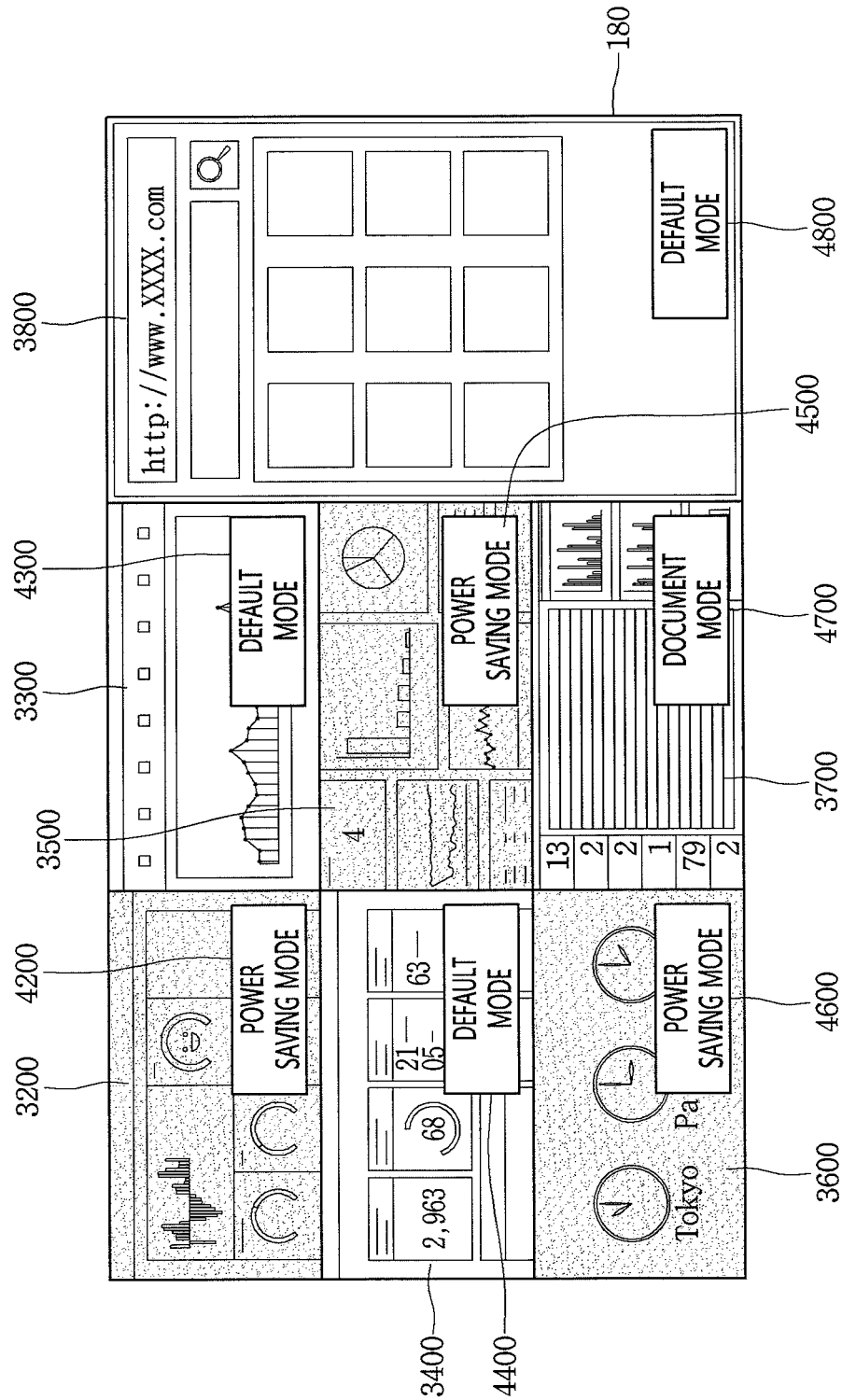
FIG. 54 is a view illustrating a screen for a plurality of tasks output in a determined screen mode according to an embodiment of the present invention.

This will be described with reference to FIG. 54. FIG. 54 is a view illustrating a screen for a plurality of tasks output in a determined screen mode according to an embodiment of the present invention. Referring to FIG. 54, the control unit 170 can output, to the display unit 180, second to eighth screens 3200, 3300, 3400, 3500, 3600, 3700, and 3800, that is, a plurality of screens, for respective second to eighth tasks, that is, a plurality of tasks.

The control unit 170 can determine a screen mode appropriate for a task having the number of user inputs less than a reference number among the second to eighth tasks as a power saving mode, based on the number of user inputs for each of the second to eighth tasks. Accordingly, the control unit 170 can output the screens 3200 for the second task, the screen 3500 for the fifth task, and the screen 3600 for the sixth task, which are screens for the second, fifth, and sixth tasks having the number of user inputs less than a reference number among the second to eighth tasks. Therefore, the control unit 170 can lower the brightness of the screen 3200 for the second task, the screen 3500 for the fifth task, and the screen 3600 for the sixth task in comparison to a non-power saving mode.

Then, the control unit 170 can determine the seventh task having the number of characters greater than a reference number as a document mode based on the number of characters included in each screen for the second to eighth tasks, that is, a plurality of tasks. Accordingly, the control unit 170 can output the size of a character included in a screen for the seventh task to be larger in comparison to another mode. Additionally, the control unit 170 can adjust the color temperature of a screen for the seventh task, which is determined as a document mode, to be different in comparison to another mode.

Then, the control unit 170 can output an information window that represents information on a screen mode for each of a plurality of tasks to a screen for each of the plurality of tasks. Accordingly, as shown in FIG. 14, the control unit 170 can output screen mode windows 4200, 4300, 4400, 4500, 4600, 4700, and 4800, which are information windows for representing information on a screen mode, to the respective second to eighth screens 3200, 3300, 3400, 3500, 3600, 3700, and 3800, which are a plurality of screens for the respective second to seventh tasks.

Accordingly, the control unit 170 can output a default mode for the screen mode windows 4300, 4400, and 4800 for the third, fourth, and eighth tasks having a screen mode as a default mode, output a power saving mode for the screen mode windows 4200, 4500, and 4600 for the second, fifth, and sixth tasks having a power mode, and output a document mode for the screen mode window 4700 for the seventh task having a document mode.

Moreover, the control unit 170 can determine a screen mode for at least one output task as a screen mode for adjusting a screen size and a screen position based on at least one of the number of user inputs, a screen display time, and an execution time for at least one task output to the display unit 180.

Figure 55:
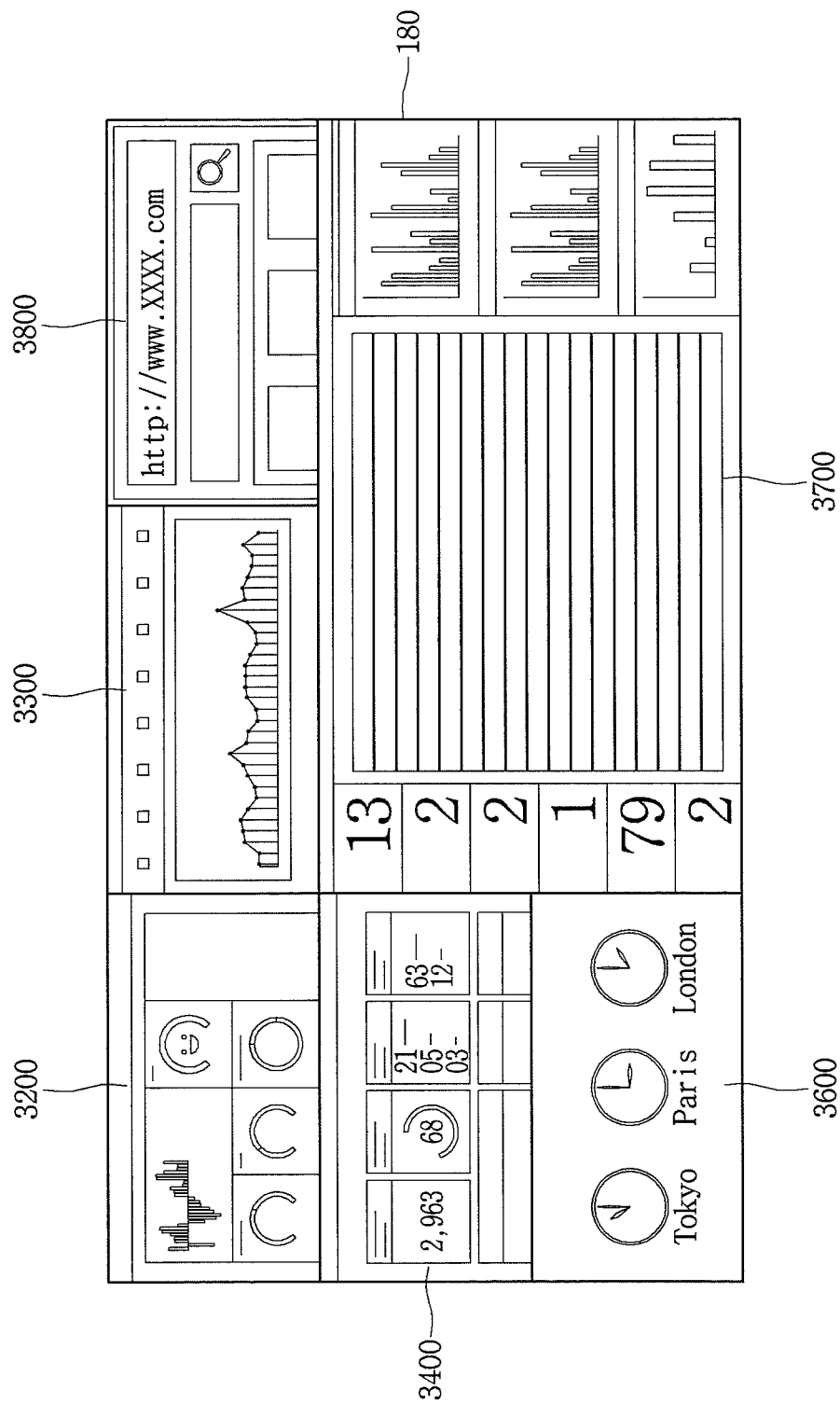
FIG. 55 is a view illustrating a screen corresponding to a screen size adjustment mode according to an embodiment of the present invention.

This will be described with reference to FIG. 55. FIG. 55 is a view illustrating a screen corresponding to a screen size adjustment mode according to an embodiment of the present invention. Referring to FIG. 55, the control unit 170 can output, to the display unit 180, second to eighth screens 3200, 3300, 3400, 3500, 3600, 3700, and 3800, that is, a plurality of screens, for respective second to eighth tasks, that is, a plurality of tasks.

The control unit 170 can determine a screen adjustment mode for adjusting the screen size of a task having the number of user inputs greater than a reference number among the second to eighth tasks, based on the number of user inputs for each of the second to eighth tasks. Accordingly, the control unit 170 can determine the seventh task having the number of user inputs greater than a reference number among the second to eighth tasks as a screen adjustment mode and may output the screen size of the screen 3700 for the seventh task to be larger than the screen sizes of the screens 3200, 3300, 3400, 3600, and 3800 for the other tasks instead of a screen adjustment mode.

Additionally, the control unit 170 can determine a screen mode appropriate for the seventh task that is a task having an execution time greater than a reference time among the second to eighth tasks as a screen size adjustment mode, based on an execution time for each of the second to eighth tasks. Additionally, the control unit 170 can determine a screen mode appropriate for the seventh task that is a task having a screen display time greater than a reference time as a power saving mode, based on a screen display time for each of the second to eighth screens 3200, 3300, 3400, 3500, 3600, 3700, and 3800, that is, a plurality of screens for the respective second to eighth tasks. Moreover, the control unit 170 can output only a screen for at least one task determined as a screen adjustment mode among a plurality of tasks, to the display unit 180.

This will be described with reference to FIG. 56. FIG. 56 is a view illustrating a screen corresponding to a screen size adjustment mode according to another embodiment of the present invention. Referring to FIG. 56, the control unit 170 can output, to the display unit 180, only screens corresponding to fifth and seventh tasks in a screen adjustment mode among second to eighth tasks, that is, a plurality of tasks. Accordingly, only a screen corresponding to the fifth and seventh tasks in a screen adjustment mode among the second to eighth tasks, that is, a plurality of tasks, may be output to the display unit 180.

Moreover, description for the screen adjustment mode is just exemplary and is not limited thereto. Accordingly, the screen size of a task corresponding to a screen adjustment mode may be output larger or smaller than the screen size of a task corresponding to another mode. Accordingly, according the detailed contents of a screen adjustment mode, the screen size of a task corresponding to the screen adjustment mode may vary. Accordingly, the screen adjustment mode may be applied variously according to a user's or designer's setting.

Additionally, the control unit 170 can determine a task as a priority mode for processing a specific task preferentially based on an operation processing speed for at least one task output to the display unit 180. For example, the control unit 170 can calculate an operation processing speed for each of a plurality of tasks output to the display unit 180 and determine at least one task among the plurality of tasks as a priority mode based on the calculated operation processing speed.

Accordingly, the control unit 170 can determine a priority for operation processing of each of a plurality of tasks and increase or decrease the screen display resolutions of some tasks in order to increase the processing speeds of some tasks among the plurality of tasks in comparison to a task not in a priority mode. Therefore, the control unit 170 can adjust the screen display resolution of a screen corresponding to a task in a priority mode among a plurality of tasks to be different from the screen display resolution of a screen corresponding to a task not in a priority mode. Then, according to a screen display resolution adjustment for a task corresponding to a priority mode, the control unit 170 can process a task corresponding to a priority mode preferentially in comparison to a task not in a priority mode. The embodiments of FIGS. 44 to 56 for adjusting a resolution may be applied if a task is performed under a multitasking environment according to the embodiments of FIGS. 6 to 43.

According to various embodiments of the present invention, a user can dispose a screen of another program during the execution of a program or a screen of an external input connected to a terminal, in one screen easily and fast. Additionally, information may be easily transmitted or received between a terminal and another terminal by using the screen of the other terminal provided through a screen mirroring technique.

Additionally, if a plurality of external input devices are connected to a terminal, user-friendly control and utilization are possible by selecting a connected external input device. Additionally, since the present invention outputs a task output to the screen of a terminal in an appropriate mode, it is possible to provide an optimized image to a user.

According to an embodiment of the present invention, the above-mentioned method may be embodied as computer readable codes on a non-transitory computer readable recording medium having a program thereon. Examples of the computer readable recording medium include ROM, RAM, CD-ROM, magnetic tape, floppy disk, and an optical data storage device and also include carrier waves (e.g., transmission through the Internet).

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A terminal comprising:
a display;
a wireless communication processor configured to receive information on a screen currently displayed on a peripheral device connected to the terminal through an external input; and
a controller configured to:
display an execution screen of a first program on a full screen of the display,
split the full screen into a first area and a second area in response to a screen split request, and
display the execution screen on the first area and a multitasking screen on the second area including at least one of a second program and the external input for connection to the terminal, wherein the multitasking screen includes an external input icon corresponding to the external input for performing a screen mirroring function with the peripheral device connected to the terminal via the external input,
display, on the second area, a mirroring screen corresponding to the screen currently displayed on the peripheral device in response to the external input icon being selected,
receive a first request for moving a phone number included in the execution screen of the first program on the first area to a call icon corresponding to a call application on the mirroring screen, and
in response to the first request, control the peripheral device in order to transmit a call signal to a mobile terminal corresponding to the phone number and display, on the second area, a screen for representing a process for transmitting the call signal,
wherein the second program is displayed in a program list and the external input is displayed in an external input list,
wherein the program list includes a program item corresponding to the second program,
wherein the second program corresponds to a recently executed program in the terminal or a favorite program registered as a favorite, and
wherein the program item comprises one of a recent execution screen of the second program or a thumbnail image corresponding to the second program.

2. The terminal of claim 1, wherein the controller is further configured to display an execution screen of the second program in the second area in response to a selection of the program item.

3. The terminal of claim 1, wherein the program list comprises a plurality of program items, and
wherein the controller is further configured to display first and second execution screens of programs corresponding to selected first and second program items in the program list, in a first sub area and a second sub area of the second area, respectively.

4. The terminal of claim 1, wherein the external input list comprises at least one of a first external input icon connected to the terminal in order for screen mirroring, a second external input icon indicating that a connection to the terminal is established through a High Definition Multimedia Interface (HDMI) standard, and a third external input icon for a TV input.

5. The terminal of claim 4, wherein each external input icon comprises at least one of a name for identifying an external input, a name of an external input peripheral device, and a thumbnail image of media content played through the external input.

6. The terminal of claim 4, wherein the controller is further configured to display an image in the second area based on an image signal received from a peripheral device corresponding to a selected external input icon among the first, second and third external input icon.

7. The terminal of claim 4, wherein the controller is further configured to display a screen mirroring list in the second area including information on screen mirroring available mobile terminals in response to a selection of the first external input icon.

8. The terminal of claim 7, wherein the information on the screen mirroring available mobile terminal comprises at least one of a name of a corresponding mobile terminal connected to the terminal, a current screen of the corresponding mobile terminal, and a user name of the corresponding mobile terminal.

9. The terminal of claim 1, wherein the controller is further configured to display the execution screen of the application on the second area according to the first request.

10. The terminal of claim 1, wherein the first request comprises a request for selecting information in the execution screen of the first program through a pointer controlled by one of a mouse and a remote control device and dragging and dropping the selected information on the mirroring screen.

11. The terminal of claim 1, wherein the controller is further configured to: in response to a second request for moving information included in the mirroring screen to the execution screen of the first program, receive information in the mirroring screen from the peripheral device.

12. The terminal of claim 1, further comprising: an external device interface unit configured to receive at least one of an image signal and an audio signal from an external device connected to the terminal.

13. The terminal of claim 1, wherein the controller is further configured to receive the screen split request from a remote control device.

\* \* \* \* \*